US009860178B2

United States Patent
Uchida

(10) Patent No.: US 9,860,178 B2
(45) Date of Patent: Jan. 2, 2018

(54) CONTROL MESSAGE RELAY APPARATUS, CONTROL MESSAGE RELAY METHOD, AND PROGRAM

(71) Applicant: NEC Corporation, Minato-ku, Tokyo (JP)

(72) Inventor: Satoshi Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/772,871

(22) PCT Filed: Mar. 10, 2014

(86) PCT No.: PCT/JP2014/056172
§ 371 (c)(1),
(2) Date: Sep. 4, 2015

(87) PCT Pub. No.: WO2014/142070
PCT Pub. Date: Sep. 18, 2014

(65) Prior Publication Data
US 2016/0021012 A1    Jan. 21, 2016

(30) Foreign Application Priority Data
Mar. 11, 2013 (JP) .................. 2013-048320

(51) Int. Cl.
*H04L 12/26* (2006.01)
*H04L 12/813* (2013.01)
(Continued)

(52) U.S. Cl.
CPC .......... *H04L 47/20* (2013.01); *H04L 41/0806* (2013.01); *H04L 41/0893* (2013.01); *H04L 45/42* (2013.01)

(58) Field of Classification Search
None
See application file for complete search history.

(56) References Cited

U.S. PATENT DOCUMENTS

2011/0078333 A1*  3/2011  Jakubowski ........ H04L 67/1095
                                                   709/248
2013/0294249 A1*  11/2013 Lin ....................... H04L 43/028
                                                   370/236
2014/0363163 A1*  12/2014 Morper .................. H04L 45/38
                                                   398/58

FOREIGN PATENT DOCUMENTS

JP     2012090058 A     5/2012
JP     2013005087 A     1/2013
WO     2011065268 A1    6/2011

OTHER PUBLICATIONS

Nick McKeown and seven others, "OpenFlow: Enabling Innovation in Campus Networks", Mar. 14, 2008, Cited in the Specification.
(Continued)

*Primary Examiner* — Brandon Renner

(57) ABSTRACT

A control message relay apparatus is arranged between a switch that processes a packet(s) based on externally set control information and a control apparatus that sets the control information in the switch. The control message relay apparatus comprises a control information storage unit that stores control information received from the control apparatus and information indicative of a setting status of the control information in the switch; and a control information conversion unit that reflects a control content(s) received from the control apparatus in control information held in the switch based on a predetermined control policy(ies).

13 Claims, 63 Drawing Sheets

(51) Int. Cl.
  *H04L 12/717*  (2013.01)
  *H04L 12/24*   (2006.01)

(56) References Cited

OTHER PUBLICATIONS

Open Networking Foundation,"OpenFlow Switch Specification" Version 1.3.1, Sep. 6, 2012, Cited in the Specification.
Rob Sherwood et al,"FlowVisor: A Network Virtualization Layer", Oct. 14, 2009, Cited in the Specification.
Hiroaki Yamanaka et al., "A Consideration of Flow Translation Enabling Arbitrary Flow Definition in Flow Space Virtualization", IEICE Technical Report, Dec. 6, 2012 (Dec. 6, 2012) vol. 112, No. 352, pp. 33 to 38, pp. 34 to 38 ' 2. Open Flow Network no Kasoka ', '3. Teian Flow Henkanho ' English Abstract Cited in ISR.
International Search Report for PCT Application No. PCT/JP2014/056172, dated Jun. 3, 2014.

\* cited by examiner (c) SETTING OF CONTROL INFORMATION
(FIRST COMMUNICATION)

CONTROL INFORMATION STORAGE UNIT

| Rule | | Action | info | | | |
|---|---|---|---|---|---|---|
| Match | | | | Marking | | |
| SRC | DEST | | Set | Rem | Exch | Wait |
| 192.168.0.1 | 192.168.0.100 | Out Port 1 | 1 | | | |

CONTROL INFORMATION STORAGE UNIT IN SWITCH 30

| Rule | | Action |
|---|---|---|
| Match | | |
| SRC | DEST | |
| 192.168.0.1 | 192.168.0.100 | Out Port 1 |

FLOW_MOD
match src192.168.0.1
dest192.168.0.100
action Out Port 1

(d) AFTER SETTING OF CONTROL INFORMATION
(SECOND COMMUNICATION)

CONTROL INFORMATION STORAGE UNIT

| Rule | | Action | info | | | |
|---|---|---|---|---|---|---|
| Match | | | | Marking | | |
| SRC | DEST | | Set | Rem | Exch | Wait |
| 192.168.0.1 | 192.168.0.100 | Out Port1 | 1 | | | |
| 192.168.0.1 | 192.168.0.101 | Out Port 2 | 2 | | | |

CONTROL INFORMATION STORAGE UNIT IN SWITCH 30

| Rule | | Action |
|---|---|---|
| Match | | |
| SRC | DEST | |
| 192.168.0.1 | 192.168.0.100 | Out Port1 |
| 192.168.0.1 | 192.168.0.101 | Out Port 2 |

(e) SETTING OF CONTROL INFORMATION
(THIRD COMMUNICATION)

CONTROL INFORMATION STORAGE UNIT

| Rule | | Action | info | | | |
|---|---|---|---|---|---|---|
| Match | | | | Marking | | |
| SRC | DEST | | Set | Rem | Exch | Wait |
| 192.168.0.1 | 192.168.0.100 | Out Port1 | 1 | | | |
| 192.168.0.1 | 192.168.0.101 | Out Port 2 | 2 | | | |
| 192.168.0.1 | 192.168.0.102 | Out Port 3 | | | | |

CONTROL INFORMATION STORAGE UNIT IN SWITCH 30

| Rule | | Action |
|---|---|---|
| Match | | |
| SRC | DEST | |
| 192.168.0.1 | 192.168.0.100 | Out Port1 |
| 192.168.0.1 | 192.168.0.101 | Out Port 2 |

FLOW_MOD
match src192.168.0.1
dest192.168.0.102
action Out Port 3

(g) STARTING EXCHANGE OF CONTROL INFORMATION
: REMOVING FOR EXCHANGE

CONTROL INFORMATION STORAGE UNIT

| Rule | | Action | info | | | |
|---|---|---|---|---|---|---|
| Match | | | | Marking | | |
| SRC | DEST | | Set | Rem | Exch | Wait |
| 192.168.0.1 | 192.168.0.100 | Out Port1 | 1 | | 1 | |
| 192.168.0.1 | 192.168.0.101 | Out Port 2 | 2 | | | |
| 192.168.0.1 | 192.168.0.102 | Out Port 3 | | | | 1 |

CONTROL INFORMATION STORAGE UNIT IN SWITCH 30

| Rule | | Action |
|---|---|---|
| Match | | |
| SRC | DEST | |
| 192.168.0.1 | 192.168.0.100 | Out Port1 |
| 192.168.0.1 | 192.168.0.101 | Out Port 2 |

FLOW_REMOVE
match src192.168.0.1
dest192.168.0.100
action Out Port 1

(i) COMPLETION OF EXCHANGE OF CONTROL INFORMATION
: SETTING OF EXCHANGE TARGET CONTROL INFORMATION

CONTROL INFORMATION STORAGE UNIT

| Rule | | | info | | | |
|---|---|---|---|---|---|---|
| Match | | Action | Marking | | | |
| SRC | DEST | | Set | Rem | Exch | Wait |
| 192.168.0.1 | 192.168.0.100 | Out Port1 | | | | |
| 192.168.0.1 | 192.168.0.101 | Out Port 2 | 2 | | | |
| 192.168.0.1 | 192.168.0.102 | Out Port 3 | 4 | | | |

CONTROL INFORMATION STORAGE UNIT IN SWITCH 30

| Rule | | Action |
|---|---|---|
| Match | | |
| SRC | DEST | |
| 192.168.0.1 | 192.168.0.102 | Out Port 3 |
| 192.168.0.1 | 192.168.0.101 | Out Port 2 |

FLOW_MOD
match src192.168.0.1
dest192.168.0.102
action Out Port 3

(m) INSTRUCTING REMOVING OF CONTROL INFORMATION

CONTROL INFORMATION STORAGE UNIT

| Rule | | Action | info | | |
|---|---|---|---|---|---|
| Match | | | | Marking | |
| SRC | DEST | | Set | Rem | Exch | Wait |
| 192.168.0.1 | 192.168.0.100 | Out Port 1 | 5 | 1 | | |
| 192.168.0.1 | 192.168.0.102 | Out Port 3 | 4 | | | |

CONTROL INFORMATION STORAGE UNIT IN SWITCH 30

| Rule | | Action |
|---|---|---|
| Match | | |
| SRC | DEST | |
| 192.168.0.1 | 192.168.0.102 | Out Port 3 |
| 192.168.0.1 | 192.168.0.100 | Out Port 1 |

FLOW_REMOVE
match src192.168.0.1
     dest192.168.0.101
action Out Port 2

(n) RESPONDING TO REMOVING OF CONTROL INFORMATION

CONTROL INFORMATION STORAGE UNIT

| Rule | | Action | info | | | |
|---|---|---|---|---|---|---|
| Match | | | Marking | | | |
| SRC | DEST | | Set | Rem | Exch | Wait |
| 192.168.0.1 | 192.168.0.102 | Out Port 3 | 4 | | | |

CONTROL INFORMATION STORAGE UNIT IN SWITCH 30

| Rule | | Action |
|---|---|---|
| Match | | |
| SRC | DEST | |
| 192.168.0.1 | 192.168.0.102 | Out Port 3 |

FLOW_REMOVED
REASON DELETE
match src192.168.0.1
        dest192.168.0.100
action Out Port 1

FIG. 25
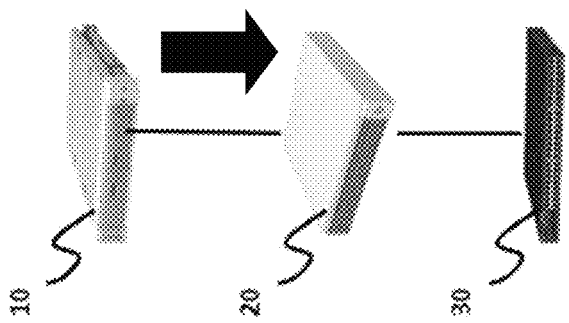

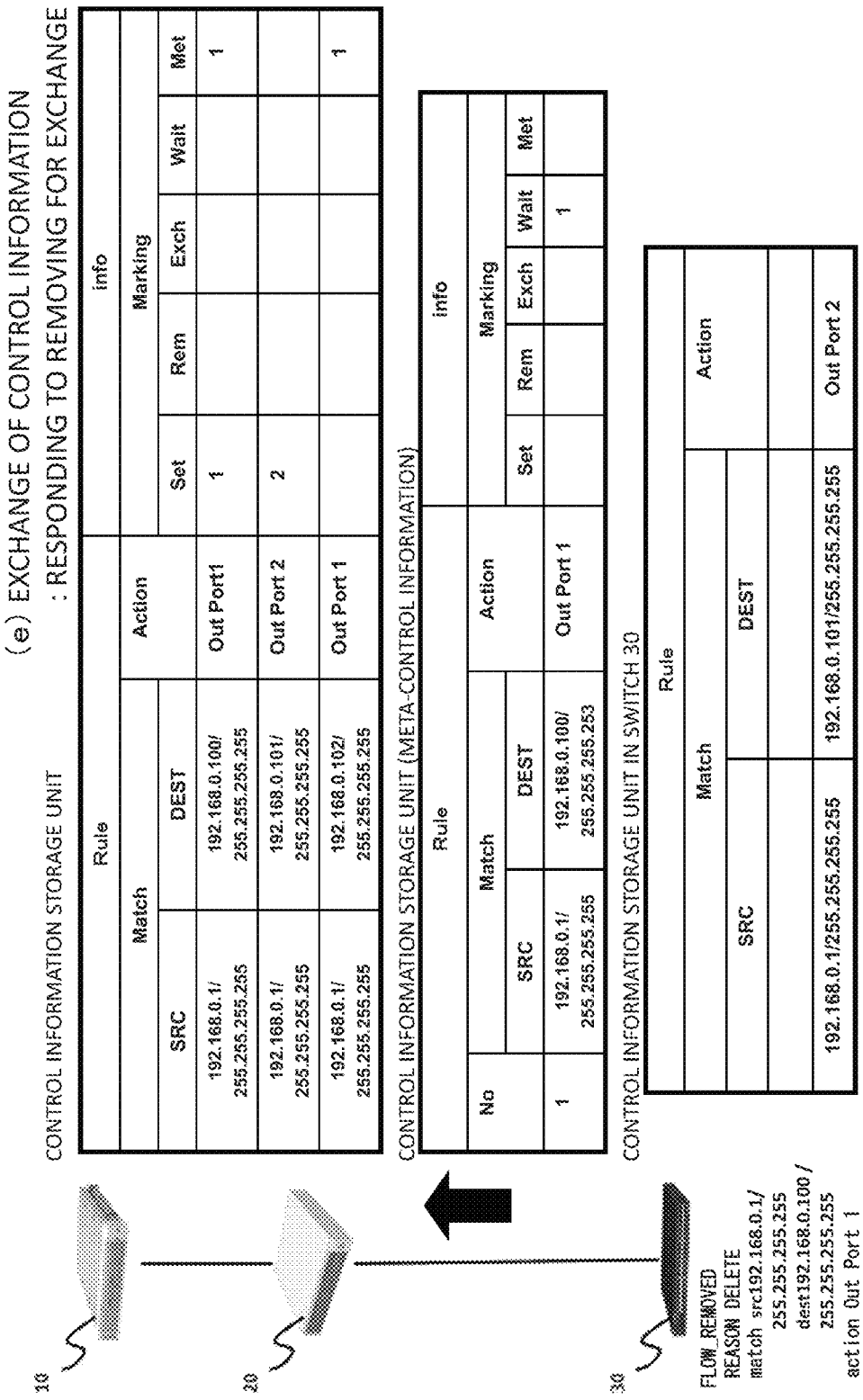

FIG. 35

(f) COMPLETION OF EXCHANGE OF CONTROL INFORMATION
: SETTING OF INTEGRATED CONTROL INFORMATION

CONTROL INFORMATION STORAGE UNIT

| Rule | | | info | | | | |
|---|---|---|---|---|---|---|---|
| Match | | Action | Marking | | | | |
| SRC | DEST | | Set | Rem | Exch | Wait | Met |
| 192.168.0.1/ 255.255.255.255 | 192.168.0.100/ 255.255.255.255 | Out Port1 | | | | | 1 |
| 192.168.0.1/ 255.255.255.255 | 192.168.0.101/ 255.255.255.255 | Out Port 2 | 2 | | | | |
| 192.168.0.1/ 255.255.255.255 | 192.168.0.102/ 255.255.255.255 | Out Port 1 | | | | | 1 |

CONTROL INFORMATION STORAGE UNIT (META-CONTROL INFORMATION)

| No | Rule | | | info | | | | |
|---|---|---|---|---|---|---|---|---|
| | Match | | Action | Marking | | | | |
| | SRC | DEST | | Set | Rem | Exch | Wait | Met |
| 1 | 192.168.0.1/ 255.255.255.255 | 192.168.0.100/ 255.255.255.253 | Out Port 1 | 4 | | | | |

CONTROL INFORMATION STORAGE UNIT IN SWITCH 30

| Rule | | Action |
|---|---|---|
| Match | | |
| SRC | DEST | |
| 192.168.0.1/255.255.255.255 | 192.168.0.100/255.255.255.253 | Out Port 1 |
| 192.168.0.1/255.255.255.255 | 192.168.0.101/255.255.255.255 | Out Port 2 |

FLOW_MOD
match src192.168.0.1/
255.255.255.255
dest192.168.0.100/
255.255.255.253
action Out Port 1

FIG. 36 (g) CANCELLATION OF INTEGRATED CONTROL INFORMATION : FIRST COMMUNICATION

CONTROL INFORMATION STORAGE UNIT

| Rule | | | | info | | | | |
|---|---|---|---|---|---|---|---|---|
| Match | | Action | | Marking | | | | |
| SRC | DEST | | Set | Rem | Exch | Wait | Met | |
| 192.168.0.1/ 255.255.255.255 | 192.168.0.100/ 255.255.255.255 | Out Port1 | | | | | 1 | |
| 192.168.0.1/ 255.255.255.255 | 192.168.0.101/ 255.255.255.255 | Out Port 2 | 2 | | | | | |
| 192.168.0.1/ 255.255.255.255 | 192.168.0.102/ 255.255.255.255 | Out Port 1 | | | | | 1 | |

CONTROL INFORMATION STORAGE UNIT (META-CONTROL INFORMATION)

| No | Rule | | | info | | | | |
|---|---|---|---|---|---|---|---|---|
| | Match | | Action | Marking | | | | |
| | SRC | DEST | | Set | Rem | Exch | Wait | Met |
| 1 | 192.168.0.1/ 255.255.255.255 | 192.168.0.100/ 255.255.255.253 | Out Port 1 | 4 | | | | |

CONTROL INFORMATION STORAGE UNIT IN SWITCH 30

| Rule | | Action |
|---|---|---|
| Match | | |
| SRC | DEST | |
| 192.168.0.1/255.255.255.255 | 192.168.0.100/255.255.255.253 | Out Port 1 |
| 192.168.0.1/255.255.255.255 | 192.168.0.101/255.255.255.255 | Out Port 2 |

FLOW_REMOVE
match src192.168.0.1/
255.255.255.255
dest192.168.0.100/
255.255.255.255
action Out Port 1

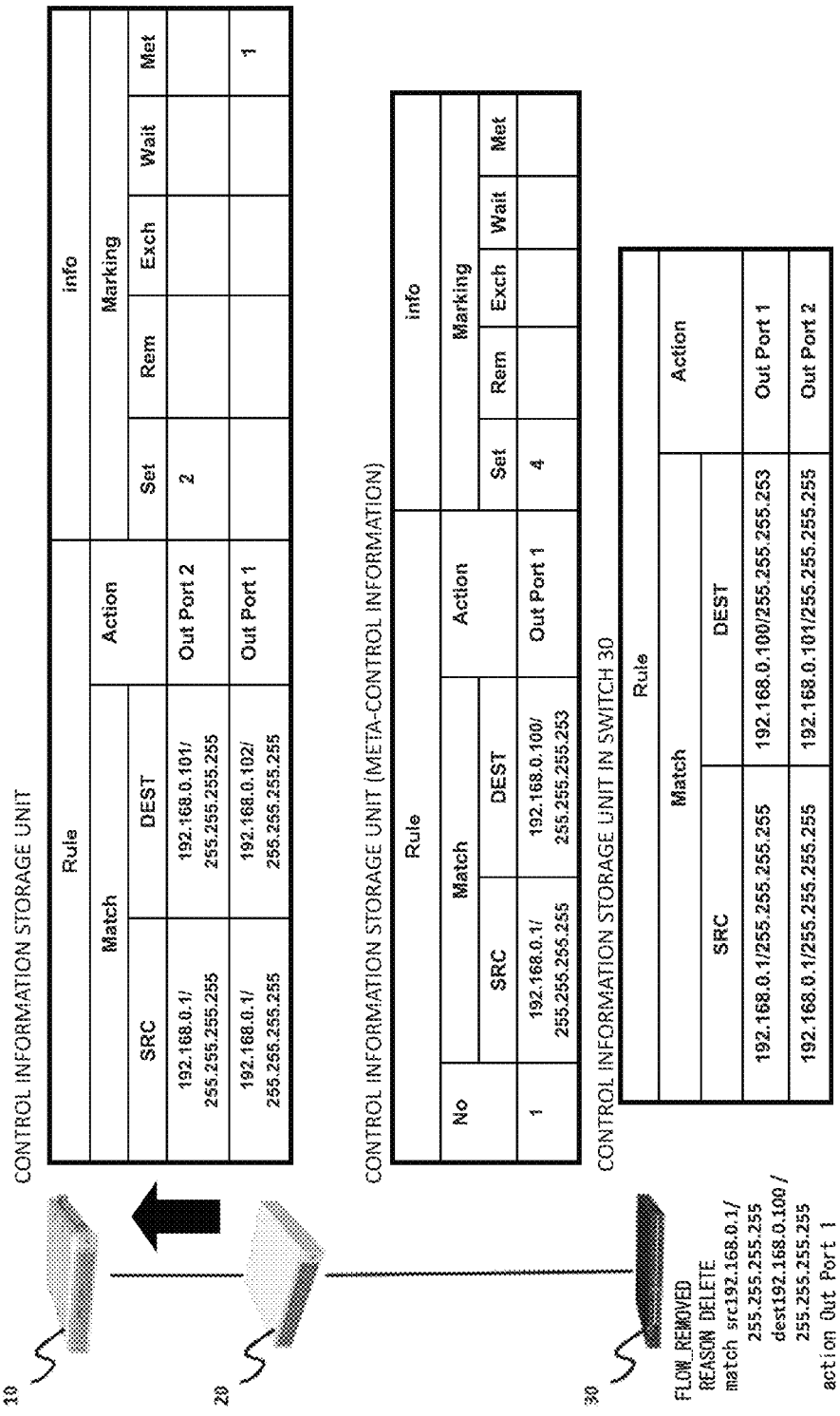

FIG. 39

(j) CANCELATION OF INTEGRATED CONTROL INFORMATION
; REMOVAL OF INTEGRATED CONTROL INFORMATION

CONTROL INFORMATION STORAGE UNIT

| Rule | | | info | | | | |
|---|---|---|---|---|---|---|---|
| Match | | Action | | Marking | | | |
| SRC | DEST | | Set | Rem | Exch | Wait | Met |
| 192.168.0.1/ 255.255.255.255 | 192.168.0.101/ 255.255.255.255 | Out Port 2 | 2 | | | | |
| 192.168.0.1/ 255.255.255.255 | 192.168.0.102/ 255.255.255.255 | Out Port 1 | | | | | 1 |

CONTROL INFORMATION STORAGE UNIT (META-CONTROL INFORMATION)

| No | Rule | | | info | | | | |
|---|---|---|---|---|---|---|---|---|
| | Match | | Action | | Marking | | | |
| | SRC | DEST | | Set | Rem | Exch | Wait | Met |
| 1 | 192.168.0.1/ 255.255.255.255 | 192.168.0.100/ 255.255.255.253 | Out Port 1 | 4 | | | | |

CONTROL INFORMATION STORAGE UNIT IN SWITCH 30

| Rule | | Action |
|---|---|---|
| Match | | |
| SRC | DEST | |
| 192.168.0.1/255.255.255.255 | 192.168.0.100/255.255.255.253 | Out Port 1 |
| 192.168.0.1/255.255.255.255 | 192.168.0.101/255.255.255.255 | Out Port 2 |

FLOW_REMOVE
match src192.168.0.1/
255.255.255.255
dest192.168.0.100/
255.255.255.253
action Out Port 1

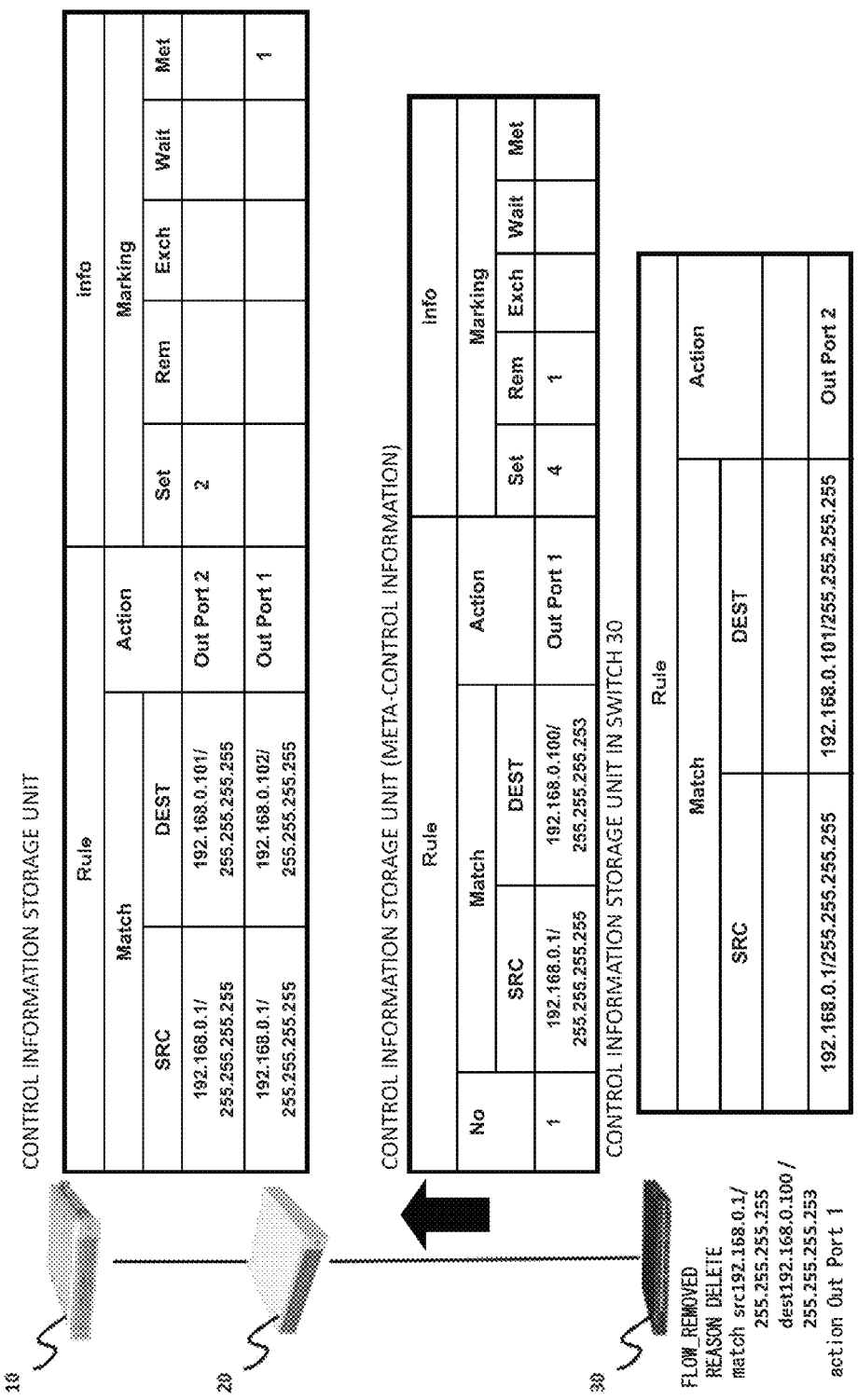

FIG. 47
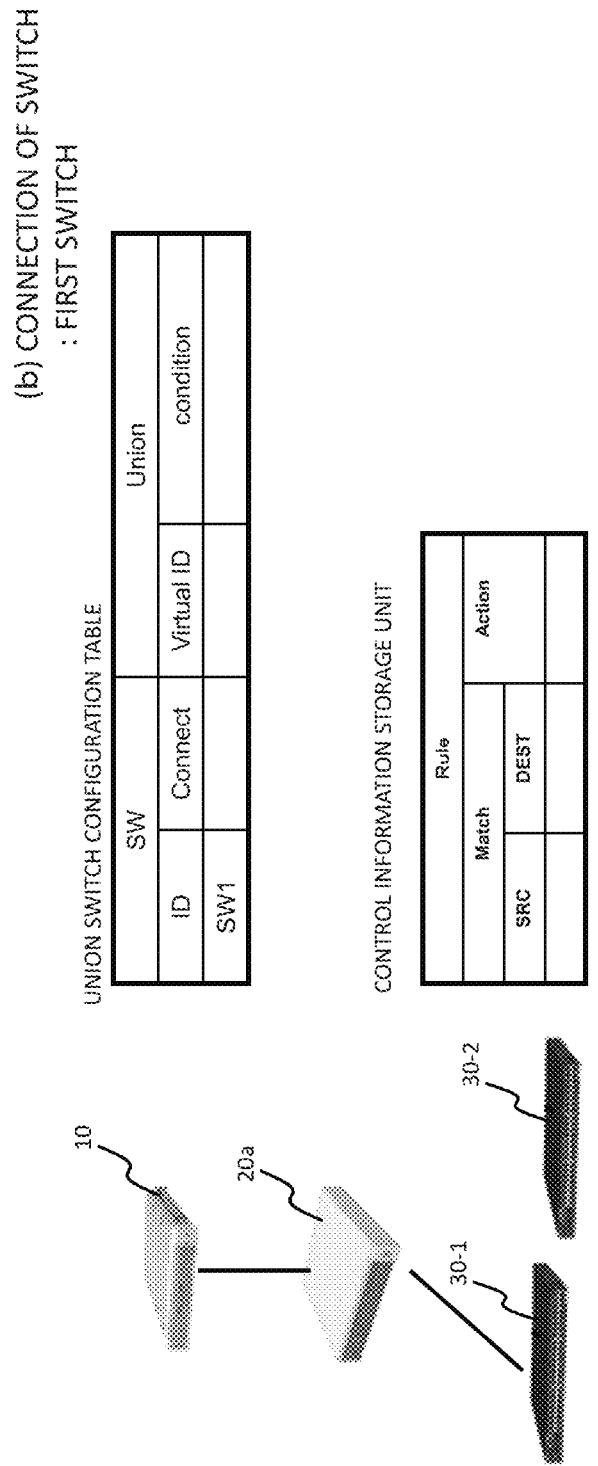
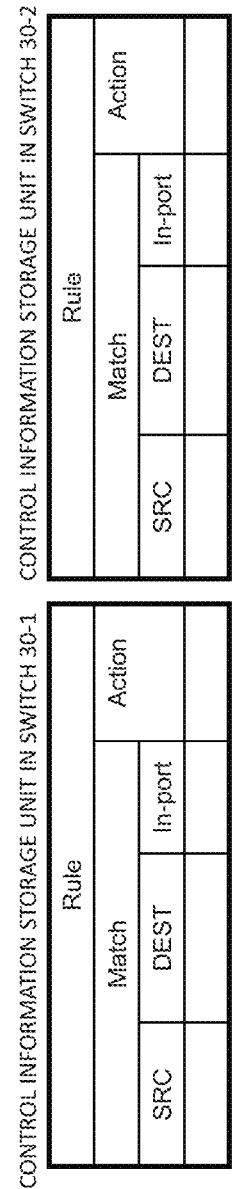

(d) ESTABLISHMENT OF CONTROL OF UNION SWITCH AND SWITCH (FIRST SWITCH)

FIG. 51 (f) INCORPORATION INTO UNION SWITCH
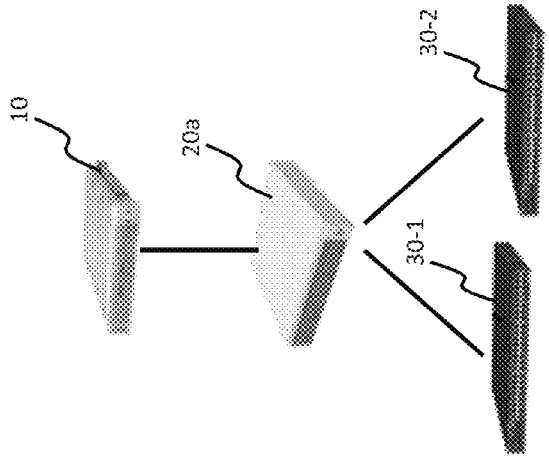

FIG. 52

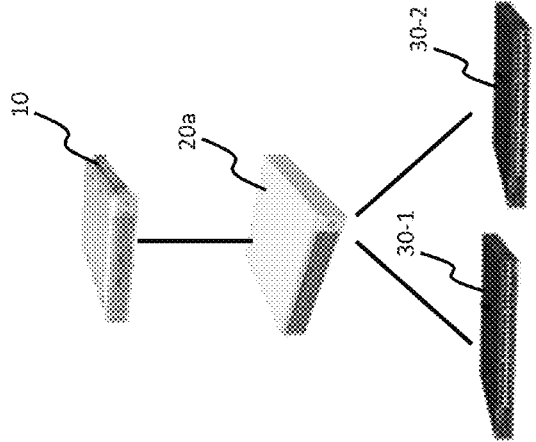

(g) INCORPORATION INTO UNION SWITCH
: CREATION OF INTEGRATED CONTROL INFORMATION
(FOR FORWARDING FROM FIRST SWITCH)

UNION SWITCH CONFIGURATION TABLE

| SW | | | Union | |
|---|---|---|---|---|
| ID | Connect | Virtual ID | condition | |
| SW1 | YES | VSW | P7~P12=>VSW:P7~P12 | |
| VSW | YES | | SW1:P1~P6=>P1~P6 SW2:P7~P12=>P7~P12 | |
| SW2 | YES | VSW | | |

CONTROL INFORMATION STORAGE UNIT

| Rule | | |
|---|---|---|
| Match | | Action |
| SRC | DEST | |
| | | |
| | | |

CONTROL INFORMATION STORAGE UNIT IN SWITCH 30-2

| Rule | | | |
|---|---|---|---|
| Match | | | Action |
| SRC | DEST | In-port | |
| any | any | P1 | Out P7 |
| ... | ... | ... | ... |
| any | any | P6 | Out P12 |

CONTROL INFORMATION STORAGE UNIT IN SWITCH 30-1

| Rule | | | |
|---|---|---|---|
| Match | | | Action |
| SRC | DEST | In-port | |
| | | | |
| | | | |

(b) EXCHANGE OF COMMUNICATIONS
: RESETTING FOR EXCHANGE

CONTROL INFORMATION STORAGE UNIT

| Rule | | Action | Info | | | | |
|---|---|---|---|---|---|---|---|
| Match | | | | | Marking | | |
| SRC | DEST | | Set | Rem | Exch | Wait | Exp |
| 192.168.0.1 | 192.168.0.100 | Out Port1 | | | | | |
| 192.168.0.1 | 192.168.0.101 | Out Port 2 | 2 | | | | 15 |
| 192.168.0.1 | 192.168.0.102 | Out Port 3 | 4 | | | | 25 |
| | | | | | | | 25 |

CONTROL INFORMATION STORAGE UNIT IN SWITCH 30

| Rule | | Action |
|---|---|---|
| Match | | |
| SRC | DEST | |
| 192.168.0.1 | 192.168.0.102 | Out Port 3 |
| 192.168.0.1 | 192.168.0.101 | Out Port 2 |

FLOW_MOD
match src192.168.0.1
dest192.168.0.102
action Out Port 3

CONTROL MESSAGE RELAY APPARATUS, CONTROL MESSAGE RELAY METHOD, AND PROGRAM

TECHNICAL FIELD

This application is a National Stage Entry of PCT/JP2014/056172 filed on Mar. 10, 2014, which claims priority from Japanese Patent Application 2013-048320 filed on Mar. 11, 2013, the contents of all of which are incorporated herein by reference, in their entirety.

The present invention relates to a control message relay apparatus, a control message relay method, and a program. In particular, it relates to a control message relay apparatus, a control message relay method, and a program for relaying control messages between a control apparatus(es) and a switch(es) in a centralized-control-type network.

BACKGROUND

Non-Patent Literatures 1 and 2 disclose a technique referred to as OpenFlow in which control and data planes are separated from each other. In OpenFlow, a control apparatus referred to as an OpenFlow controller sets control information (flow entries) that defines packet forwarding rules and/or header conversion rules in target switches, and these switches process received packets by referring to the control information.

Non-Patent Literature 3 proposes a switch virtualization technique referred to as FlowVisor, as an extended technique of the above OpenFlow. In FlowVisor, a relay apparatus referred to as a FlowVisor is arranged between a plurality of OpenFlow controllers and a plurality of switches. The FlowVisor intercepts a control message issued from an OpenFlow controller and determines whether to set information in a corresponding switch in accordance with a resource allocation policy. In addition, the FlowVisor forwards a control message issued from a switch to a corresponding network controller in accordance with a resource allocation policy.

Non-Patent Literature 1:
Nick McKeown, and seven others, "OpenFlow: Enabling Innovation in Campus Networks," [online], [searched on Jan. 9, 2013], Internet <URL: http://www.openflow.org/documents/openflow-wp-latest.pdf>.

Non-Patent Literature 2:
"OpenFlow Switch Specification" Version 1.3.1 (Wire Protocol 0x04), [online], [searched on Jan. 9, 2013], Internet <URL: https://www.opennetworking.org/images/stories/downloads/specification/openflow-spec-v1.3.1.pdf>.

Non-Patent Literature 3:
"FlowVisor: A Network Virtualization Layer," [online], [searched on Jan. 9, 2013], Internet <http://www.openflow.org/downloads/technicalreports/openflow-tr-2009-1-flowvisor.pdf>.

SUMMARY

The following analysis has been given by the present inventor. Switches in a centralized-control-type network as typified by OpenFlow hold control information received from a control apparatus and are expected to process packets at high speed. Thus, such switches in a centralized-control-type network include a CAM (Content Addressable Memory) for holding control information. However, since such a CAM is expensive, the capacity of the memory could be limited. In addition, the CAM capacity varies from switch to switch. Consequently, the number of control information entries that can be set could vary from switch to switch. This is a problem since the control algorithm of a control apparatus cannot accommodate such difference among the CAM capacities of these switches.

When the CAM of a switch is full as described above, if the switch receives a control message for setting new control information from a control apparatus, the switch transmits an error message as a response. Consequently, for example, the control apparatus may need to remove other control information set in the switch, causing burden on the control apparatus, which is counted as a problem.

In particular, when a resource-balancing broker such as the FlowVisor in Non-Patent Literature 3 is used, since each of the plurality of control apparatuses sets control information in a single switch, the number of control information entries that can be set could be further limited.

Therefore, there is a need in the art to facilitate setting of control information by a control apparatus(es) in a switch(es), without, for example, unifying the CAM capacities of the switches or the like.

According to a first aspect, there is provided a control message relay apparatus arranged between a switch that processes a packet(s) based on externally set control information and a control apparatus that sets the control information in the switch. The control message relay apparatus comprises a control information storage unit that stores control information received from the control apparatus and information indicative of a setting status of the control information in the switch. Further, the control message relay apparatus comprises a control information conversion unit that reflects a control content(s) received from the control apparatus in control information held in the switch based on a predetermined control policy(ies).

According to a second aspect, there is provided a control message relay method performed by a control message relay apparatus arranged between a switch that processes packets based on externally set control information and a control apparatus that sets the control information in the switch. The control message relay method comprises reflecting a control content(s) received from the control apparatus in control information held in the switch based on a predetermined control policy(ies). Further, the control message relay method comprises updating a control information storage unit that stores control information received from the control apparatus and information indicative of a setting status of the control information in the switch. This method is associated with a certain machine called a control message relay apparatus that relays a control message(s) between a switch(es) and a control apparatus(es).

According to a third aspect, there is provided a program for a computer arranged between a switch that processes packets based on externally set control information and a control apparatus that sets the control information in the switch. The program causes the computer to execute reflecting a control content(s) received from the control apparatus in control information held in the switch based on a predetermined control policy(ies). Further, the program causes the computer to execute updating a control information storage unit that stores control information received from the control apparatus and information indicative of a setting status of the control information in the switch. This program can be recorded in a computer-readable (non-transient) storage medium. Namely, the present invention can be embodied as a computer program product.

The present invention provides the following advantage, but not restricted thereto. According to the present invention, it is possible to facilitate setting of control information by a control apparatus(es) in switches.

BRIEF DESCRIPTION OF THE DRAWINGS

FIG. 25 illustrates a specific example of another operation performed by the control message relay apparatus according to the first exemplary embodiment of the present invention.

FIG. 34 is a diagram that follows FIG. 33.
FIG. 35 is a diagram that follows FIG. 34.
FIG. 36 is a diagram that follows FIG. 35.
FIG. 37 is a diagram that follows FIG. 36.
FIG. 39 is a diagram that follows FIG. 38.
FIG. 40 is a diagram that follows FIG. 39.

FIG. 47 is a diagram that follows FIG. 46.
FIG. 51 is a diagram that follows FIG. 50.
FIG. 52 is a diagram that follows FIG. 51.

PREFERRED MODES

Figure 1:
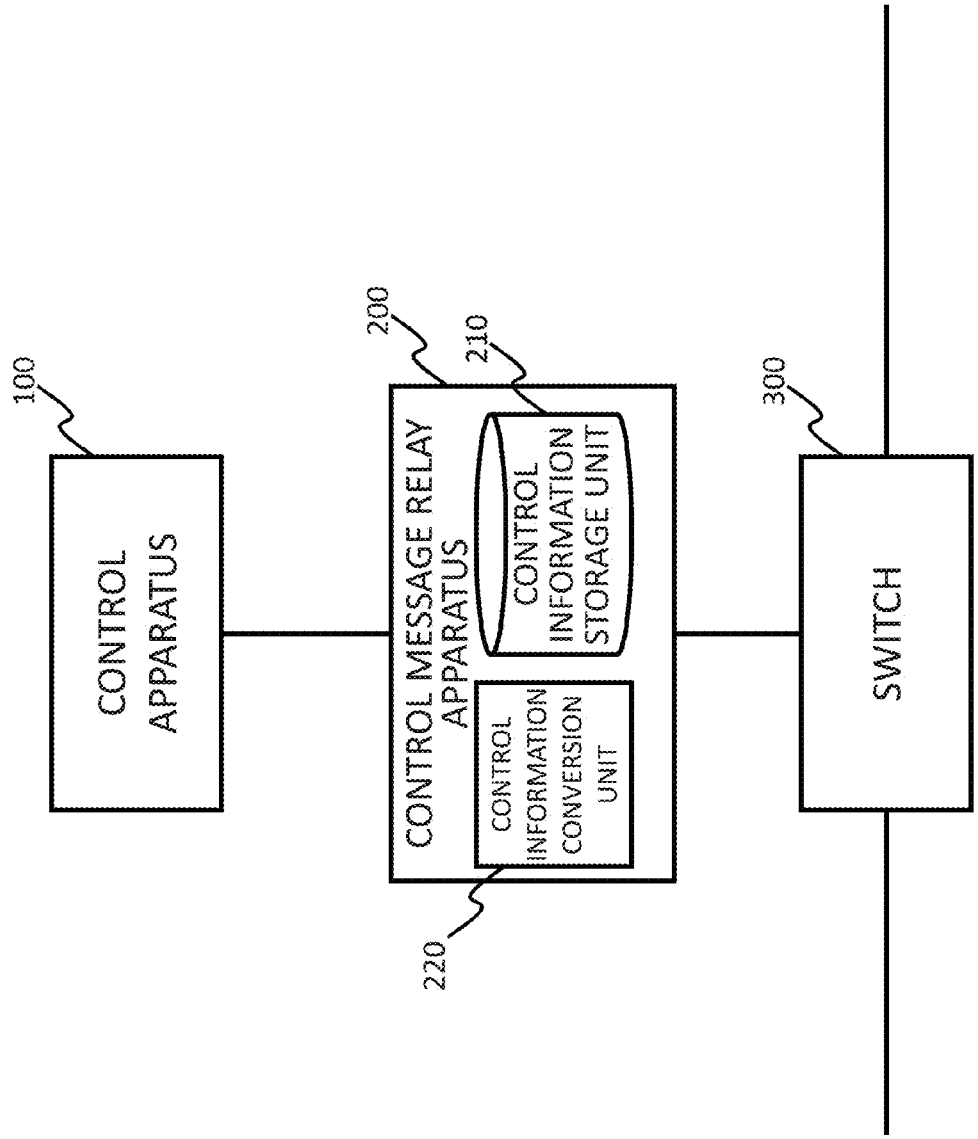
FIG. 1 illustrates a configuration according to an exemplary embodiment of the present invention.

In the present disclosure, there are various possible modes, which include the following, but not restricted thereto. First, an outline of an exemplary embodiment of the present invention will be described with reference to drawings. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a control message relay apparatus 200 arranged between a switch 300 that processes packets based on externally set control information and a control apparatus 100 that sets control information in the switch 300.

More specifically, this control message relay apparatus 200 includes a control information storage unit 210 in which control information received from the control apparatus 100 and control information set in the switch 300 are stored and a control information conversion unit 220 that reflects a control content received from the control apparatus 100 in control information held in the switch 300 based on a predetermined control policy.

Figure 2:
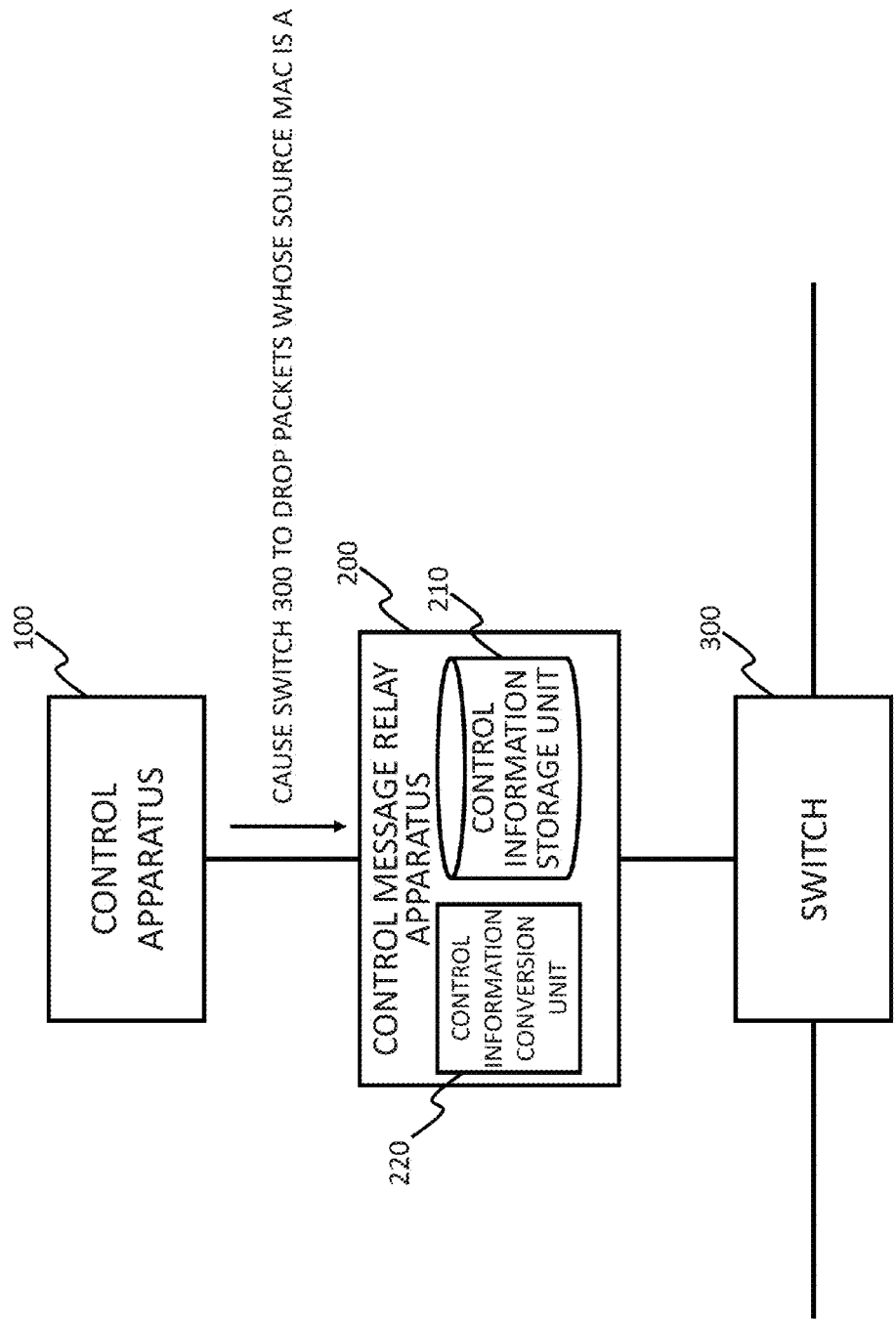
FIG. 2 illustrates an operation according to the exemplary embodiment of the present invention.
Figure 3:
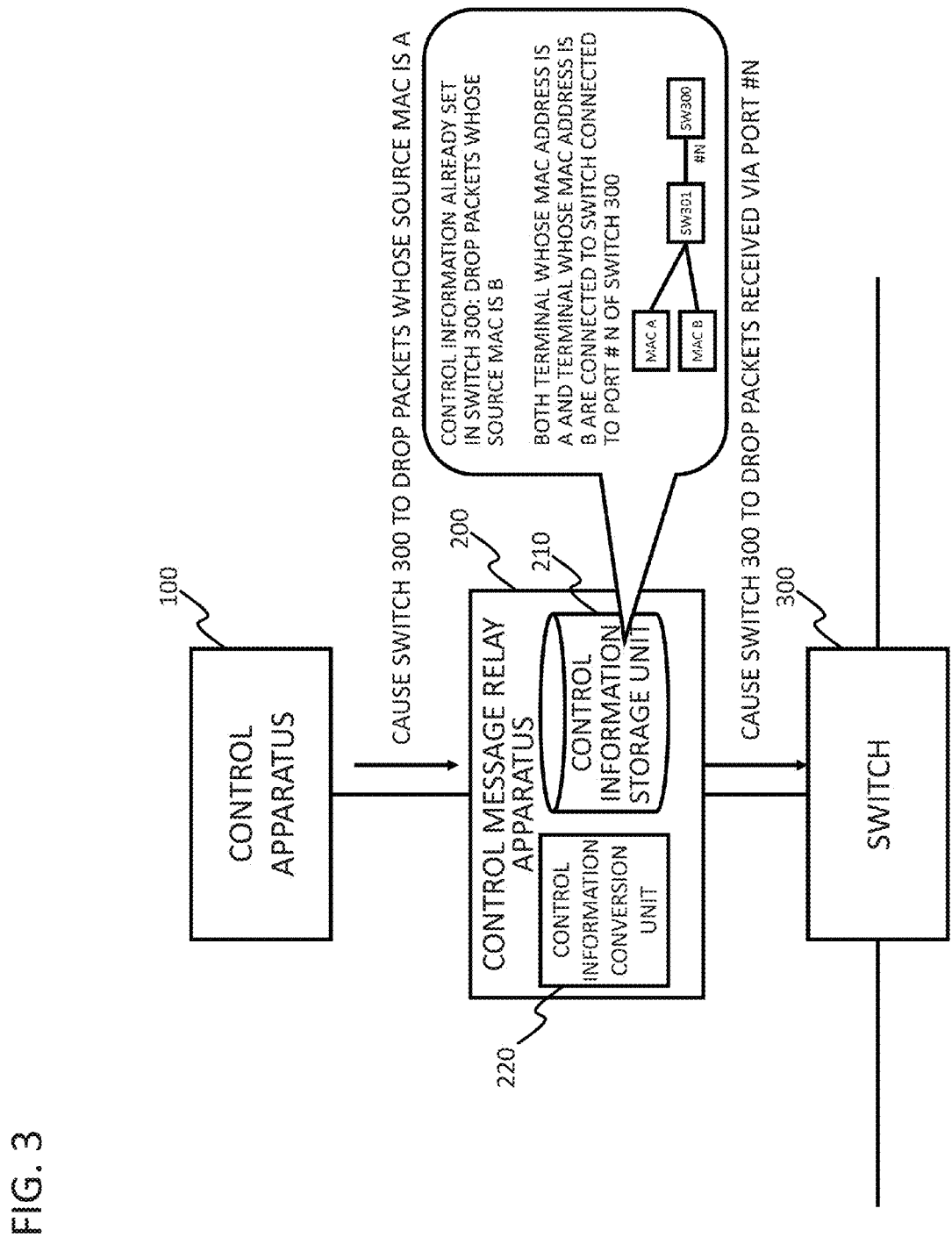
FIG. 3 illustrates an operation according to the exemplary embodiment of the present invention.

For example, if control information for dropping packets whose source MAC address is B and a control policy for reducing the number of control information entries that are set in the switch 300 have already been set in the switch 300, the control message relay apparatus 200 performs the following operation. In such situation, there is a possibility that the control apparatus 100 transmits control information for instructing dropping of packets whose source MAC address is A to the switch 300 via the control message relay apparatus 200 as illustrated in FIG. 2. If the control information conversion unit 220 directly forwards the control information to the switch 300, the number of control information entries held in the switch will be two.

If the control message relay apparatus 200 has already acquired information indicating that a terminal whose source MAC is A and a terminal whose source MAC is B are connected to another switch connected to a port #N of the switch 300, instead of transmitting the control information received from the control apparatus 100 to the switch 300, the control message relay apparatus 200 performs an operation of rewriting the control information for instructing dropping of packets whose source MAC address is B, the control information being held in the switch 300, to control information for instructing dropping of packets received via the port #N. In this way, the control content intended by the control apparatus 100 can be realized without increasing the number of control information entries held in the switch.

In addition, according to the above exemplary embodiment, for example, even when the switch 300 cannot hold new control information because of its CAM capacity or the like, an error is not transmitted and the control apparatus can recognize that the control information has been set (setting of control information is facilitated).

First Exemplary Embodiment

Figure 4:
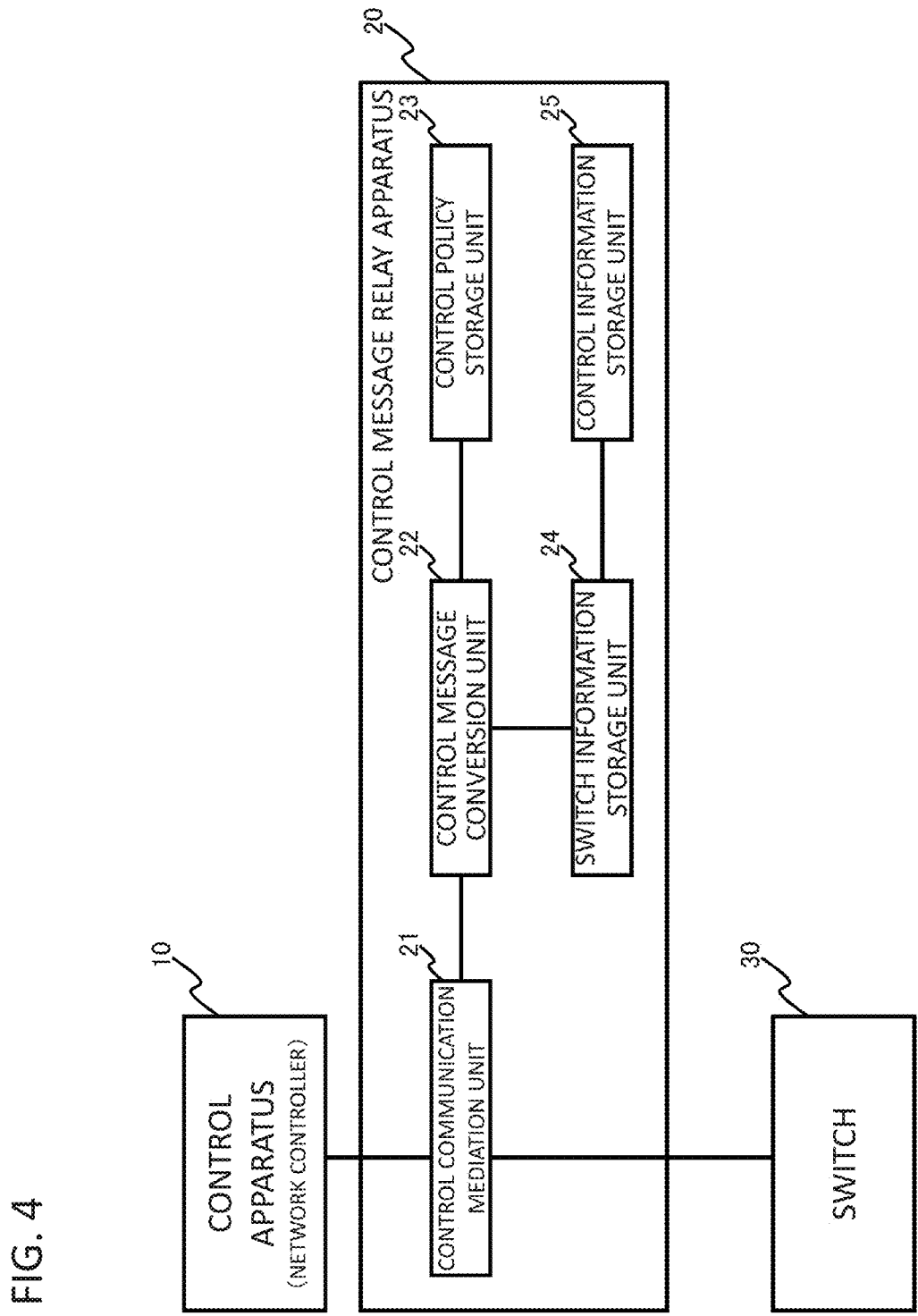
FIG. 4 illustrates a configuration of a control message relay apparatus according to a first exemplary embodiment of the present invention.

Next, a first exemplary embodiment of the present invention will be described in detail with reference to the drawings. FIG. 4 illustrates a configuration of a control message relay apparatus according to the first exemplary embodiment of the present invention. As illustrated in FIG. 4, the control message relay apparatus 20 is arranged between a control apparatus (hereinafter, a "network controller") 10 that determines and sets a network control policy in a switch 30 and the switch 30 that forwards packets based on instructions from the network controller 10.

The control message relay apparatus 20 includes a control communication mediation unit 21, a control message conversion unit 22, a control policy storage unit 23, a switch information storage unit 24, and a control information storage unit 25.

The control communication mediation unit 21 intercepts a control message between the network controller 10 and the switch 30 and transmits the control message to the control message conversion unit 22. In addition, the control communication mediation unit 21 transmits a control message determined by the control message conversion unit 22 to a target apparatus (the network controller 10 or the switch 30).

The control communication mediation unit 21 may intercept a control message by hooking a command. However, the interception method is not limited to such method. As long as the control communication mediation unit 21 can perform control communication with both the network controller 10 and the switch 30, the interception method may be realized by another method. For example, the control message relay apparatus 20 may temporarily serve as communication endpoints such as a load balancer or a cache server and intercept a control message. Namely, it is only necessary that the control message relay apparatus 20 have its own communication endpoints and perform control communication by using a combination of communications among its own communication endpoints and communication endpoints of the network controller 10 and the switch 30.

The control message conversion unit 22 corresponds to the above control information conversion unit. When receiving a control message from the control communication mediation unit 21, the control message conversion unit 22 refers to the control policy storage unit 23 and converts the control message. In addition, the control message conversion unit 22 transmits the control message to a target apparatus (the network controller 10 or the switch 30) via the control communication mediation unit 21.

When converting a control message, the control message conversion unit 22 can refer to not only the control policy storage unit 23 but also the switch information storage unit 24 and the control information storage unit 25.

When receiving a control message for establishing control communication between the network controller 10 and the switch 30 for the first time, the control message conversion unit 22 according to the present exemplary embodiment stores a correspondence relationship between the network controller 10 and the switch 30 in the switch information storage unit 24. The correspondence relationship between the network controller 10 and the switch 30 may be set in advance in the switch information storage unit 24.

The control policy storage unit 23 manages control message conversion rules (control policies). Examples of the conversion rules include a rule for rewriting a specified portion(s) in a certain control message or certain control information. For example, the control policy storage unit 23 may be realized as a module that performs input and output information corresponding to the conversion rules.

In the switch information storage unit 24, a correspondence relationship between the network controller 10 and the switch 30 is stored. In addition to the correspondence relationship, connection authority information between the network controller 10 and the switch 30 is stored in the switch information storage unit 24 according to the present exemplary embodiment.

While the switch information storage unit 24 holds the correspondence relationship between the network controller 10 and the switch 30, the control information storage unit 25 holds control information setting statuses recognized by the network controller 10 and the switch 30. For example, the control information storage unit 25 holds at least a group of items of control information that is instructed by the network controller 10 and additional information that is realized by flags or the like and that indicates statuses of the control information that is set in the switch 30.

Each unit (processing means) of the control message relay apparatus 20 illustrated in FIG. 4 may be realized by a computer program which causes a computer that constitutes the control message relay apparatus 20 to use its hardware and execute the corresponding processing described above.

Next, an operation of the control message relay apparatus 20 according to the present exemplary embodiment will be described in detail with reference to the drawings. First, a mediation operation performed when the control message relay apparatus 20 intercepts a control message for establishing control communication between the network controller 10 and the switch 30 (the control message which will hereinafter be referred to as a "control communication establishment message") will be described.

Figure 5:
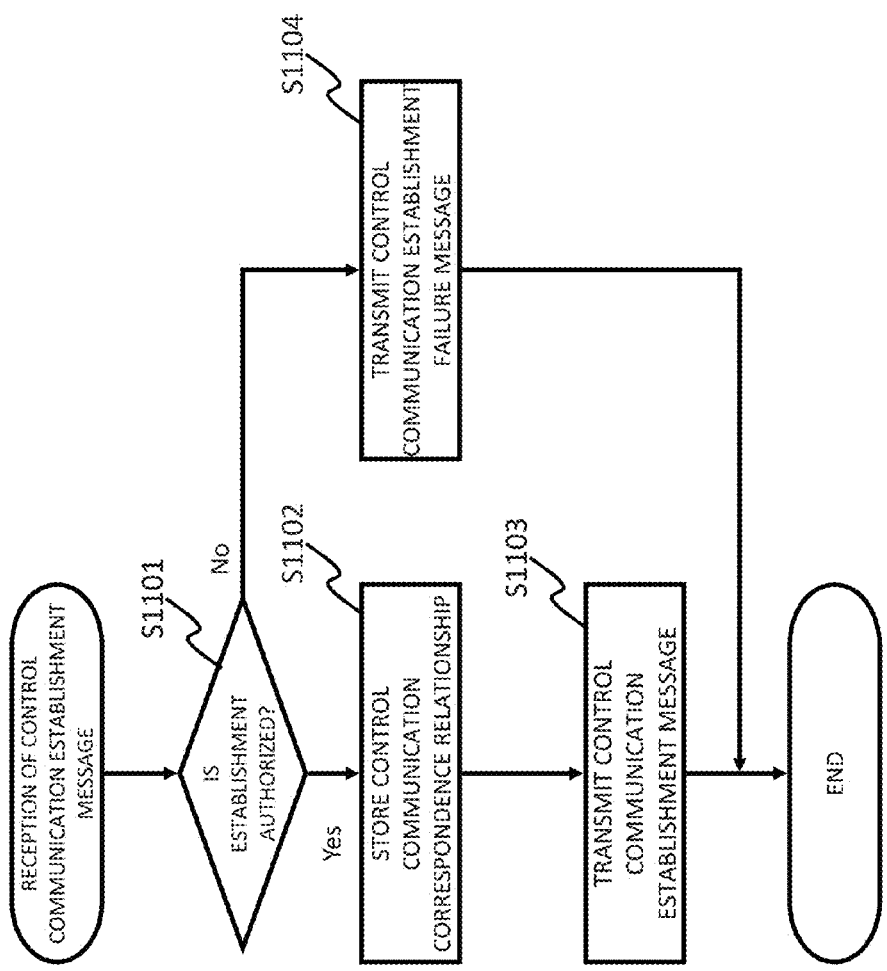
FIG. 5 is a flowchart illustrating an operation that the control message relay apparatus according to the first exemplary embodiment of the present invention performs (when receiving a control communication establishment message).

FIG. 5 is a flowchart illustrating an operation that the control message relay apparatus according to the first exemplary embodiment of the present invention performs (when receiving a control communication establishment message). This flow is started when the control message relay apparatus 20 intercepts a control communication establishment message issued from the network controller 10 or the switch 30.

When the control communication mediation unit 21 of the control message relay apparatus 20 intercepts a control communication establishment message issued from the network controller 10 or the switch 30, the control communication mediation unit 21 notifies the control message conversion unit 22 of the message. The control message conversion unit 22 refers to the control policy storage unit 23 and extracts a correspondence relationship rule between the network controller and the switch. In accordance with the correspondence relationship rule between the network controller and the switch, as needed, the control message conversion unit 22 refers to the switch information storage unit 24 and determines whether establishment of control communication between the network controller 10 and the switch 30 is authorized (step S1101 in FIG. 5).

Examples of the correspondence relationship rule between the network controller and the switch include a rule "communication between any network controller and any switch is authorized." As another example, correspondence relationships among network controllers and switches may be stored in advance in the switch information storage unit 24. In such case, the control message conversion unit 22 may refer to the switch information storage unit 24 and authorize only the communication between a network controller and a switch that have a correspondence relationship. As another example, correspondence relationships among network controllers and switches may also be stored in advance in the switch information storage unit 24. In such case, when the control message conversion unit 22 receives a control communication establishment request addressed to the control message relay apparatus 20, if the control message conversion unit 22 can determine a connection target by referring to the switch information storage unit 24, the control message conversion unit 22 may authorize the communication.

If establishment of control communication is authorized for the control communication establishment message (YES in step S1101 in FIG. 5), the control message conversion unit 22 of the control message relay apparatus 20 stores the connection relationship in the switch information storage unit 24. For example, if establishment of control communication has already been set, an enable flag or the like indicating that the connection relationship message has been authorized or enabled is stored (step S1102 in FIG. 5).

Based on the intercepted control communication establishment message, the control message conversion unit 22 of the control message relay apparatus 20 creates a new control communication establishment message for the establishment target and transmits the control communication establishment message to the establishment target via the control communication mediation unit 21 (step S1103 in FIG. 5).

Instead of creating a new control communication establishment message for the establishment target, the intercepted control communication establishment message issued from the network controller 10 or the switch 30 may directly be used. Alternatively, the control message conversion unit 22 may create a new message for establishing control communication between a corresponding establishment peer and the control message relay apparatus 20 and transmits the message to the corresponding establishment peer.

By performing the above control, the control message relay apparatus 20 can mediate control communication between the network controller 10 and the switch 30 as a mediator.

If establishment of control communication is not authorized for the control communication establishment message (NO in step S1101 in FIG. 5), the control message conversion unit 22 of the control message relay apparatus 20 creates and transmits a control communication establishment failure response message to the sender of the control communication establishment message via the control communication mediation unit 21. If the control message relay apparatus 20 is configured to give no response when establishment of control communication is failed, this step can be omitted (step S1104 in FIG. 5). By performing the above control, the control message relay apparatus 20 realizes the operation performed when establishment of control communication is failed.

Next, a mediation operation performed when the control message relay apparatus 20 according to the present exemplary embodiment intercepts a control message other than a message requesting establishment of control communication between the network controller 10 and the switch 30 will be described with reference to a flowchart in FIG. 6.

This flow is started when the control message relay apparatus 20 intercepts a control message (which will hereinafter be referred to as a "communication control message" as needed) other than a group of communication establishment request messages transmitted from the network controller 10 or the switch 30.

When the control communication mediation unit 21 of the control message relay apparatus 20 intercepts a communication control message issued from the network controller 10 or the switch 30, the control communication mediation unit 21 notifies the control message conversion unit 22 of the message. The control message conversion unit 22 refers to the switch information storage unit 24 and determines whether control communication has been established between the network controller 10 and the switch 30 (step S1201 in FIG. 6).

If control communication has already been established between the network controller 10 and the switch 30 (YES in step S1201 in FIG. 6), the control message conversion unit 22 refers to the control policy storage unit 23 and extracts an applicable conversion rule. Based on the conversion rule, the control message conversion unit 22 converts the communication control message or creates a new communication control message. In addition, in this operation, the control message conversion unit 22 updates control target control information or control information in the control information storage unit 25. If there is no conversion rule, the control message conversion unit 22 converts the communication control message into a message to be transmitted to the network controller 10 or the switch 30 (step S1202 in FIG. 6).

Figure 6:
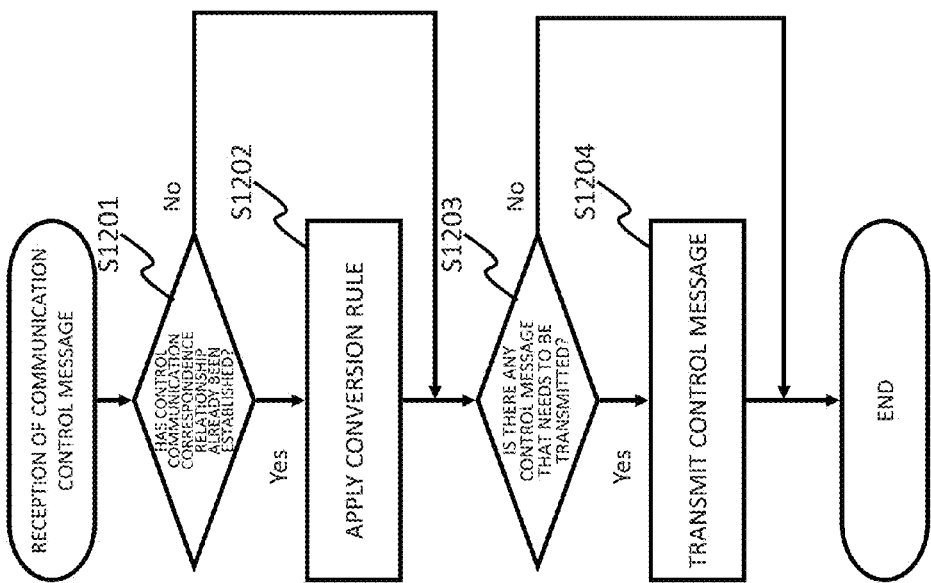
FIG. 6 is a flowchart illustrating an operation that the control message relay apparatus according to the first exemplary embodiment of the present invention performs (when receiving a communication control message).

If the control message conversion unit 22 creates a new communication control message or converts the communication control message based on the conversion rule (YES in step S1203 in FIG. 6), the control message conversion unit 22 transmits the created new communication control message to the destination target apparatus (step S1204 in FIG. 6).

By performing the above control, the control message relay apparatus 20 realizes control of virtualized switch resources based on a conversion rule.

If control communication has not been established between the network controller 10 and the switch 30 (NO in step S1201 in FIG. 6), the control message conversion unit 22 drops the intercepted communication control message so that the communication control message would not cause data flow through an unestablished communication path. In this way, the control message relay apparatus 20 realizes an operation between the network controller 10 and the switch 30 that are not initially connected to each other. In addition, if there is no message or no error response that needs to be transmitted (NO in step S1203 in FIG. 6), the control message conversion unit 22 ends the processing by simply dropping the communication control message.

According to the present exemplary embodiment in which the control message relay apparatus 20 is arranged as described above, the dependence of the network controller 10 on the switch is lowered. This is because, since the control message relay apparatus 20 virtualizes operations of the switch based on predetermined conversion rules, the switch operations independent of physical or protocol-related limitations of the switch are realized. Consequently, the network controller can be developed independently of the limitations of the switch.

In addition, according to the present exemplary embodiment, concentration of load on the network controller 10 can be reduced. This is because, since the network controller 10 views the control message relay apparatus 20 according to the present exemplary embodiment as a switch having virtualized resources, control of errors generated by physical limitations can be absorbed. Thus, the management amount of the network controller (the number of manageable switches, the number of flow entries, etc.) can be improved.

Specific Exemplary Embodiments

Next, more specific operations of the control message relay apparatus 20 according to the above first exemplary embodiment will be described. In the following specific examples, the OpenFlow protocol in Non-Patent Literature 2 is used for exchange of communication control messages. Thus, of all the control information setting control messages ("Flow-Mod" message in Non-Patent Literature 2), while the switch does not respond to an addition- or updating-related message, the switch responds to a removal-related message. It is clear that the switch can be configured to respond to an addition- or updating-related message by using a variation of a communication control conversion rule through acknowledgement.

First, conversion rule application processing performed when the control message relay apparatus 20 intercepts a control message other than a group of communication establishment request commands according to the first exemplary embodiment of the present invention will be described in detail (after step S1202 in the flowchart in FIG. 6). Next, operations performed when the control message relay apparatus 20 intercepts a control information operation (setting/removal) message issued from the network controller 10, a control information setting failure notification issued from the switch 30, a control information removal notification issued from the switch 30, and a control information setting request (query) issued from the switch 30, respectively, will be described.

In addition, the following description assumes that various flags can be set to indicate setting statuses of the control information that is received from the network controller 10 and that is stored in the control information storage unit 25 of the control message relay apparatus 20. Examples of the flags include: a set flag indicating that control information is set in the switch 30; a removing flag indicating that the switch 30 is being requested to remove control information in accordance with an instruction from the network controller 10; a removing-for-exchange flag indicating that the switch 30 is being requested to remove control information for exchange of control information; and a waiting-for-exchange flag indicating that control information is waiting to be set in the switch 30 for exchange of control information.

Specific Example 1 of Application of a Conversion Rule (Upon Receiving a Control Information Operation Message)

Figure 7:
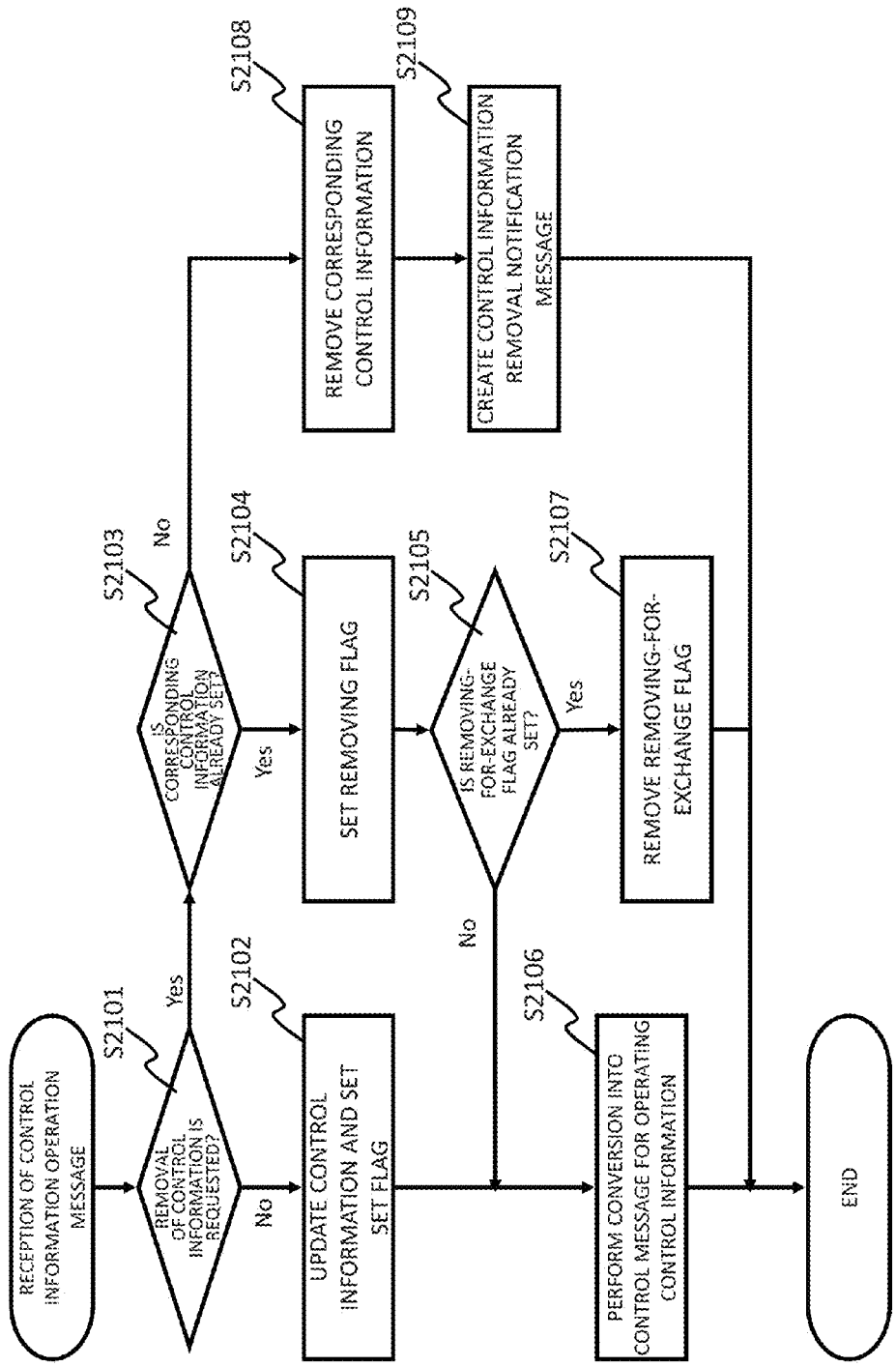
FIG. 7 is a flowchart illustrating an operation that the control message relay apparatus according to the first exemplary embodiment of the present invention performs (when receiving a control information operation message).

FIG. 7 is a flowchart illustrating a conversion rule that the control message relay apparatus 20 applies when receiving a control information operation message (the following description assumes that there are two kinds of control messages, one for setting control information and the other for removing control information). This flow is started when the control message relay apparatus 20 intercepts a message for operating (setting/removing) control information issued from the network controller 10. When the control communication mediation unit 21 of the control message relay apparatus 20 intercepts a control information operation message issued from the network controller 10, the control communication mediation unit 21 notifies the control message conversion unit 22 of the message. The control message conversion unit 22 refers to the control policy storage unit 23 and applies a conversion rule in accordance with the flow illustrated in FIG. 7.

The control message conversion unit 22 determines whether the control information operation message is a removal request (step S2101 in FIG. 7).

If the control information operation message is not a removal request (NO in step S2101 in FIG. 7), the control message conversion unit 22 registers and updates the control information written in the control information setting message in the control information storage unit 25 via the switch information storage unit 24. In this operation, the control message conversion unit 22 sets a set flag (step S2102 in FIG. 7).

Next, the control message conversion unit 22 converts the control information operation message into a control message for instructing the switch 30 to set the control information therein (step S2106 in FIG. 7). The control communication mediation unit 21 transmits the converted control information setting control message to the switch 30 (step S1204 in FIG. 6).

In contrast, if the intercepted control information operation message is a removal request (YES in step S2101 in FIG. 7), the control message conversion unit 22 acquires flag information about the control information written in the control information setting message from the control information storage unit 25 via the switch information storage unit 24. The control message conversion unit 22 determines whether a set flag is already set in the control information (step S2103 in FIG. 7).

If a set flag is already set (YES in step S2103 in FIG. 7), the control message conversion unit 22 determines that the corresponding control information has already been set in the switch 30. Thus, the control message relay apparatus 20 cancels the communication control. The control message conversion unit 22 marks the control information in the control information storage unit 25 with a removing flag (step S2104 in FIG. 7). In addition, the control message conversion unit 22 determines whether a removing-for-exchange flag is set in the corresponding control information. If a removing-for-exchange flag is set (YES in step S2105 in FIG. 7), the control message conversion unit 22 determines that a communication control message for removing the control information has already been issued to the switch 30. Thus, the control message conversion unit 22 removes the removing-for-exchange flag of the corresponding control information in the control information storage unit 25 (step S2107 in FIG. 7). If the control message conversion unit 22 determines that a removing-for-exchange flag is not set in the removal target control information in step S2105 (NO in step S2105 in FIG. 7), the control message conversion unit 22 converts the control information operation message into a control message for instructing the switch 30 to remove the control information (step S2106 in FIG. 7). Next, the control communication mediation unit 21 transmits the converted control information operation message to the switch 30 (step S1204 in FIG. 6).

In step S2103, if the control message conversion unit 22 determines that a set flag is not set (NO in step S2103 in FIG. 7), the control message conversion unit 22 determines that the corresponding control information is not set in the switch 30 for virtualization of resources and that the control message relay apparatus 20 is having the network controller 10 view as if the corresponding control information was set. Thus, the control message relay apparatus 20 does not need to perform any control on the switch 30. The control message conversion unit 22 removes the control information from the control information storage unit 25 (step S2108 in FIG. 7). Next, to notify the network controller 10 of the removal of the control information, the control message conversion unit 22 creates a control information removal notification message (step S2109 in FIG. 7). The control communication mediation unit 21 transmits the created control information removal notification message to the network controller 10 (step S1204 in FIG. 6).

By performing the above operation, the control message relay apparatus 20 stores the control information set and managed by the network controller 10 in the control information storage unit 25 and manages the request and setting statuses of the switch 30. In this way, the control message relay apparatus 20 can respond to communication control requests from the network controller 10 separately from actual control setting of the switch 30. In addition, viewed from the network controller 10, the switch can operate as a virtual switch having a virtualized CAM capacity.

Specific Example 2 of Application of a Conversion Rule (Upon Receiving a Control Information Setting Failure Notification)

Next, a specific example of a conversion rule that the control message relay apparatus 20 applies when receiving a control information setting failure notification from the switch 30 will be described with reference to FIG. 8. This flow is started when the control message relay apparatus 20 intercepts a control information setting failure notification message issued from the switch 30.

When the control communication mediation unit 21 of the control message relay apparatus 20 intercepts a control information setting failure notification message issued from the switch 30, the control communication mediation unit 21 notifies the control message conversion unit 22 of the message. The control message conversion unit 22 refers to the control policy storage unit 23 and applies a conversion rule in accordance with the flow illustrated in FIG. 8.

Figure 8:
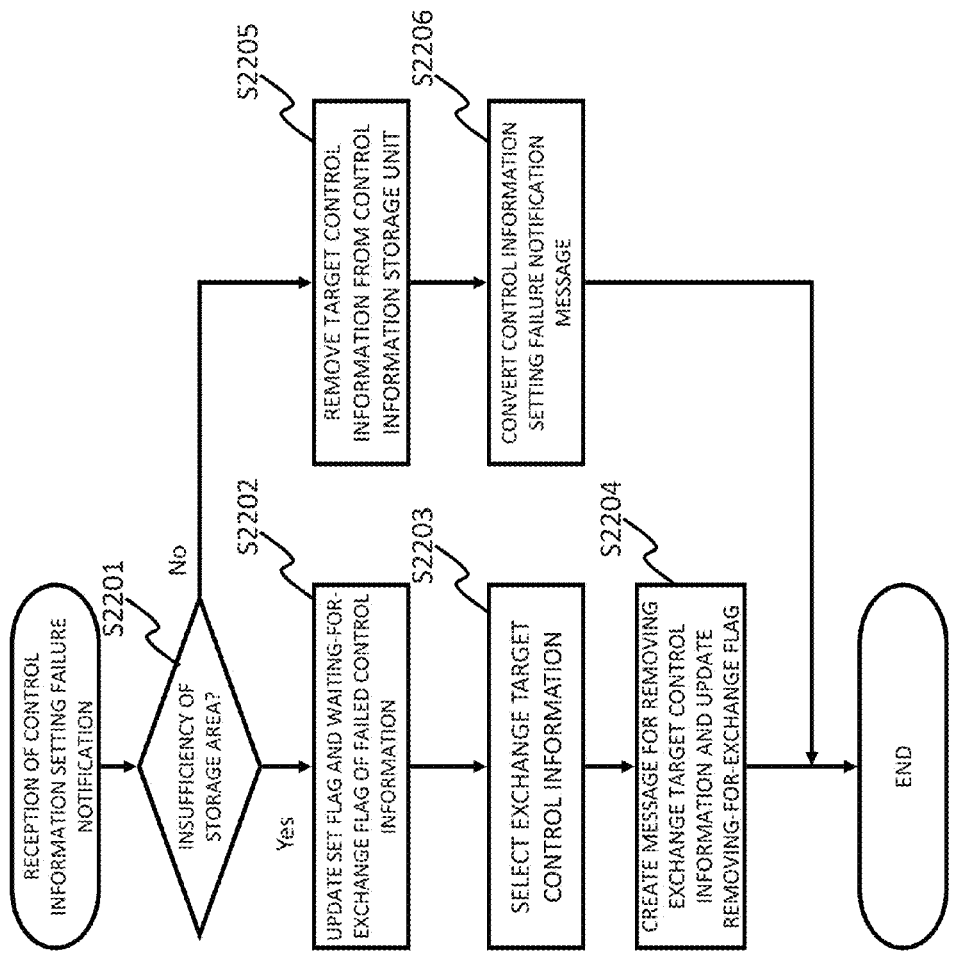
FIG. 8 is a flowchart illustrating an operation that the control message relay apparatus according to the first exemplary embodiment of the present invention performs (when receiving a control information setting failure notification).

First, the control message conversion unit 22 extracts the reason of the failure from the control information setting failure notification message (step S2201 in FIG. 8).

If the reason of the failure indicates insufficiency of the control information storage area in the switch 30 (YES in step S2201 in FIG. 8), the control message relay apparatus 20 starts processing for exchanging control information. In this way, the necessary control information can be set in the switch 30 without causing the network controller 10 to recognize the insufficiency of the CAM capacity. More specifically, the control message conversion unit 22 removes a set flag attached to the control information that corresponds to the control information setting failure notification message from the control information storage unit 25 and marks the control information with a waiting-for-exchange flag (step S2202 in FIG. 8).

Next, the control message conversion unit 22 extracts control information items which have a set flag but which do not have a removing flag and a removing-for-exchange flag from the control information storage unit 25. Among such control information entries, the control message conversion unit 22 selects an arbitrary control information entry other than the control information specified in the control information setting failure notification message (step S2203 in FIG. 8). In addition, the control message conversion unit 22 creates a control message instructing removal of the selected communication rule. Simultaneously, the control message conversion unit 22 marks the control information in the control information storage unit 25 with a removing-for-exchange flag (step S2204 in FIG. 8). The control communication mediation unit 21 transmits the created control message for removing the control information for exchange to the switch (step S1204 in FIG. 6).

The method for selecting the removal target control information is not limited. For example, a rule setting order or setting timing may be stored in advance. In this way, a rule set the earliest may be selected first. Alternatively, an expiration (expire) time may be set in each rule. In this way, a rule having the shortest or longest expiration time may be selected.

If the reason of the failure determined in step S2201 indicates a reason other than insufficiency of the control information storage area in the switch (NO in step S2201 in FIG. 8), processing beyond the realm of virtualization of the CAM capacity by the control message relay apparatus 20 is performed. However, since information updating or error notification is needed, the control message relay apparatus 20 performs the following processing. First, the control message conversion unit 22 removes the control information corresponding to the control information setting failure notification message from the control information storage unit 25 (step S2205 in FIG. 8). The control message conversion unit 22 converts the intercepted control information setting failure notification message into a message to be transmitted to the network controller 10 (step S2206 in FIG. 8). The control communication mediation unit 21 transmits the converted control information setting failure notification message to the network controller 10 (step S1204 in FIG. 6).

As described above, when receiving a control information setting failure notification, the control message relay apparatus 20 detects insufficiency of the CAM capacity of the switch 30 and replaces other control information with the necessary control information. In this way, the control message relay apparatus 20 can hide the capacity of the flow table (CAM) from the network controller 10.

Specific Example 3 of Application of a Conversion Rule (Upon Receiving a Control Information Removal Notification)

Next, a specific example of a conversion rule that the control message relay apparatus 20 applies when receiving a control information removal notification from the switch 30 will be described with reference to FIG. 9. This flow is started when the control message relay apparatus 20 intercepts a control information removal notification message issued from the switch 30.

When the control communication mediation unit 21 of the control message relay apparatus 20 intercepts a control information removal notification message issued from the switch 30, the control communication mediation unit 21 notifies the control message conversion unit 22 of the message. The control message conversion unit 22 refers to the control policy storage unit 23 and applies a conversion rule in accordance with the flow illustrated in FIG. 9.

The control message conversion unit 22 refers to the control information removal notification message and determines whether the corresponding control information has been removed in response to a control information removal request from the network controller 10. If the corresponding control information has been removed in response to a removal request from the network controller 10, the control message conversion unit 22 refers to the control information storage unit 25 via the switch information storage unit 24 and determines whether the control information corresponding to the control information removal notification message is marked with a removing-for-exchange flag (step S2301 in FIG. 9).

If the control information removal notification message has been issued in response to a removal request and if the removal target control information is marked with a removing-for-exchange flag (YES in step S2301 in FIG. 9), the control message relay apparatus 20 determines that the message is a notification of completion of removal of control information that has been removed for exchange. Thus, the control message relay apparatus 20 does not need to transmit any message to the network controller 10. The control message conversion unit 22 removes the set flag and the removing-for-exchange flag attached to the control information from the control information storage unit 25 (step S2302 in FIG. 9).

If the control information removal notification message has not been issued in response to a removal request (for example, if the control information removal notification message has been issued in response to time-out of control information in the switch 30) or if a removing-for-exchange flag is not set in the removal target control information (NO in step S2301 in FIG. 9), the control message relay apparatus 20 determines that the message is a notification of voluntary control cancellation from the switch 30 or a removal response based on an explicit removal request from the network controller 10. Thus, the control message relay apparatus 20 needs to remove the corresponding control information stored therein and notify the network controller 10 of completion of the removal. The control message conversion unit 22 removes the control information corresponding to the control information removal notification message from the control information storage unit 25 (step S2303 in FIG. 9). In addition, the control message conversion unit 22 converts the control information removal notification message into a message to be transmitted to the network controller 10 (step S2304 in FIG. 9). The control communication mediation unit 21 transmits the converted control information setting removal notification message to the network controller 10 (step S1204 in FIG. 6).

Next, since the network control message relay apparatus 20 has been notified of the removal of the control information in the switch 30, the network control message relay apparatus 20 sets control information that has been waiting for CAM space to be available after reception of a setting instruction from the network controller 10. The control message conversion unit 22 refers to the control information storage unit 25 and determines whether control information having a waiting-for-exchange flag exists (step S2305 in FIG. 9). If control information having a waiting-for-exchange flag exists (YES in step S2305 in FIG. 9), the control message conversion unit 22 selects any one of the control information entries having a waiting-for-exchange flag (step S2306 in FIG. 9). Based on the selected control information having a waiting-for-exchange flag, the control message conversion unit 22 creates a control information setting control message for setting communication control in the switch 30. The control message conversion unit 22 refers to the control information storage unit 25 and marks the waiting control information with a set flag and removes the waiting-for-exchange flag from the control information (step S2307 in FIG. 9). The control communication mediation unit 21 transmits the created control information setting control message to the network controller 10 (step S1204 in FIG. 6).

By performing the above operation, the control message relay apparatus 20 can determine whether removal of control information in the switch 30 has been made as active removal for replacement with other control information (YES in step S2301) or passive removal based on, for example, a rule removal setting or expiration of validity of a rule (NO in step S2301). In addition, the control message relay apparatus 20 can hold information necessary for switch virtualization therein and remove unnecessary removal information, for example. In addition, if the control message relay apparatus 20 receives a notification of removal of control information that is not related to virtualization (NO in step S2301), the control message relay apparatus 20 transmits a control information setting removal notification message to the network controller 10. In this way, the network controller 10 can be notified of completion of removal of the control information. In addition, when notified of such removal of control information, the control message relay apparatus 20 can set control information having a waiting-for-exchange flag in the switch 30.

Specific Example 4 of Application of a Conversion Rule (Upon Receiving a Control Information Setting Request)

Next, a specific example of a conversion rule that the control message relay apparatus 20 applies when receiving a control information setting request from the switch 30 will be described with reference to FIG. 10. This flow is started when the control message relay apparatus 20 intercepts a control information setting request message issued from the switch 30. For example, the communication setting request message may be transmitted in the form of notification of a packet that does not match a rule, such as a Packet-In message of the OpenFlow protocol in Non-Patent Literature 2.

When the control communication mediation unit 21 of the control message relay apparatus 20 intercepts a control information setting request message issued from the switch 30, the control communication mediation unit 21 notifies the control message conversion unit 22 of the message. The control message conversion unit 22 refers to the control policy storage unit 23 and applies a conversion rule in accordance with the flow illustrated in FIG. 10.

Figure 10:
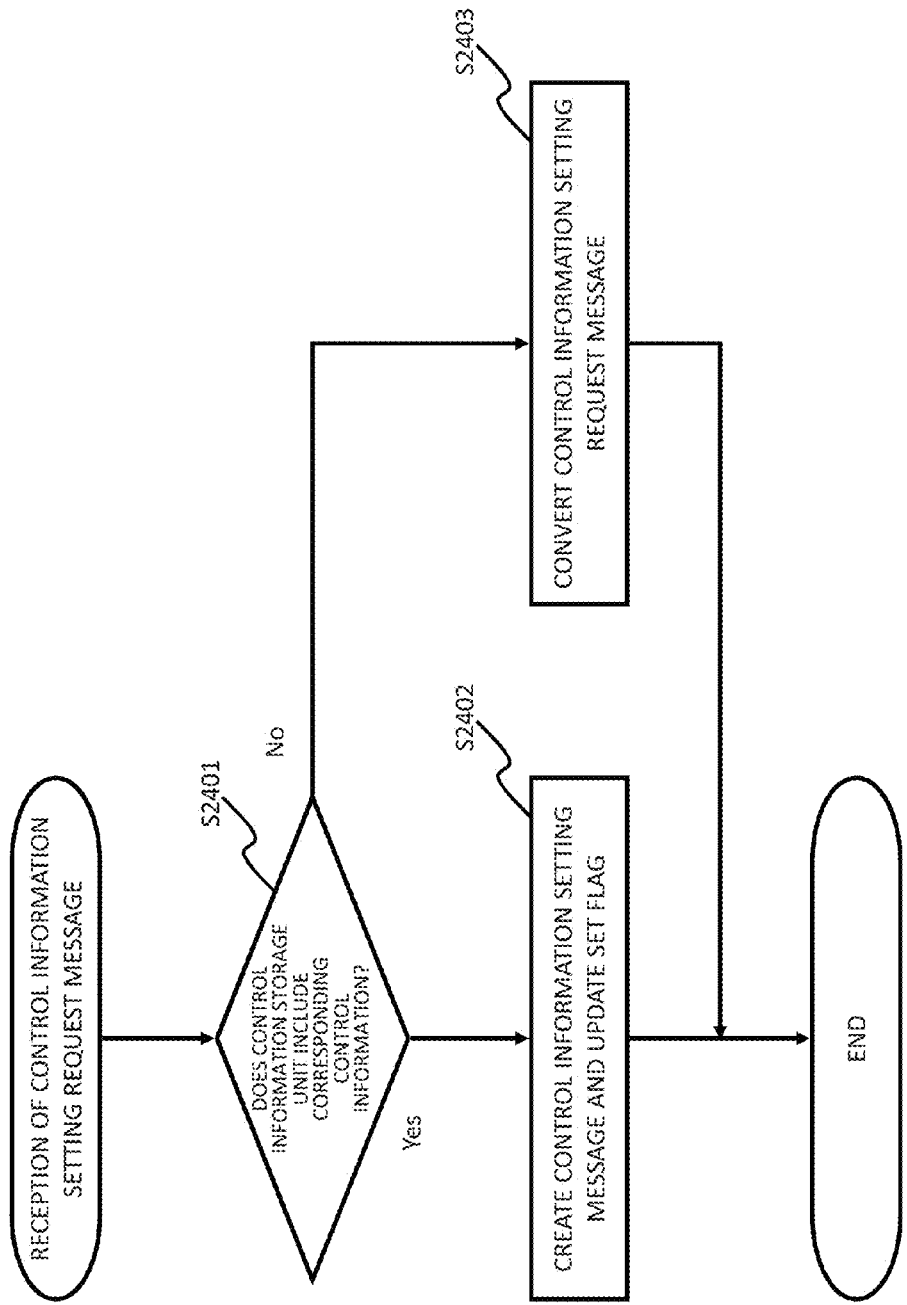
FIG. 10 is a flowchart illustrating an operation that the control message relay apparatus according to the first exemplary embodiment of the present invention performs (when receiving a control information setting request message).

The control message conversion unit 22 refers to the control information storage unit 25 via the switch information storage unit 24 and determines whether control information that matches the control information setting request message exists (step S2401 in FIG. 10).

If control information that matches the control information setting request message exists (YES in step S2401 in FIG. 10), the control message conversion unit 22 creates, based on the control information, a control message for setting the control information in the switch 30. In addition, the control message conversion unit 22 marks the control information in the control information storage unit 25 with a set flag (step S2402 in FIG. 10). Next, the control communication mediation unit 21 transmits the created control information setting control message to the switch 30 (step S1204 in FIG. 6).

In contrast, if control information that matches the control information setting request message does not exist (NO in step S2401 in FIG. 10), the control message conversion unit 22 converts the control information setting request message into a control message to be transmitted to the controller 10 (step S2403 in FIG. 10). The control communication mediation unit 21 transmits the converted communication setting query message to the switch 30 (step S1204 in FIG. 6).

Through the above operation, when receiving an unknown packet from the switch 30, the control message relay apparatus 20 sets control information being virtualized therein (control information having a waiting-for-exchange flag) or transmits a query to the network controller 10 for new control information to be set. In this way, the switch 30 can recognize presence of the network controller 10, and the control message relay apparatus 20 is prevented from requesting the network controller for control information that has already been stored in the control message relay apparatus 20 for virtualization.

Next, the above series of operations will be described along with statuses of the control information storage units of the control message relay apparatus 20 and the switch 30 with reference to FIGS. 11 to 24.

In addition, for simplicity, the following description will be made assuming that the number of control information entries that the switch 30 can store in its control information storage unit is two. In addition, while communication such as TCP (Transmission Control Protocol) communication is basically performed bidirectionally, the following description will be made without awareness of such bidirectionality. For example, the following description will be made assuming that one of the bidirectional control channels is formed by another path and that the switch 30 does not receive a response from a communication target node.

In addition, in FIGS. 11 to 24, the flow of a message is indicated by a thick arrow, and a content of a flowing message is indicated at the bottom of the figure of the switch or the like. In addition, a simplified version of the control information storage unit 25 of the control message relay apparatus 20 and a simplified version of the control information storage unit (flow table) of the switch 30 are illustrated on the right side of each of FIGS. 11 to 24. Each of the control information storage units (flow tables) has a Rule field in which control information can be stored. In the Rule field, a Match field storing match conditions is associated with an Action field indicating a processing content(s) applied to packets that match the match conditions. In addition, "SRC" represents a source IP address and "DST" represents a destination IP address.

Various flags are indicated under Info-Marking in the control information storage unit 25 of the control message relay apparatus 20. For example, "Set" represents a set flag, and "Rem" represents a removing flag. In addition, "Exch" represents a removing-for-exchange flag, and "Wait" represents a waiting-for-exchange flag. In addition, instead of being simply represented by a marking, each flag is represented by a sequential number so that the setting order, the waiting order, etc. are determined.

In an initial state, each apparatus does not hold any communication-related information. To be controlled by the network controller 10, the switch 30 issues a control communication establishment message. The control message relay apparatus 20 intercepts the control communication establishment message. The control message conversion unit 22 of the control message relay apparatus 20 determines whether establishment of control communication with the network controller 10 is authorized from the communication establishment message (step S1101 in FIG. 5). This example assumes that communication between the switch 30 and the network controller 10 is not restricted. Thus, the control message conversion unit 22 determines that the establishment is authorized. The control message conversion unit 22 stores a connection relationship between the switch 30 and the network controller 10 in the switch information storage unit 24 (step S1102 in FIG. 5). Next, the control message conversion unit 22 determines to directly use the communication establishment message as a control communication establishment message for the establishment target and transmits the message to the network controller 10 (step S1103 in FIG. 5). The control message conversion unit 22 processes a communication establishment message from the network controller 10 in the same way and transmits the message to the switch 30. However, since the control message conversion unit 22 has already stored the corresponding connection relationship in the switch information storage unit 24, the control message conversion unit 22 does not need to register a new connection relationship.

Figure 11:
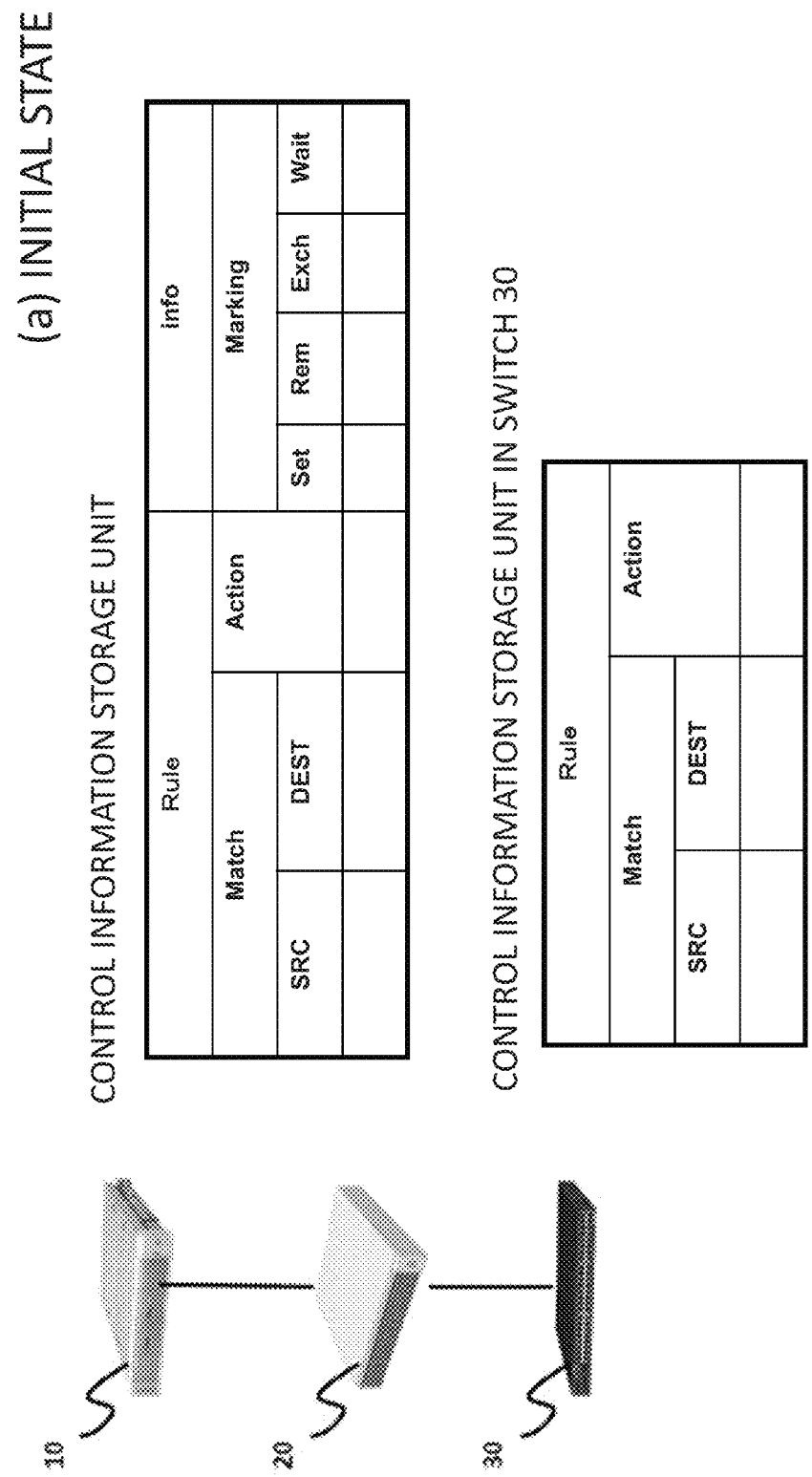
FIG. 11 illustrates a specific example of an operation performed by the control message relay apparatus according to the first exemplary embodiment of the present invention.
Figure 12:
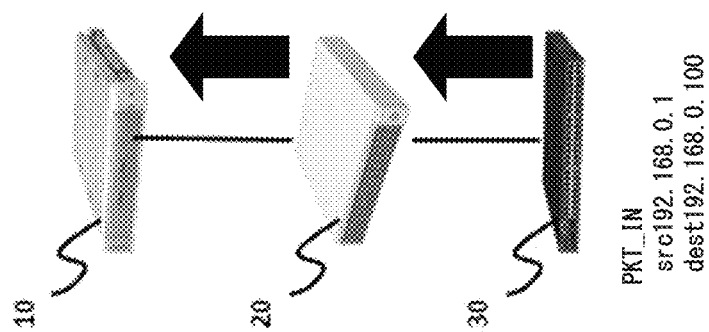
FIG. 12 is a diagram that follows FIG. 11.
Figure 13:
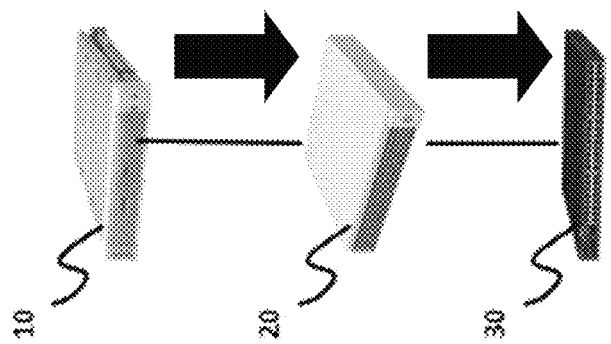
FIG. 13 is a diagram that follows FIG. 12.

FIG. 11 illustrates a state in which a control channel has been established between the switch 30 and the network controller 10. In this state, the control information storage unit 25 of the control message relay apparatus 20 does not hold any data. Likewise, no data is set in the control information storage unit of the switch 30.

First, the switch 30 receives a communication addressed to 192.168.0.100 from 192.168.0.1. The switch 30 transmits a control information setting request message to the network controller 10 (an arrow between the switch 30 and the control message relay apparatus 20 in FIG. 12). The control message relay apparatus 20 intercepts the control information setting request message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 10 (step S1202 in FIG. 6).

At this point, since the control information storage unit 25 does not include control information that matches the control information setting request message (step S2401 in FIG. 10), the control message relay apparatus 20 converts the control information setting request message into a control message to be transmitted to the network controller 10 (step S2402 in FIG. 10). The control communication mediation unit 21 transmits the converted control information setting request message to the switch 30 (YES in step S1203 in FIG. 6 and step S1204 in FIG. 6). In this way, the control message relay apparatus 20 transmits the control information setting request message to the network controller 10 (an arrow between the control message relay apparatus 20 and the network controller 10 in FIG. 12).

When receiving the control information setting request message, the network controller 10 creates control information to be set in the switch 30. The following description will be made assuming that the network controller 10 has created control information for outputting corresponding packets via Port 1. The network controller 10 transmits the control information setting control message for outputting the communication from 192.168.0.1 to 192.168.0.100 via Port 1 to the switch 30 (an arrow between the network controller 10 and the control message relay apparatus 20 in FIG. 13). The control message relay apparatus 20 intercepts the control information setting control message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow in FIG. 10 (step S1202 in FIG. 6).

Since the control information operation message does not instruct removal of control information (NO in step S2101 in FIG. 7), the control message conversion unit 22 stores the control information in the control information storage unit 25 (see the control information storage unit in FIG. 13) and marks the control information with a set flag (step S2102 in FIG. 7). In addition, the control message conversion unit 22 converts this control information setting control message into a message to be outputted to the switch 30 (step S2106 in FIG. 7). The control communication mediation unit 21 transmits the converted control information setting message to the switch 30 (YES in step S1203 in FIG. 6 and step S1204 in FIG. 6). In this way, the control message relay apparatus 20 transmits a message in response to the control information setting request to the network controller 10 (an arrow between the control message relay apparatus 20 and the switch 30 in FIG. 13). The switch 30 stores the control information forwarded by the control message relay apparatus 20 in the control information storage unit of the switch 30 (see the control information storage unit of the switch 30 in FIG. 13) and starts packet forwarding.

Figure 14:
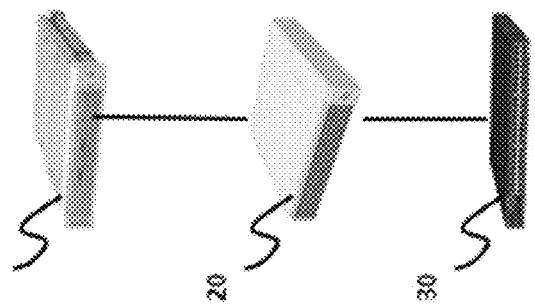
FIG. 14 is a diagram that follows FIG. 13.

Likewise, if the switch 30 receives another communication, for example, a communication addressed to 192.168.0.101 from 192.168.0.1, the network controller 10 sets control information for instructing forwarding of corresponding packets via Port 2. In addition, the control message relay apparatus 20 stores the control information in the control information storage unit 25, and the switch 30 also stores the control information in its control information storage unit. This state is illustrated in FIG. 14.

Next, if the switch 30 receives another communication, for example, a communication addressed to 192.168.0.102 from 192.168.0.1, the network controller 10 sets control information for forwarding corresponding packets via Port 3.

Figure 15:
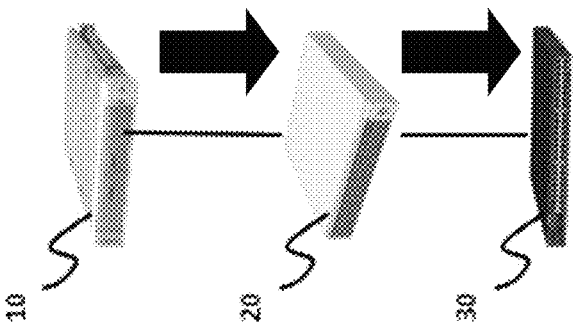
FIG. 15 is a diagram that follows FIG. 14.

The network controller 10 issues the control information setting control message to the switch 30 (an arrow between the network controller 10 and the control message relay apparatus 20 in FIG. 15). The control message relay apparatus 20 intercepts the control information setting message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 10 (step S1202 in FIG. 6).

Since the control information operation message does not instruct removal of control information (NO in step S2101 in FIG. 7), the control message conversion unit 22 stores the control information in the control information storage unit 25 (see the (upper) control information storage unit in FIG. 15) and marks the control information with a set flag (step S2102 in FIG. 7). In addition, the control message conversion unit 22 converts the control information setting message into a control message to be outputted to the switch 30 (step S2106 in FIG. 7). The control communication mediation unit 21 transmits the converted control information setting message to the switch 30 (YES in step S1203 in FIG. 6 and step S1204 in FIG. 6). In this way, the control message relay apparatus 20 forwards the control information setting control message from the network controller 10 (an arrow between the control message relay apparatus 20 and the switch 30 in FIG. 15). However, since the control information storage unit of the switch 30 is already full, the control information cannot be set.

Figure 16:
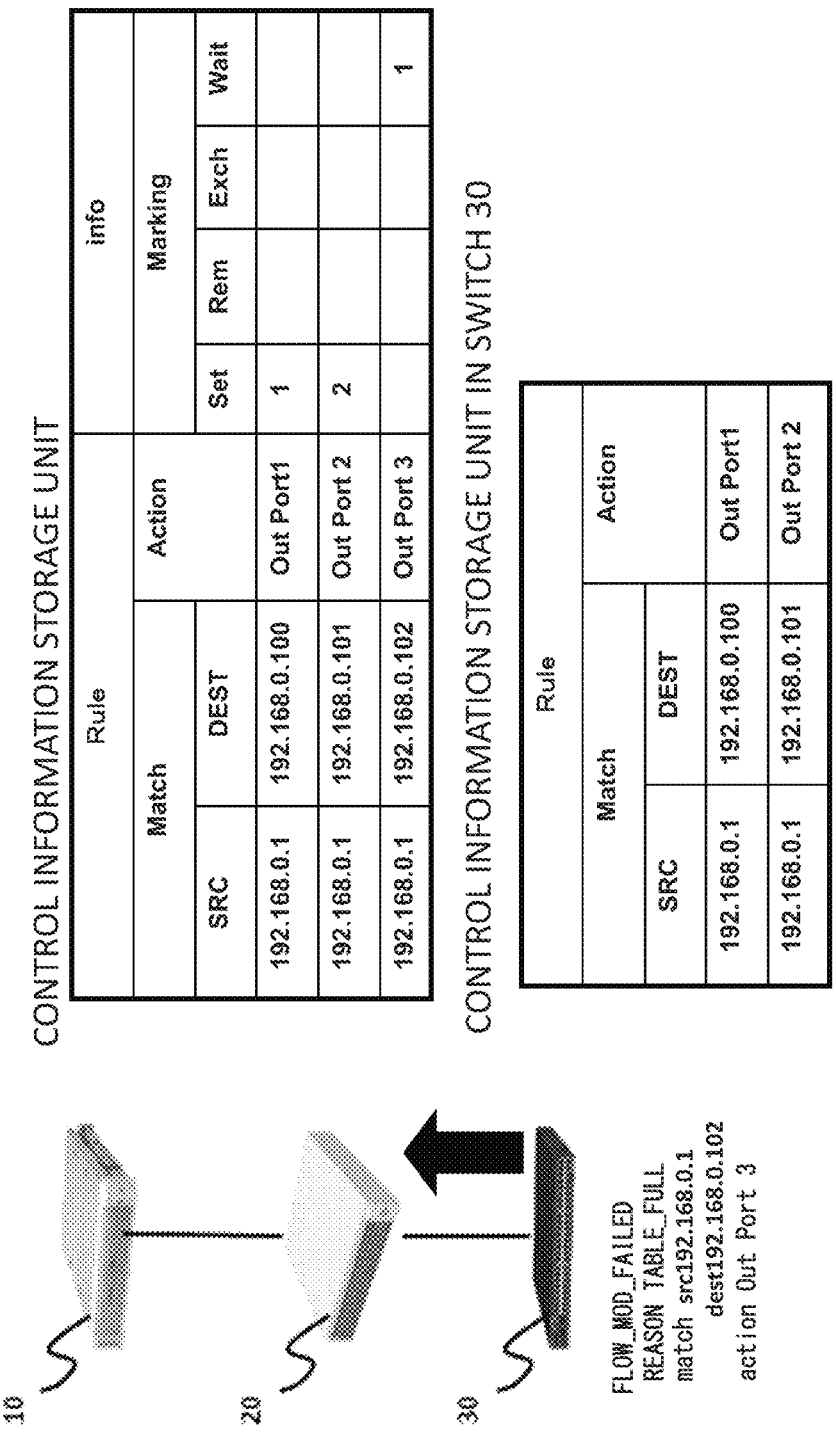
FIG. 16 is a diagram that follows FIG. 15.
Figure 17:
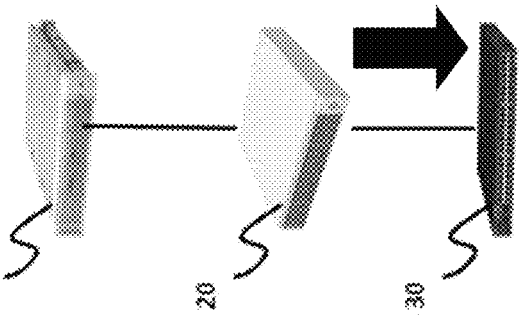
FIG. 17 is a diagram that follows FIG. 16.

The switch 30 issues a control information setting failure notification message to the network controller 10, notifying that there is no space in the control information storage unit and the control information cannot be set (an arrow between the control message relay apparatus 20 and the switch 30 in FIG. 16). This control information setting failure notification message indicates insufficiency of the storage area as the reason of the failure.

The control message relay apparatus 20 intercepts the control information setting failure notification message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 8 (step S1202 in FIG. 6).

Since the reason of the control information setting failure is insufficiency of the storage area (YES in step S2201 in FIG. 8), the control message conversion unit 22 removes the set flag attached to the control information that could not be set and marks the control information with a waiting-for-exchange flag (step S2202 in FIG. 8 and a "Set" flag" and a "Wait" flag in the (upper) control information storage unit in FIG. 16).

Next, the control message relay apparatus 20 starts to perform control information exchange processing. In this way, the control message relay apparatus 20 hides the control failure because of the insufficiency of the rule table area from the controller 10 and performs the required communication setting on the switch 30. The control message conversion unit 22 of the control message relay apparatus 20 refers to the control information storage unit 25 and selects exchange target control information. At this point, since the communication from 192.168.0.1 to 192.168.0.100 is the oldest, the control message conversion unit 22 selects the corresponding control information (step S2203 in FIG. 8). For the switch 30, the control message conversion unit 22 creates a control information removal control message for removing the control information. The control message conversion unit 22 marks the control information in the control information storage unit 25 with a removing-for-exchange flag (see step S2204 in FIG. 8 and an "Exch" flag in the (upper) control information storage unit in FIG. 17). The control communication mediation unit 21 transmits the created control information removal control message to the switch 30 (YES in step S1203 in FIG. 6 and step S1204 in FIG. 6 and an arrow between the control message relay apparatus 20 and the switch 30 in FIG. 17).

Figure 18:
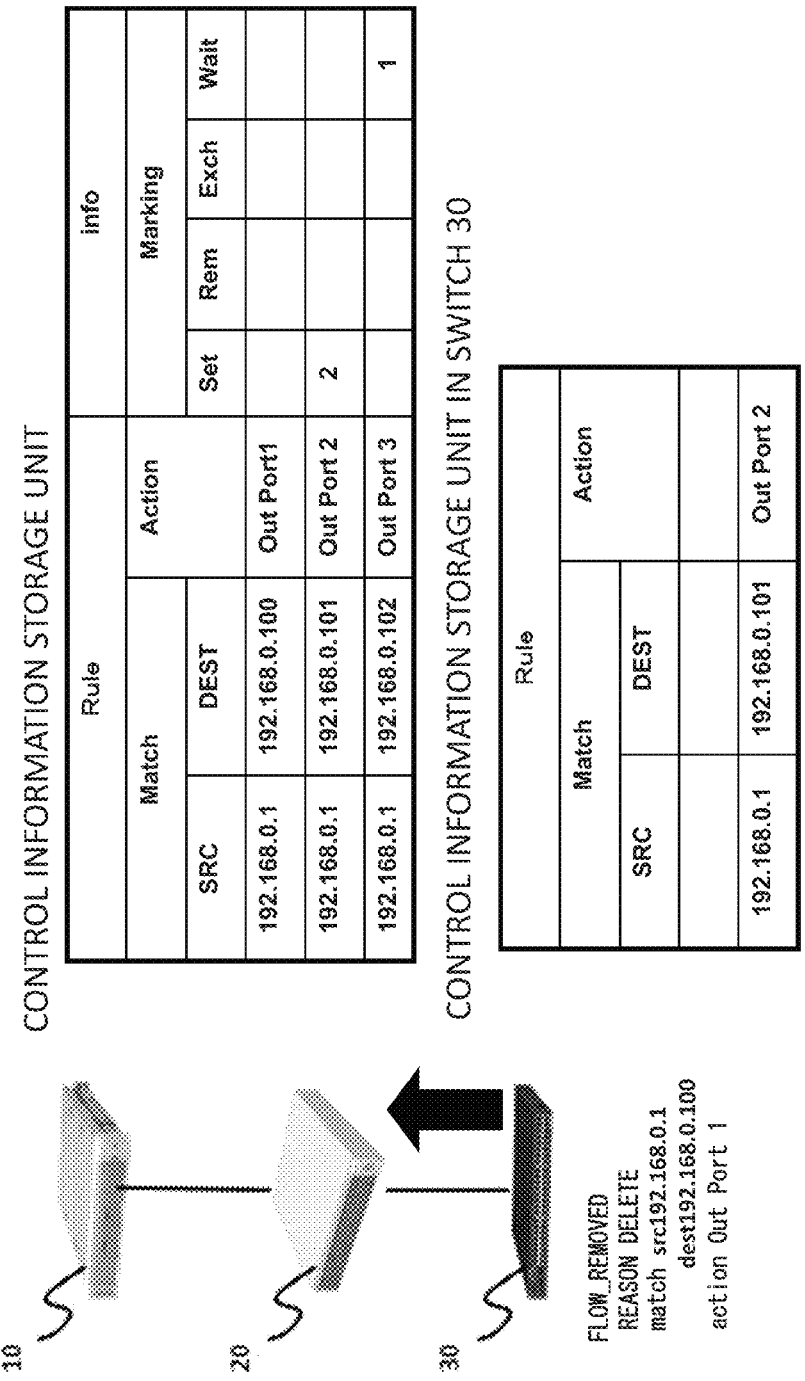
FIG. 18 is a diagram that follows FIG. 17.
Figure 19:
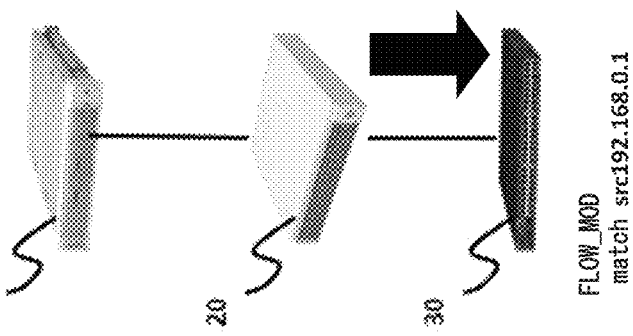
FIG. 19 is a diagram that follows FIG. 18.

When receiving the control information removal control message, the switch 30 removes the corresponding control information from its own control information storage unit (removes the upper entry from the control information storage unit of the switch 30 in FIG. 18). The switch 30 notifies the network controller 10 of the removal of the control information by issuing a control information removal notification message (an arrow between the switch 30 and the control message relay apparatus 20 in FIG. 18).

The control message relay apparatus 20 intercepts the control information removal notification message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 9 (step S1202 in FIG. 6).

From the control information removal notification message, the control message conversion unit 22 determines that the control information has been removed in response to a removal request. In addition, the control message conversion unit 22 refers to the control information storage unit 25 and determines that the removal target control information is marked with a removing-for-exchange flag, namely, determines that the removal target control information is about to be removed for exchange of control information (YES in step S2301 in FIG. 9). From the control information storage unit 25, the control message conversion unit 22 removes the removing-for-exchange flag and set flag from the control information (see step S2302 in FIG. 9 and "Set" and "Exch" flags in the (upper) control information storage unit in FIG. 18).

The control message conversion unit 22 refers to the control information storage unit 25 and determines whether there is any control information waiting to be set. As illustrated in FIG. 18, from the "Wait" flag, the control message conversion unit 22 finds that the communication from 192.168.0.1 to 192.168.0.102 is waiting to be set (YES in step S2305 in FIG. 9). From the found information, the control message conversion unit 22 selects a control information entry having a waiting-for-exchange flag. At this point, since there is only one control information entry having a waiting-for-exchange flag, the control message conversion unit 22 selects this control information entry (step S2306 in FIG. 9). From the control information for the communication addressed to 192.168.0.102 from 192.168.0.1, the control message conversion unit 22 creates a control message for setting the control information in the switch 30. In addition, the control message conversion unit 22 marks the control information in the control information storage unit 25 with a set flag and removes the waiting-for-exchange flag (see step S2307 in FIG. 9 and see the "Set" flag and the removed "Exch" flag in the (upper) control information storage unit in FIG. 19). The control communication mediation unit 21 transmits the created control information setting control message to the switch 30 (YES in step S1203 in FIG. 6 and step S1204 in FIG. 6 and an arrow between the control message relay apparatus 20 and the switch 30 in FIG. 19). The switch 30 sets the control information and starts forwarding the communication from 192.168.0.1 to 192.168.0.102 via Port 3 (see the control information storage unit of the switch 30 in FIG. 19).

Since the control message relay apparatus 20 performs the above operation, the network controller 10 views that the three control information entries have been set and does not recognize the insufficiency of the CAM. In addition, while the control message relay apparatus 20 exchanges control information, the switch 30 views as if the network controller 10 exchanged control information. Consequently, control information needed by the switch 30 can be set.

Figure 20:
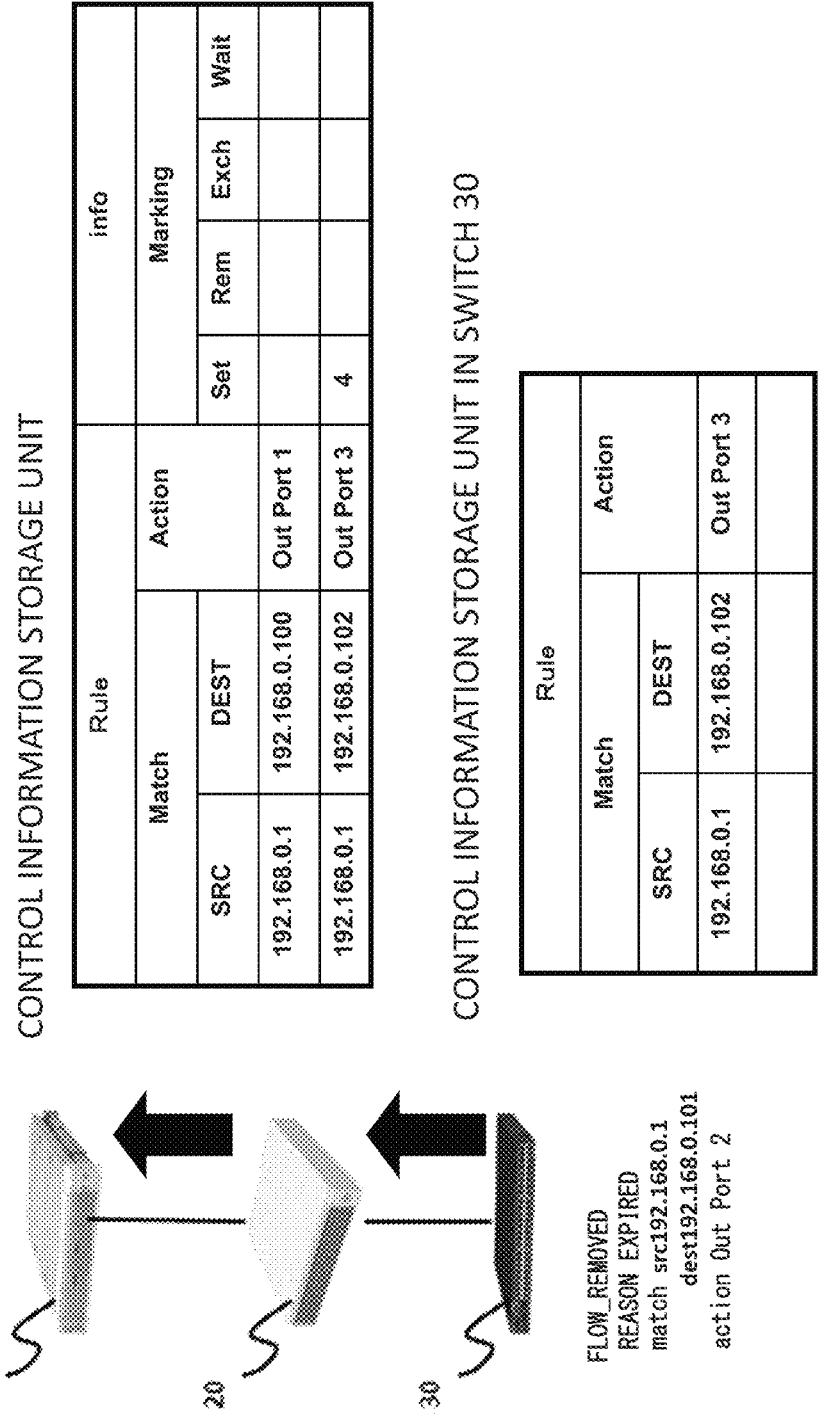
FIG. 20 is a diagram that follows FIG. 19.

Next, an operation performed when the validity period of control information set in the switch 30 expires will be described. After control information is set, if a predetermine period of time elapses (hard timeout) or if the switch 30 has not received a packet matching the control information for a predetermined period of time or more (idle timeout), the switch 30 removes the control information from the control information storage unit (removes the lower entry from the control information storage unit of the switch 30 in FIG. 20). In addition, to notify the network controller 10 of the removal of the control information, the switch 30 creates and transmits a control information removal notification message (an arrow between the control message relay apparatus 20 and the switch 30 in FIG. 20). This example assumes that the reason of the removal (for example, "EXPIRED" or the like, as illustrated in FIG. 20) is written in the control information removal notification message.

The control message relay apparatus 20 intercepts the control information removal notification message including the above reason. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 9 (step S1202 in FIG. 6).

Figure 9:
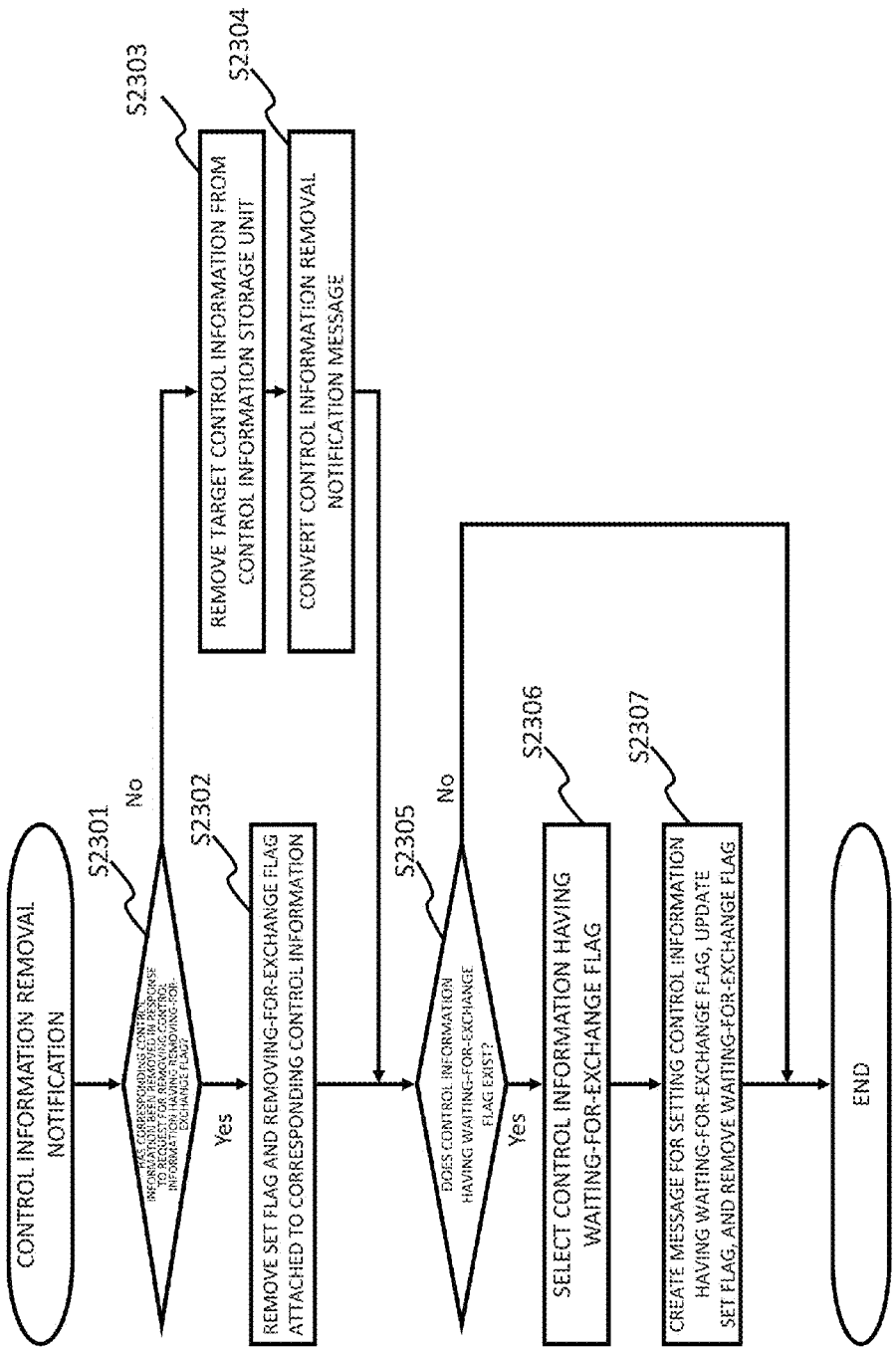
FIG. 9 is a flowchart illustrating an operation that the control message relay apparatus according to the first exemplary embodiment of the present invention performs (when receiving a control information removal notification).

Since the control information removal notification message has not been issued in response to a removal request (NO in step S2301 in FIG. 9), the control message conversion unit 22 removes the control information corresponding to the control information removal notification message from the control information storage unit 25 (see step S2303 in FIG. 9 and the control information storage unit of the switch 30). Next, the control message conversion unit 22 converts the control information removal notification message into a message to be transmitted to the network controller 10 (step S2304 in FIG. 9). Next, the control message conversion unit 22 refers to the control information storage unit 25 and searches for control information having a waiting-for-exchange flag (step S2305 in FIG. 9). Since such control information does not exist at this point (NO in step S2305 in FIG. 9), the application of the conversion rule performed when the control message relay apparatus 20 receives a control information removal notification message is ended. The control communication mediation unit 21 transmits the converted control information removal notification message to the network controller 10 (YES in step S1203 in FIG. 6 and step S1204 in FIG. 6 and an arrow between the control message relay apparatus 20 and the network controller 10 in FIG. 20). The switch 30 continues to forward the packets from 192.168.0.1 to 192.168.0.102 via Port 3 (see the control information storage unit of the switch 30 in FIG. 20).

By performing the above operation, the control message relay apparatus 20 detects expiration of the validity period of control information stored in the switch 30, updates information therein, and transmits necessary information to the network controller 10.

Figure 21:
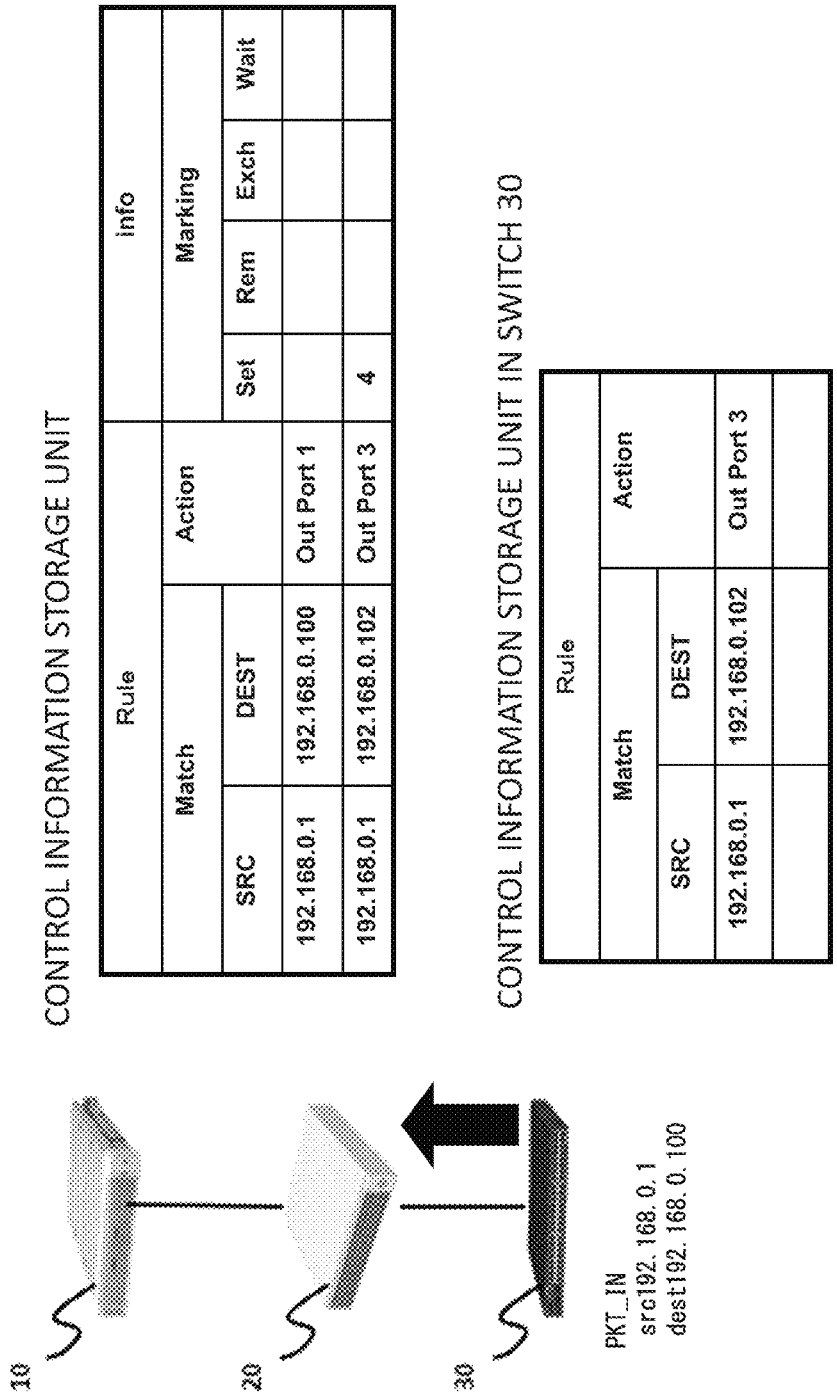
FIG. 21 is a diagram that follows FIG. 20.
Figure 22:
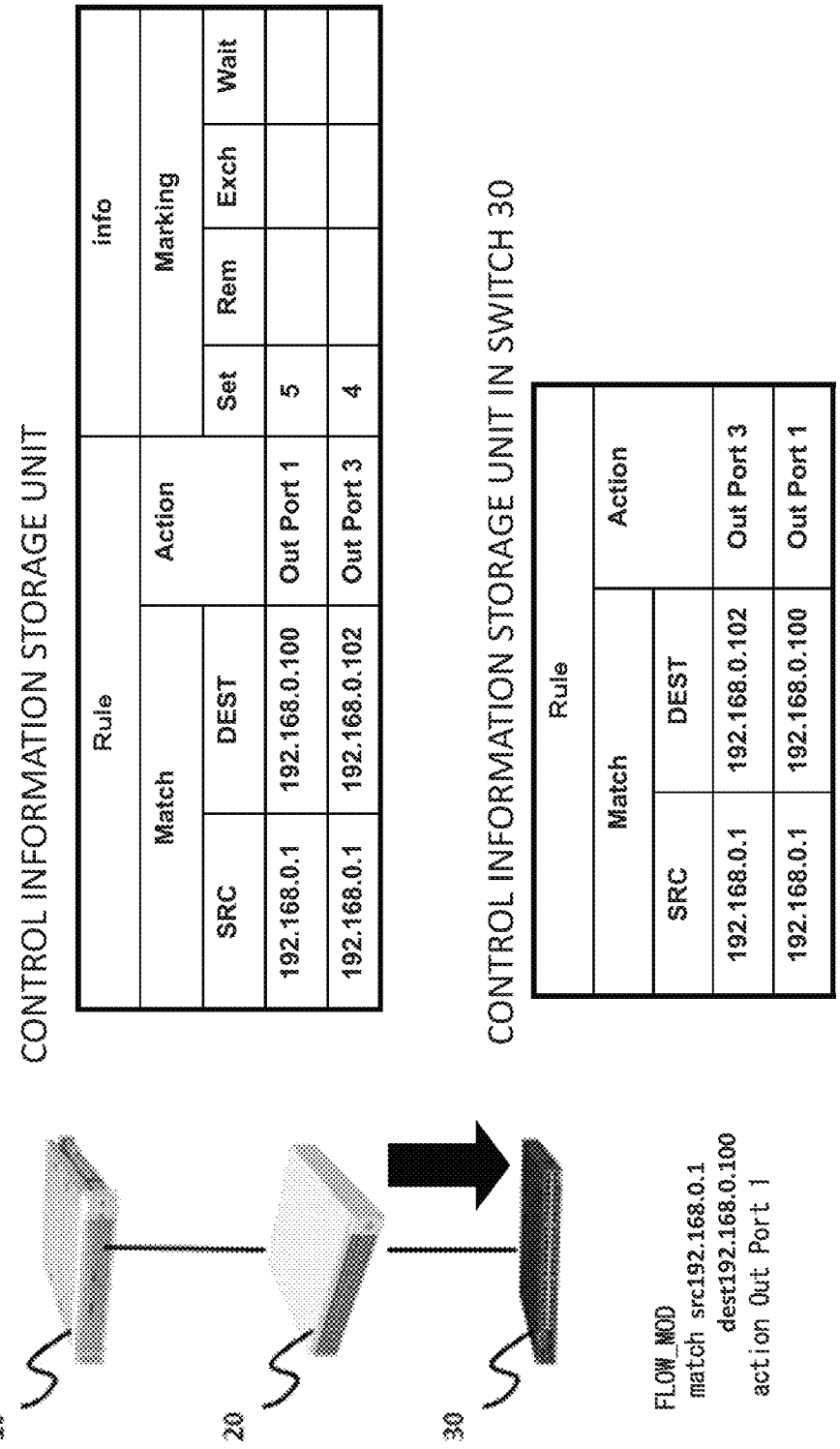
FIG. 22 is a diagram that follows FIG. 21.
Figure 23:
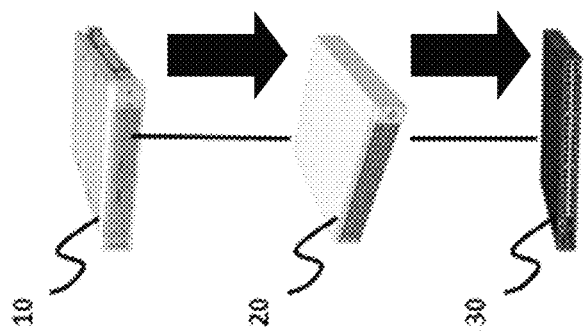
FIG. 23 is a diagram that follows FIG. 22.

Next, another operation will be described. In this operation, if the switch 30 transmits a control information setting request again, the control message relay apparatus 20 sets corresponding control information stored therein and does not transmit a control information setting request to the network controller 10. As illustrated in FIG. 21, if the communication from 192.168.0.1 to 192.168.0.100 occurs again at the switch 30, the switch 30 issues a control information setting request message to the network controller 10 (an arrow between the switch 30 and the control message relay apparatus 20 in FIG. 21). The control message relay apparatus 20 intercepts the control information setting request message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 10 (step S1202 in FIG. 6).

Based on the control information setting request message, the control message conversion unit 22 refers to the control information storage unit 25 and determines that control information that matches the communication from 192.168.0.1 to 192.168.0.100 exists (YES in step S2401 in FIG. 10). Thus, the control message conversion unit 22 creates a control information setting control message for setting the control information in the switch 30. Simultaneously, the control message conversion unit 22 marks the control information in the control information storage unit 25 with a set flag (see step S2402 in FIG. 10 and the control information storage unit in switch 30 in FIG. 21). The control communication mediation unit 21 transmits the created control information setting control message to the switch 30 (YES in step S1203 in FIG. 6 and step S1204 in FIG. 6 and an arrow between the switch 30 and the control message relay apparatus 20 in FIG. 22). The switch 30 sets the control information and resumes control of forwarding the communication addressed to 192.168.0.100 from 192.168.0.1 via Port 1 (see the control information storage unit in the switch 30 in FIG. 22).

By performing the above operation, if the control message relay apparatus 20 receives a control information setting request from the switch 30 and holds corresponding control information, the control message relay apparatus 20 can set the communication control in the switch 30, without transmitting a query to the network controller 10. In addition, the switch 30 recognizes as if the network controller 10 responded to the control information setting request.

Next, an operation that the control message relay apparatus 20 performs when receiving an explicit control information removal instruction from the network controller 10 will be described. To remove the communication from 192.168.0.1 to 192.168.0.100, the network controller 10 issues a control information removal control message for removing the corresponding control information (an arrow between the network controller 10 and the control message relay apparatus 20 in FIG. 23). The control message relay apparatus 20 intercepts the control information removal control message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 7 (step S1202 in FIG. 6).

The control message conversion unit 22 determines that the received control message is a removal request (YES in step S2101 in FIG. 7). The control message conversion unit 22 refers to the control information storage unit 25 and determines that the control information corresponding to the communication from 192.168.0.1 to 192.168.0.100 specified in the control information removal control message exists and that the control information is marked with a set flag (YES in step S2103 in FIG. 7). The control message conversion unit 22 marks the control information in the control information storage unit 25 with a removing flag (see step S2104 in FIG. 7 and a "Rem" flag in the (upper) control information storage unit in FIG. 23), and checks a removing-for-exchange flag. In this case, since the control information does not have a removing-for-exchange flag (NO in step S2105 in FIG. 7), the control message conversion unit 22 converts the control information removal control message into a control message to be transmitted to the switch 30 (step S2106 in FIG. 7). The control communication mediation unit 21 transmits the created control information removal control message to the switch 30 (YES in step S1203 in FIG. 6 and step S1204 in FIG. 6 and an arrow between the control message relay apparatus 20 and the switch 30 in FIG. 23).

Figure 24:
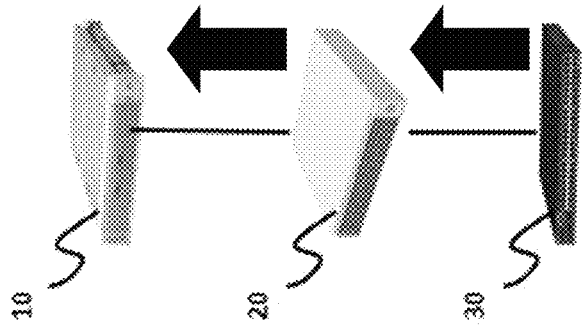
FIG. 24 is a diagram that follows FIG. 23.

When receiving the control information removal control message, the switch 30 removes the control information and stops forwarding packets addressed to 192.168.0.100 from 192.168.0.1 (see the control information storage unit in the switch 30 in FIG. 24). The switch 30 notifies the network controller 10 of completion of the removal of the control information by transmitting a control information removal notification message (an arrow between the switch 30 and the control message relay apparatus 20 in FIG. 24). The control message relay apparatus 20 intercepts the control information removal notification message. The control message conversion unit 22 in the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 9 (step S1202 in FIG. 6).

Since the reason of the removal written in the control information removal notification message indicates a removal request, the control message conversion unit 22 refers to the control information storage unit 25 and determines whether the control information is marked with a removing-for-exchange flag (step S2301 in FIG. 9). Since the control information is not marked with a removing-for-exchange flag (NO in step S2301 in FIG. 9), the control message conversion unit 22 removes the control information for the communication addressed to 192.168.0.100 from 192.168.0.1 corresponding to the control information removal notification message from the control information storage unit 25. The control message conversion unit 22 converts the control information removal notification message into a control message to be transmitted to the network controller 10 (step S2304 in FIG. 9). While the control message conversion unit 22 searches the control information storage unit 25 for control information having a waiting-for-exchange flag, since such control information does not exist (NO in step S2305 in FIG. 9), the control message conversion unit 22 ends the control information conversion processing. The control communication mediation unit 21 transmits the converted control information removal notification message to the network controller 10 (YES in step S1203 in FIG. 6 and step S1204 in FIG. 6 and an arrow between the control message relay apparatus 20 and the network controller 10 in FIG. 24).

Next, an operation performed when the network controller 10 explicitly instructs removal of control information and corresponding control information is not set in the switch 30 will be described in detail with reference to FIGS. 25 and 26. FIG. 25 illustrates a state in which the control message relay apparatus 20 in the state in FIG. 21 has received a control information removal control message from the network controller 10.

To remove the communication from 192.168.0.1 to 192.168.0.100, the network controller 10 issues a control information removal control message (an arrow between the network controller 10 and the control message relay apparatus 20 in FIG. 25). The control message relay apparatus 20 intercepts the control information removal control message. The control message conversion unit 22 of the control message relay apparatus 20 refers to the switch information storage unit and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 7 (step S1202 in FIG. 6).

When the control message conversion unit 22 determines that the received control message is a removal request (YES in step S2101 in FIG. 7), the control message conversion unit 22 refers to the control information storage unit 25, determines that control information corresponding to the communication addressed to 192.168.0.100 from 192.168.0.1 specified in the control message exists, and determines that the control information is not marked with a set flag (NO in step S2103 in FIG. 7).

Figure 26:
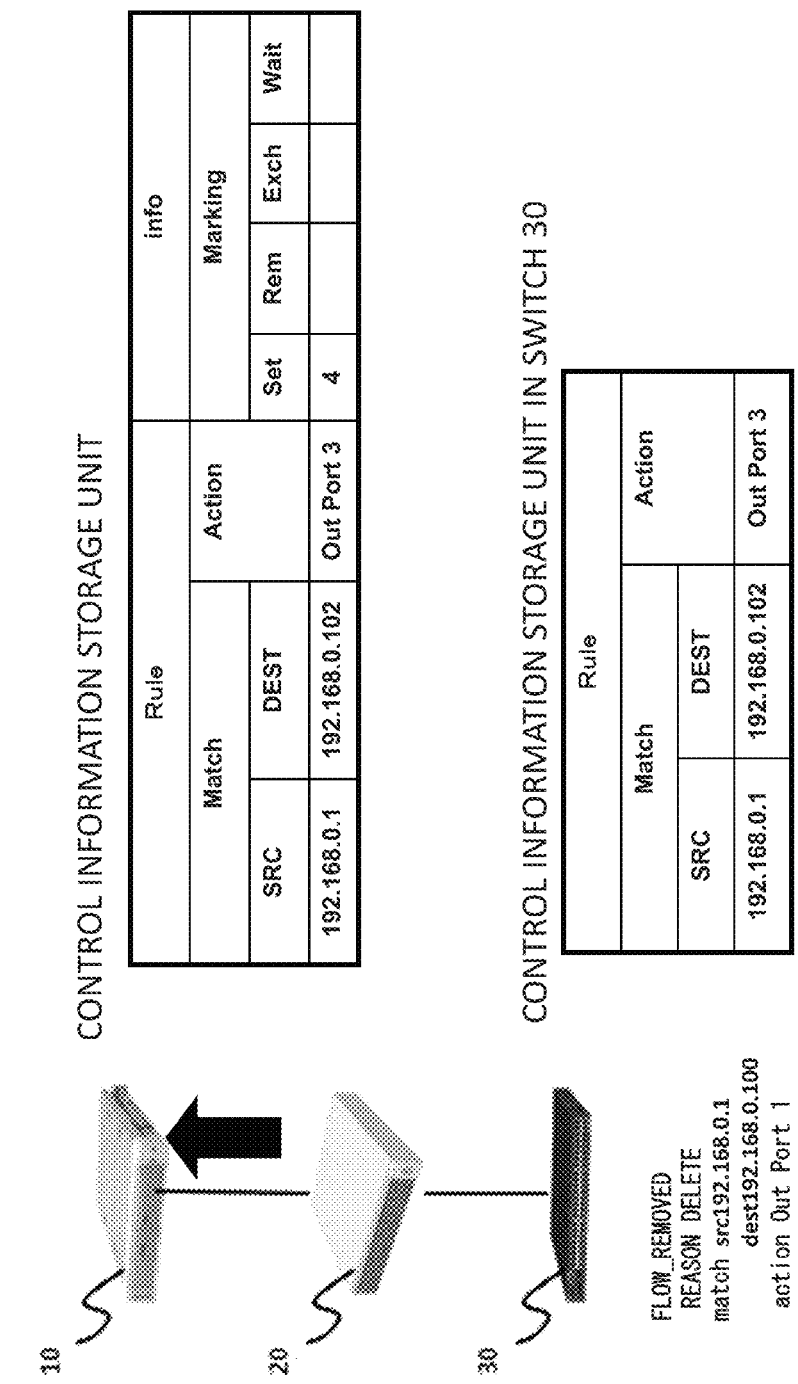
FIG. 26 is a diagram that follows FIG. 25.

The control message conversion unit 22 removes the removal target control information from the control information storage unit 25 (see step S2108 in FIG. 7 and the (upper) control information storage unit in FIG. 26). In addition, the communication control message conversion unit 22 creates a control information removal notification message to notify the network controller 10 that the control information has been removed in response to the removal request (step S2109 in FIG. 7). The control communication mediation unit 21 transmits the created control information removal notification message to the network controller 10 (YES in step S1203 in FIG. 6 and step S1204 in FIG. 6 and an arrow between the control message relay apparatus 20 and the network controller 10 in FIG. 26).

As illustrated in the above operation, in the case of removal of control information that is set in the switch 30, the control message relay apparatus 20 transmits a control information removal notification message to the network controller 10 after the switch 30 removes the corresponding control information. In contrast, in the case of removal of control information that is not set in the switch 30, the control message relay apparatus 20 only performs internal processing and transmits a removal notification to the network controller 10. In this way, when removing control information as well, the control message relay apparatus 20 manages the removal by using virtualized control information in the control message relay apparatus 20.

As illustrated by the above series of operations, the control message relay apparatus 20 operates to achieve virtualization by physically separating the network controller 10 and the switch 30 from each other. Namely, the control message relay apparatus 20 can have the network controller 10 view that the network controller 10 is controlling a switch having a larger amount of resource and can have the switch 30 view that the switch 30 is being controlled consistently by the network controller 10. In other words, the network controller 10 views that the switch 30 can hold more control information entries than the switch 30 can actually hold. In addition, the switch 30 can receive consistent control information to be set therein, even if a control information setting request does not actually reaches the network controller 10.

Second Exemplary Embodiment

Next, a second exemplary embodiment will be described. In the second exemplary embodiment, the conversion rules according to the above first exemplary embodiment are changed. The second exemplary embodiment differs from the first exemplary embodiment in that not only exchange of control information but also integration (aggregation/abstraction) of control information is performed. In this way, the number of communications that a switch can simultaneously forward can be increased. Since other basic configurations are the same as those according to the first exemplary embodiment, the following description will be made with a focus on the difference.

According to the second exemplary embodiment of the present invention, the control message relay apparatus 20 performs the mediation operation differently when the control message relay apparatus 20 intercepts control messages other than a communication establishment request message. More specifically, when receiving a control information operation (setting/removal) message, a control information setting failure notification message, a control information removal notification message, or a control information setting request message, the control message relay apparatus 20 performs an additional operation that accompanies integration (aggregation/abstraction) of control information. Namely, a conversion rule applied depending on the message in step S1202 in the flowchart in FIG. 6 is changed.

In addition, according to the present exemplary embodiment, in addition to the control information setting statuses (various flags) described in the first exemplary embodiment, the control information storage unit 25 stores an integration attribute that indicates integrated control information and dependence information that indicates a relationship as an integration target, as the control information setting statuses.

Specific Example 2-1 of Application of a
Conversion Rule (Upon Receiving a Control
Information Operation Message)

Figure 27:
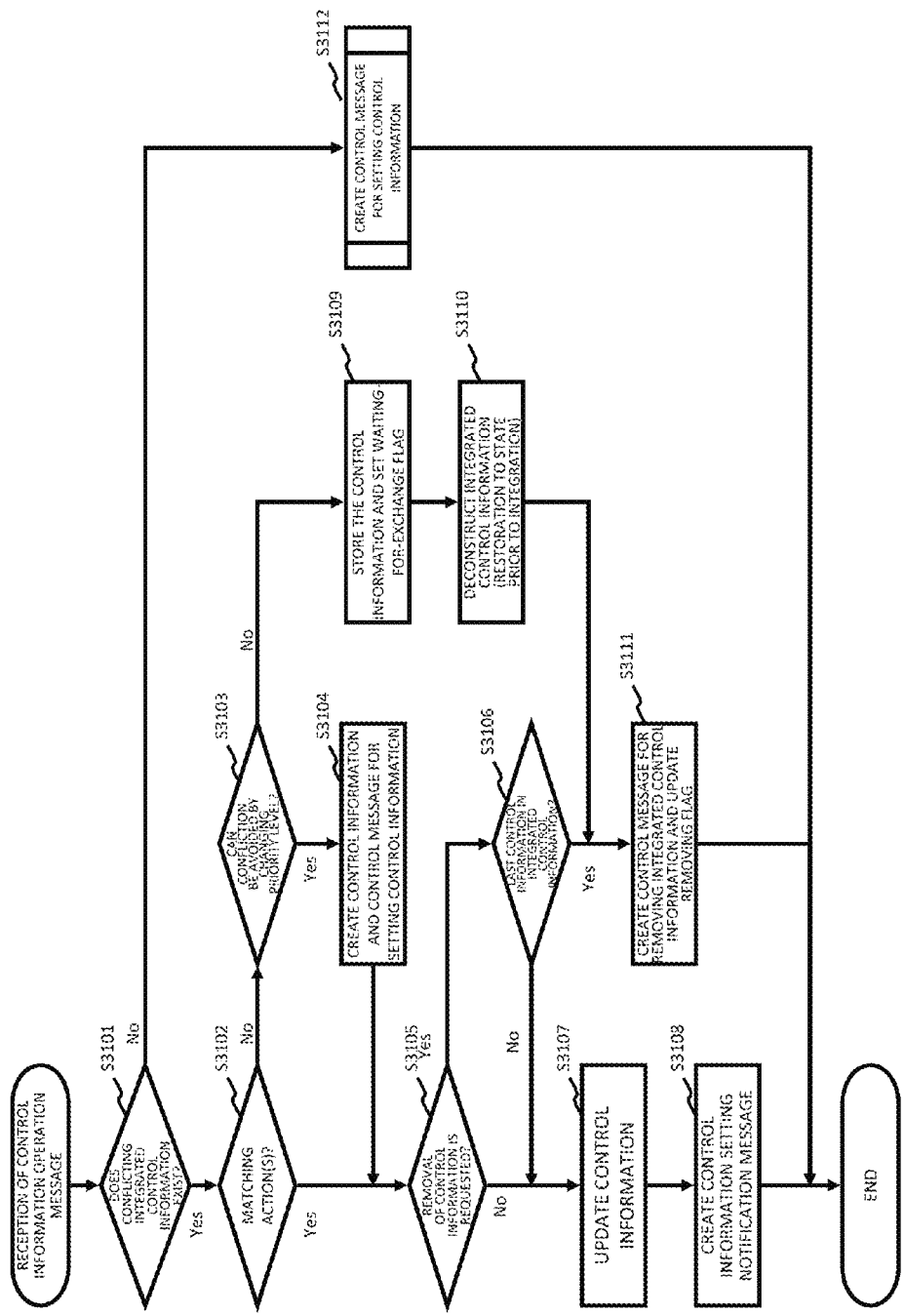
FIG. 27 is a flowchart illustrating an operation that a control message relay apparatus according to a second exemplary embodiment of the present invention performs (when receiving a control information operation message).

FIG. 27 is a flowchart illustrating a conversion rule performed when the control message relay apparatus 20 receives a control information operation message. This flow is started when the control message relay apparatus 20 intercepts a control information operation (setting/removal) message issued from the network controller 10. When the control communication mediation unit 21 of the control message relay apparatus 20 intercepts a control information operation message issued from the network controller 10, the control communication mediation unit 21 notifies the control message conversion unit 22 of the message. The control message conversion unit 22 refers to the control policy storage unit 23 and applies the conversion rule in accordance with the flow illustrated in FIG. 27.

The control message conversion unit 22 extracts control information from the control information operation message and refers to the control information storage unit 25 to determine whether conflicting integrated control information exists (step S3101 in FIG. 27). If the match conditions in the control information specified as the operation target in the control information operation message fall within the match conditions in any integrated control information, the control message conversion unit 22 determines that the integrated control information is the conflicting integrated control information.

If such integrated control information that conflicts with the control information does not exist (NO in step S3101 in FIG. 27), the control message conversion unit 22 applies a conversion rule used when receiving a normal control information operation message, namely, performs processing illustrated in the flowchart in FIG. 7 (step S3112 in FIG. 27).

If integrated control information that conflicts with the control information exists (YES in step S3101 in FIG. 27), the control message conversion unit 22 determines whether the action(s) in the control information matches the action(s) in the conflicting integrated control information (step S3102 in FIG. 27). If the processing content(s) applied to the packets matching the match conditions of the control information are consistent with the processing content(s) of the integrated control information, the control message conversion unit 22 determines that the actions match. Generally, if the contents in the respective action fields match, the control message conversion unit 22 determines that the actions match. However, if the action indicates a removal-related processing content, if the action matches other conditions of the integrated control information as a communication system, and if application of the control information in the switch 30 is permitted, the control message conversion unit 22 also determines that the processing contents match.

If the action(s) in the integrated control information that conflicts with the control information does not match the action(s) in the operation target control information (NO in step S3102 in FIG. 27), the control message conversion unit 22 determines whether the confliction can be avoided by changing the priority level of the control information or the conflicting integrated control information (step S3103 in FIG. 27).

If the confliction can be avoided by changing the priority level of the control information or the conflicting integrated control information (YES in step S3103 in FIG. 27), the control message conversion unit 22 refers to the control information storage unit 25 and registers the control information whose priority level has been changed or updates the priority level of the integrated control information. If the priority level of the control information is updated, the control information is made different from the setting instructed by the network controller 10. Thus, the control message relay apparatus 20 treats the control information as integrated control information having overlapping match conditions and a different priority level. The control message conversion unit 22 creates a control information setting control message for setting the integrated control information registered or updated in the control information storage unit 25 in the switch 30. In addition, the control message conversion unit 22 marks the integrated control information with a set flag (step S3104 in FIG. 27).

If the action(s) in the integrated control information that conflicts with the control information matches the action(s) in the operation target control information (YES in step S3102 in FIG. 27) or if the confliction can be avoided by changing the priority level of the control information or the conflicting integrated control information (after step S3104 in FIG. 27), the control message conversion unit 22 determines whether the control information operation message is a request for removing control information (step S3105 in FIG. 27).

If the control information operation message is a removal request (YES in step S3105 in FIG. 27), the control message conversion unit 22 determines whether the control information is the last control information of all the control information (integration target control information) in the corresponding integrated control information (step S3106 in FIG. 27).

In contrast, if the control information operation message is not a removal request (NO in step S3105 in FIG. 27) or the control information is not the last control information of the integration target control information in the corresponding integrated control information (NO in step S3106 in FIG. 27), the control message conversion unit 22 updates the control information in the control information storage unit 25 (step S3107 in FIG. 27).

After updating the control information in the control information storage unit 25, as needed, the control message conversion unit 22 creates a control information setting notification message to be transmitted to the network controller 10 (step S3108 in FIG. 27). The control information setting notification message signifies a response such as a control information removal notification message transmitted when the setting of the control information is made in response to a removal request.

If the confliction cannot be avoided by changing the priority level of the control information or the conflicting integrated control information (NO in step S3103 in FIG. 27), the control message conversion unit 22 registers the control information in the control information storage unit 25 and marks the control information with a waiting-for-exchange flag (step S3109 in FIG. 27).

Next, since the confliction cannot be avoided, the control message conversion unit 22 deconstructs and cancels the integrated control information. The control message conversion unit 22 removes the integrated control information from the control information storage unit 25 and the corresponding relationship from a control information table (step S3110 in FIG. 27).

In contrast, if the control information requested to be removed is the last control information of the control information in the corresponding integrated control information (YES in step S3106 in FIG. 27) or if the integrated control information is deconstructed (after step S3109 in FIG. 27), the control message conversion unit 22 creates a control information removal control message to instruct the switch 30 to remove the integrated control information. In addition, the control message conversion unit 22 marks the corresponding control information in the control information storage unit 25 with a removing flag (step S3111 in FIG. 27).

In this way, a communication control message created by the conversion rule illustrated in FIG. 27 is issued from the control communication mediation unit 21 to the network controller 10 or the switch 30.

By performing the above operation, the control message relay apparatus 20 can store control information set by the network controller 10 in the control information storage unit 25 and can set control information consistent with the control information and integrated control information already set in the switch 30. In addition, as needed, by transmitting a setting response to the network controller 10, the control message relay apparatus 20 can notify the network controller 10 that the necessary control information has been set successfully.

Specific Example 2-2 of Application of a Conversion Rule (Upon Receiving a Control Information Setting Failure Notification)

Next, a specific example of a conversion rule that the control message relay apparatus 20 applies when receiving a control information setting failure notification from switch 30 will be described with reference to FIG. 28. This flow is started when the control message relay apparatus 20 intercepts a control information setting failure notification message issued from the switch 30.

When the control communication mediation unit 21 of the control message relay apparatus 20 intercepts a control information setting failure notification message issued from the switch 30, the control communication mediation unit 21 notifies the control message conversion unit 22 of the message. The control message conversion unit 22 refers to the control policy storage unit 23 and applies the conversion rule in accordance with the flow illustrated in FIG. 28.

Figure 28:
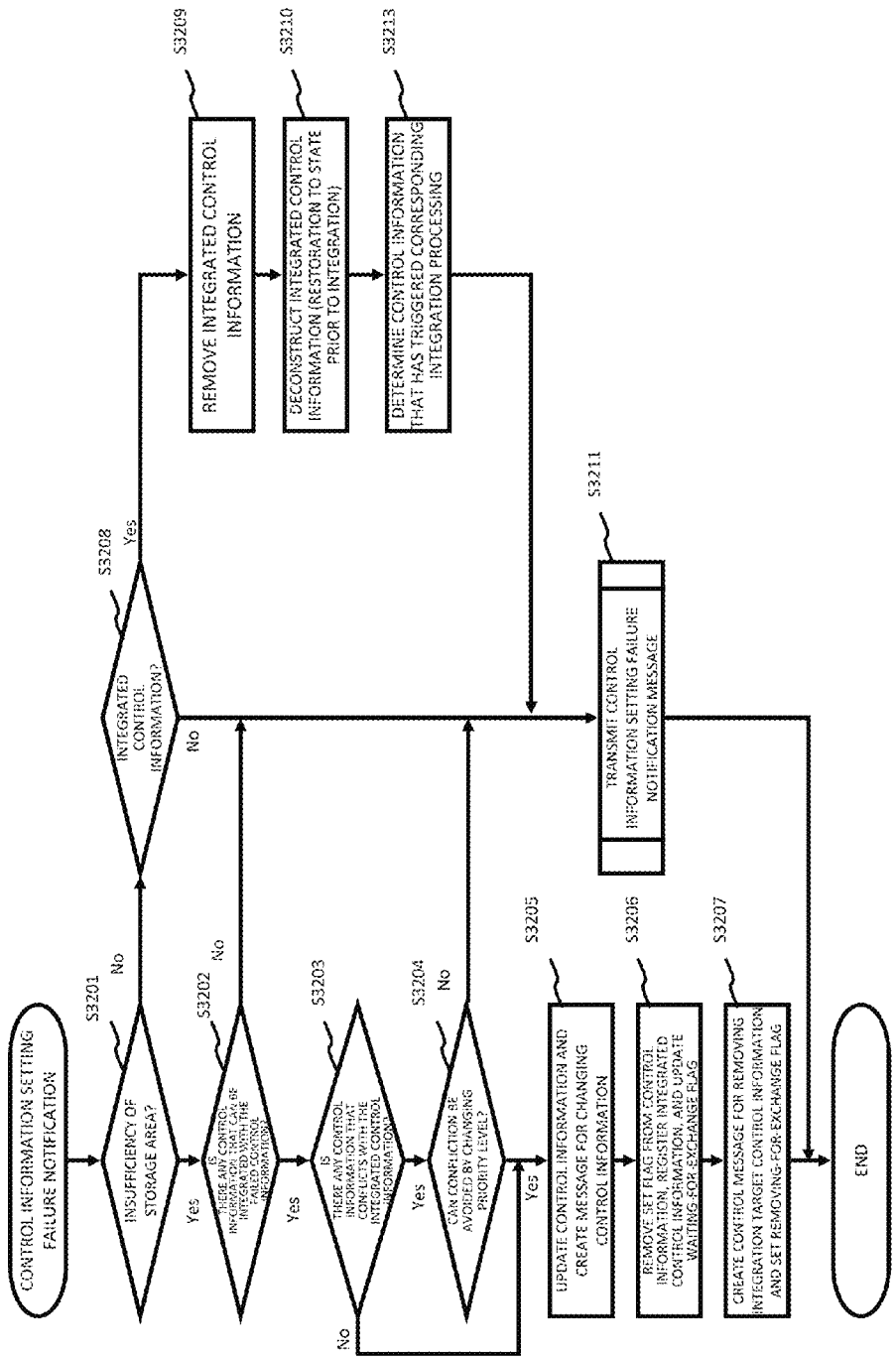
FIG. 28 is a flowchart illustrating an operation that the control message relay apparatus according to the second exemplary embodiment of the present invention performs (when receiving a control information setting failure notification).

First, the control message conversion unit 22 extracts the reason of the failure from the control information setting failure notification message and determines whether the reason of the failure indicates insufficiency of the storage area (step S3201 in FIG. 28).

If the reason of the failure extracted from the control information setting failure notification message indicates insufficiency of the storage area (YES in step S3201 in FIG. 28), the control message conversion unit 22 refers to the control information storage unit 25 and determines whether there is any control information or integrated control information that can be integrated with the control information that could not be set (step S3202 in FIG. 28).

An example of the method of integrating two control information entries will be described. For example, if two control information entries have the same action(s), a range that can be separated by domain division is extracted in a match condition field. For example, in the case of 192.168.0.2/36 and 192.168.0.3/36, 192.168.0.2/35 is obtained. In this way, by increasing the abstraction level, the two control information entries can be integrated. Alternatively, if two control information entries have the same action(s), one control information entry having the smaller bit difference in Euclidean distance in a match condition field is selected. For example, if there is 192.168.1.1/36 for 192.168.0.1/36 and 192.168.1.2/36, since the Euclidean distance of the former is 1 and the Euclidean distance of the latter is 2, the former is integrated and 192.168.0.1/255.255.254.255 is obtained. In this way, the extent of the impact can be narrowed.

If the control message conversion unit 22 determines that there is control information or integrated control information that can be integrated with the control information that could not be set (YES in step S3202 in FIG. 28), the control message conversion unit 22 determines whether there is any control information that conflicts with the integrated control information obtained as a result of the integrating the above control information entries (step S3203 in FIG. 28).

If such control information that conflicts with the created integrated control information exists (YES in step S3203 in FIG. 28), the control message conversion unit 22 determines whether the confliction can be avoided by priority resolution (step S3204 in FIG. 28).

As a result of the determination, if the control message conversion unit 22 determines that the confliction can be avoided by priority resolution (YES in step S3204 in FIG. 28), the control message conversion unit 22 refers to the control information storage unit 25 and updates the control information that is changed by the priority resolution as the integrated control information and creates a control information setting (priority level changing) control message for setting the control information in the switch 30. In addition, the control message conversion unit 22 marks the control information with a set flag (step S3205 in FIG. 28). If the confliction is avoided by setting the priority level of the newly created integrated control information, no particular operation is performed in this phase. Instead, the priority level is set in the next step S3206.

If the control message conversion unit 22 determines that control information that conflicts with the created integrated control information does not exist (NO in step S3203 in FIG. 28) or the confliction with such control information can be resolved by changing a priority level (after step S3205 in FIG. 28), the control message conversion unit 22 removes the set flag from the control information that could not be set. In addition, the control message conversion unit 22 registers the control information obtained by integrating the control information that could not be set and the control information that can be integrated with the control information in the control information storage unit 25 as integrated control information. In addition, the control message conversion unit 22 marks the integrated control information with a waiting-for-exchange flag (step S3206 in FIG. 28).

The control message conversion unit 22 creates a control information removal control message for causing the switch 30 to remove the control information selected to be integrated with the control information that could not be set. In addition, the control message conversion unit 22 refers to the control information storage unit 25 and marks the selected control information with a removing-for-exchange flag (step S3207 in FIG. 28).

In step S3201, if the control message conversion unit 22 determines that the reason of the failure in the communication control failure response message does not indicate insufficiency of the storage area (NO in step S3201 in FIG. 28), the control message conversion unit 22 performs the following processing. First, the control message conversion unit 22 refers to the control information storage unit 25 and determines whether the control information that could not be set is integrated control information (step S3208 in FIG. 28).

If the control information that could not be set is integrated control information (YES in step S3208 in FIG. 28), the control message conversion unit 22 removes the corresponding integrated control information from the control information storage unit 25 (step S3209 in FIG. 28). In addition, the control message conversion unit 22 extracts the control information in the integrated control information (which will be referred to as "integration target control information") from the control information storage unit 25. Next, the control message conversion unit 22 removes the integration relationship between (among) the integration target control information extracted from the control information storage unit 25 (step S3210 in FIG. 28).

Simultaneously with the above step S3209, the control message conversion unit 22 refers to the control information storage unit 25 and determines control information that has triggered the corresponding integration processing (step S3213 in FIG. 28). There may be more than one control information entry that has triggered the corresponding integration processing. The control message conversion unit 22 replaces the control information that has triggered the corresponding integration processing as failure of setting control information and continues the following processing.

As an example of the method of extracting control information that has triggered an integration operation, all the integration target control information entries may be selected. Alternatively, the order of the integration target control information entries may be stored, and the integration target control information entry that has been set last may be selected.

If the control message conversion unit 22 determines that the reason of the failure of setting the control information does not indicate insufficiency of the storage area and if the control information that could not be set is not integrated control information (NO in step S3208 in FIG. 28), if there is no control information that can be integrated with the control information that could not be set (NO in step S3202 in FIG. 28), or if there is control information that conflicts with the created integrated control information even if the priority adjustment is performed (NO in step S3204 in FIG. 28), the control message conversion unit 22 applies a conversion rule described in the first exemplary embodiment to the control information that could not be set, namely, performs the processing illustrated in the flowchart in FIG. 8 (step S3211 in FIG. 28). In this operation, integrated control information could be selected as the exchange target control information. In addition, if the control information that has triggered the corresponding integration processing is determined (after step S3213 in FIG. 28), the control message conversion unit 22 applies a normal communication control setting failure rule to each of the control information entries that have triggered the corresponding integration processing, namely, performs the processing in accordance with the flowchart in FIG. 8 (step S3211 in FIG. 28). In this operation, integrated control information could be selected as the exchange target control information.

As described in the above operation, when receiving a control information setting failure notification from the switch 30, the control message relay apparatus 20 integrates control information, creates integrated control information, and sets the integrated control information in the switch 30 or exchanges control information. In addition, the control message relay apparatus 20 can notify the network controller 10 of an error indicating termination of the communication or the like.

Specific Example 2-3 of Application of a Conversion Rule (Upon Receiving a Control Information Removal Notification)

Next, a specific example of a conversion rule that the control message relay apparatus 20 applies when receiving a control information removal notification from the switch 30 will be described with reference to FIG. 29. This flow is started when the control message relay apparatus 20 intercepts a control information removal notification message issued from the switch 30.

When the control communication mediation unit 21 of the control message relay apparatus 20 intercepts a control information removal notification message issued from the switch 30, the control communication mediation unit 21 notifies the control message conversion unit 22 of the message. The control message conversion unit 22 refers to the control policy storage unit 23 and applies the conversion rule in accordance with the flow illustrated in FIG. 29.

Figure 29:
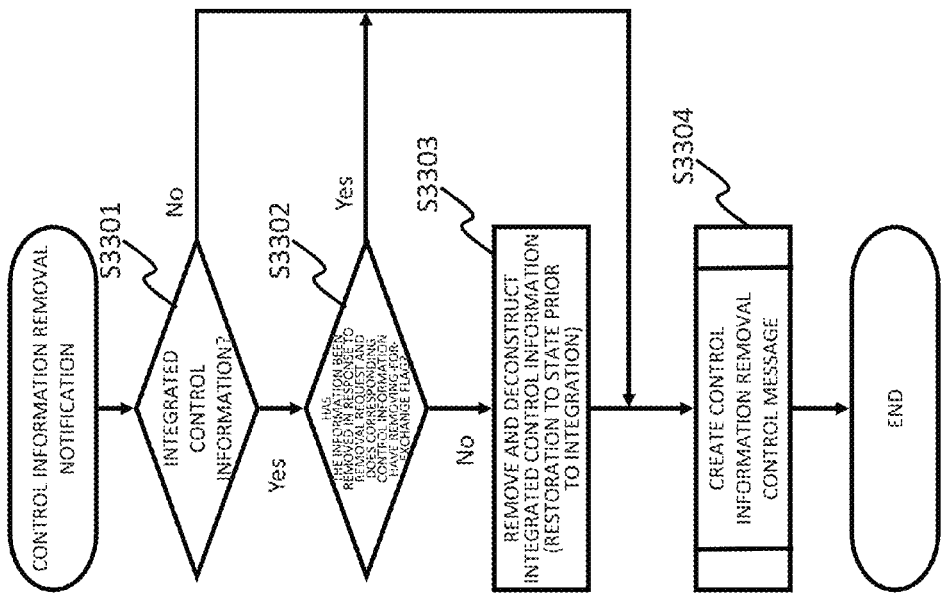
FIG. 29 is a flowchart illustrating an operation that the control message relay apparatus according to the second exemplary embodiment of the present invention performs (when receiving a control information removal notification).

First, the control message conversion unit 22 refers to the control information storage unit 25 and determines whether the removal target control information indicated in the control information removal notification message is integrated control information (step S3301 in FIG. 29).

If the removal target control information is integrated control information (YES in step S3301 in FIG. 29), the control message conversion unit 22 refers to the control information storage unit 25, determines whether the removal target control information is being removed to be exchanged by determining whether a removing-for-exchange flag is set. In addition, the control message conversion unit 22 determines whether the reason of the removal is in response to a removal request from the control information removal notification message (step S3302 in FIG. 29).

If the integrated control information to be removed does not have a removing-for-exchange flag and is not in response to a removal request (NO in step S3302 in FIG. 29), the control message conversion unit 22 removes the integrated control information from the control information storage unit 25. The control message conversion unit 22 refers to the control information storage unit 25 and extracts related integration target control information. The control message conversion unit 22 removes information about integration of the integration target control information from the control information storage unit 25 and performs processing for restoring a state prior to the integration (step S3303 in FIG. 29).

Next, the control message conversion unit 22 applies a conversion rule to the control information to be removed or the extracted integration target control information in accordance with the flowchart in FIG. 29, as described in the first exemplary embodiment (step S3304 in FIG. 29). In this operation, integrated control information could be selected as the exchange target control information.

As described in the above operation, when receiving a control information removal notification from the switch 30, the control message relay apparatus 20 exchanges the target information with control information or integrated control information. In addition, the control message relay apparatus 20 deconstructs integrated control information and realizes notification of removal of control information that matches the control information setting statuses grasped by the network controller 10.

As to application of a conversion rule that the control message conversion unit 22 performs when receiving a control information setting request, it is only necessary that the control message conversion unit 22 expand the scope of the search in the control information storage unit 25 so that integrated control information is also included. Thus, description of such processing will be omitted.

Next, the above series of operations will be described along with statuses of the control information storage units of the control message relay apparatus 20 and the switch 30 with reference to FIGS. 30 to 41.

In addition, for simplicity, the following description will be made assuming that the number of control information entries that the switch 30 can store in its control information storage unit is two. In addition, in FIGS. 31 to 41, the flow of a message is indicated by a thick arrow, and a content of a flowing message is indicated at the bottom of the figure of the switch or the like. In addition, a simplified version of the control information storage unit 25 of the control message relay apparatus 20 and a simplified version of the control information storage unit (flow table) of the switch 30 are illustrated on the right side of each of FIGS. 11 to 24. Each of the control information storage units (flow tables) has a Rule field in which control information can be stored. In the Rule field, a Match field storing match conditions is associated with an Action field indicating a processing content(s) applied to packets that match the match conditions. In addition, "SRC" represents a source IP address and "DST" represents a destination IP address.

Various flags are indicated under Info-Marking in the control information storage unit 25 of the control message relay apparatus 20. For example, "Set" represents a set flag, and "Rem" represents a removing flag. In addition, "Exch" represents a removing-for-exchange flag, and "Wait" represents a waiting-for-exchange flag. In addition, instead of simply being represented by a marking, each flag is represented by a sequential number so that the setting order, the waiting order, etc. are determined. In addition, "Met" represents a correspondence integration number. When control information is integrated, a number is given to the integrated control information. In addition, the middle table in each of FIGS. 30 to 41 represents an integrated-control-information storage unit (meta-control information) in which integrated control information is stored. The management method illustrated in FIGS. 30 to 41 is only an example. An integration flag column (NO) may be added in the flag control information storage unit 25, and the control information may be managed in one table. In addition, to determine the integration range more clearly, a mask of an arbitrary bit will be represented by an IP address.

Figure 30:
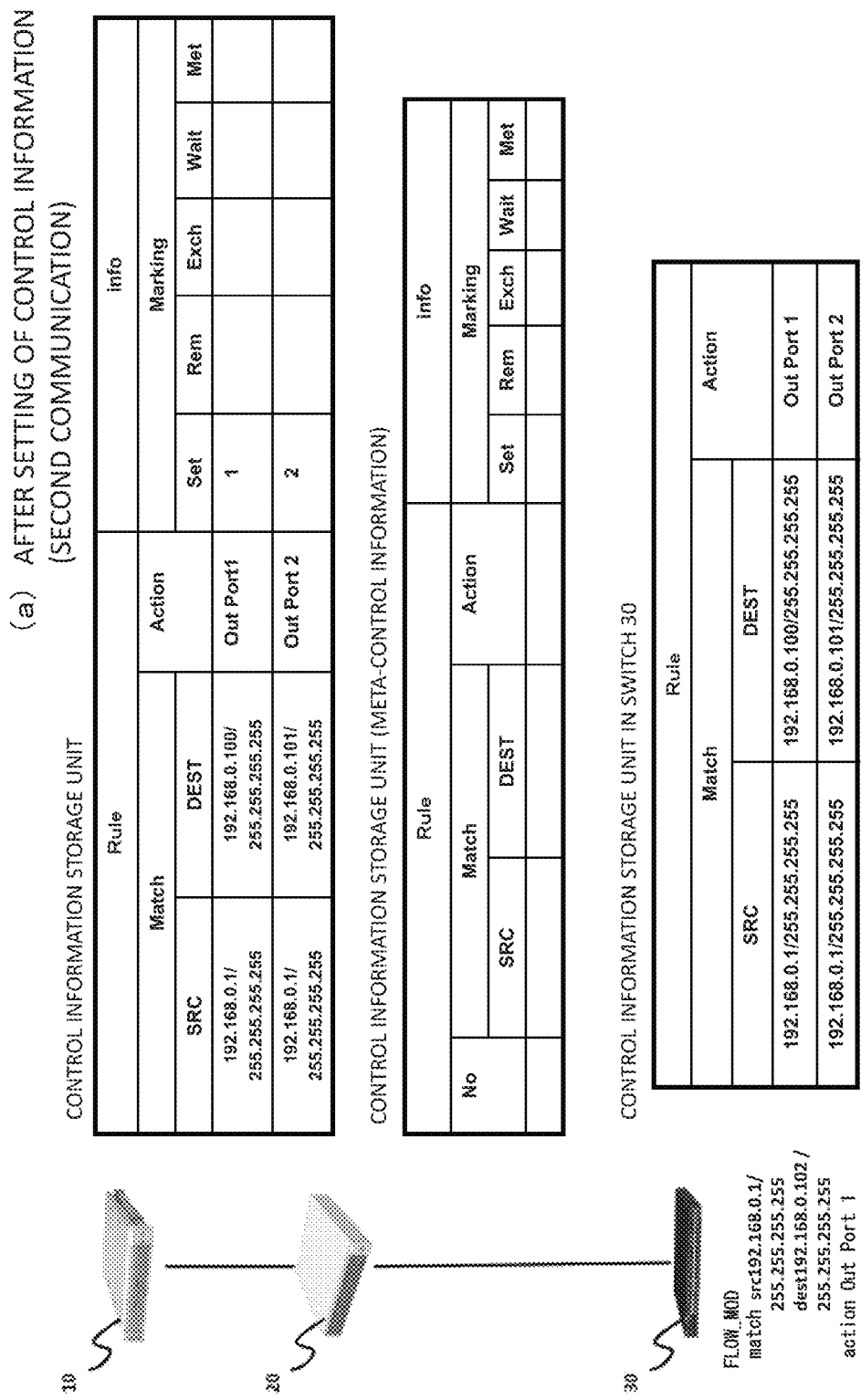
FIG. 30 illustrates a specific example of an operation performed by the control message relay apparatus according to the second exemplary embodiment of the present invention.

FIG. 30 illustrates a state in which a communication addressed to 192.168.0.100 from 192.168.0.1 and a communication addressed to 192.168.0.101 from 192.168.0.1 are set and forwarding is being performed (corresponding to the state in FIG. 14 according to the first exemplary embodiment). In this state, the switch 30 has received a communication addressed to 192.168.0.102 from 192.168.0.1, and the network controller 10 has received a control information setting request.

Figure 31:
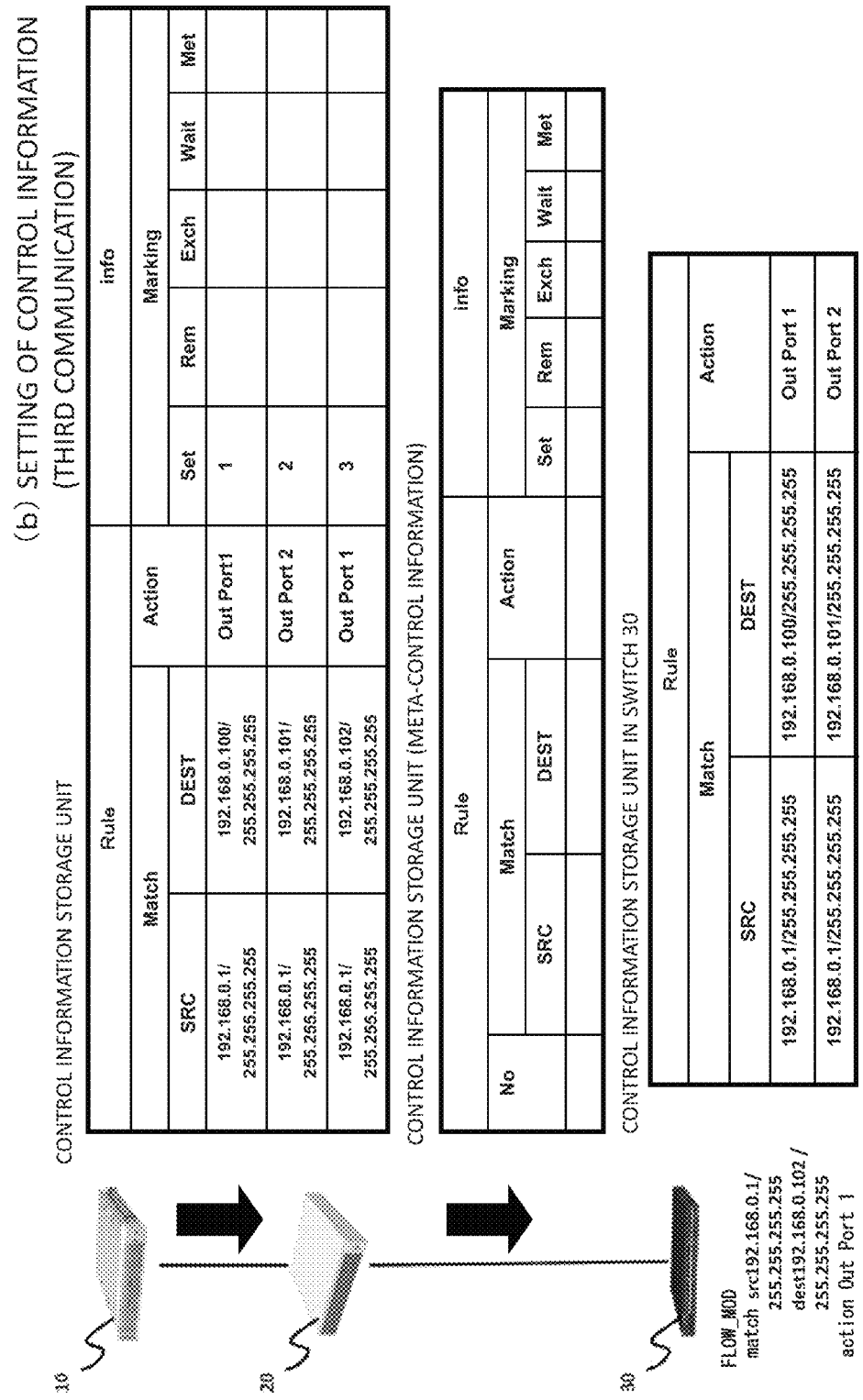
FIG. 31 is a diagram that follows FIG. 30.

The network controller 10 issues a control information setting control message for forwarding the communication addressed to 192.168.0.102/255.255.255.255 from 192.168.0.1/255.255.255.255 via Port 1 to the switch 30 (an arrow between the network controller 10 and the control message relay apparatus 20 in FIG. 31). The control message relay apparatus 20 intercepts the control message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 27 (step S1202 in FIG. 6).

As this point, since conflicting control information does not exist, the control message conversion unit 22 refers to the control policy storage unit 23 and applies the conversion rule that corresponds to the flow illustrated in FIG. 10 (step S3112 in FIG. 27). By performing the same processing as that according to the first exemplary embodiment, the control message relay apparatus 20 registers the control information in the control information storage unit 25 and transmits the control information setting message to the switch 30 via the control communication mediation unit 21 (an arrow between the control message relay apparatus 20 and the switch 30 in FIG. 31).

Figure 32:
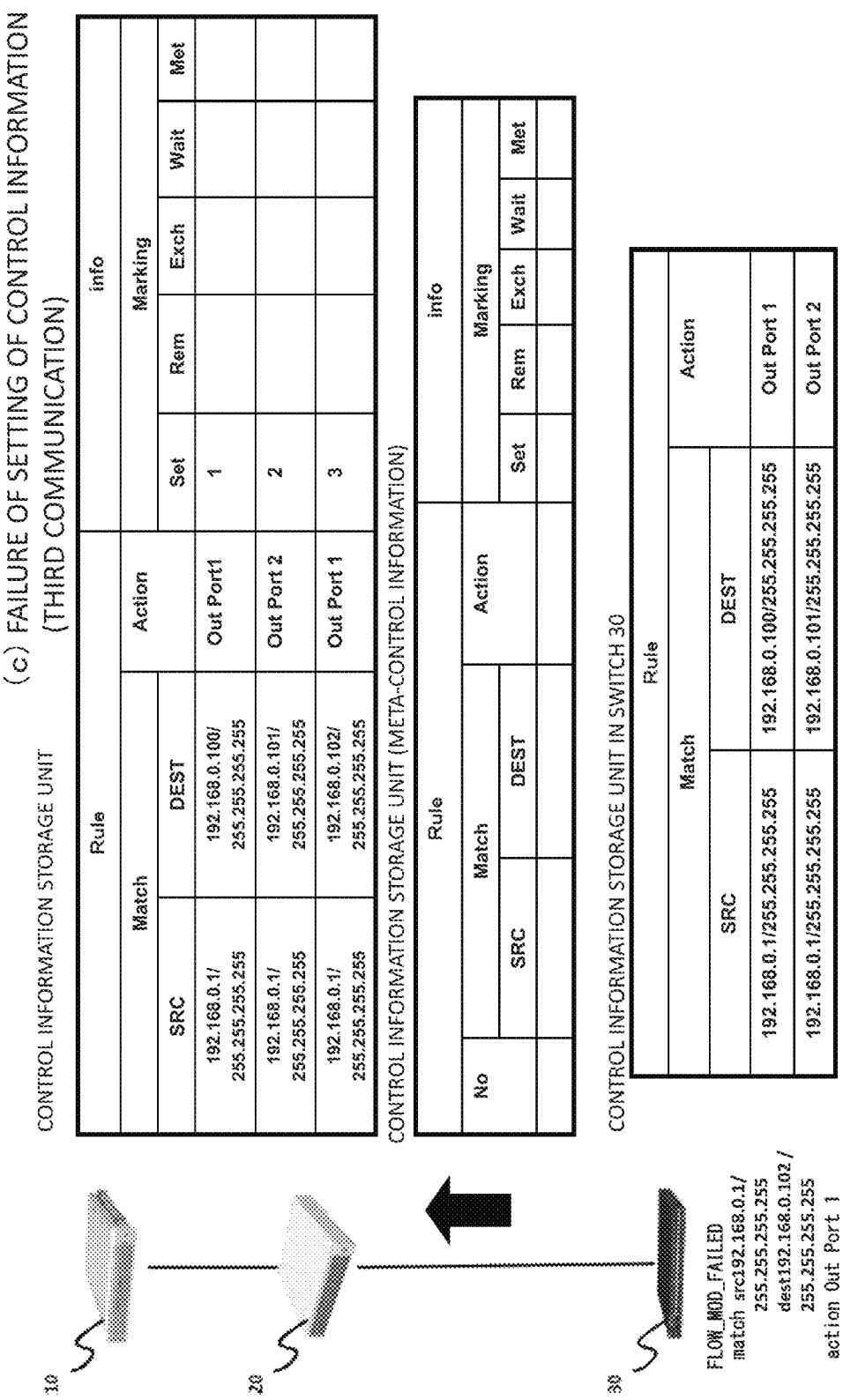
FIG. 32 is a diagram that follows FIG. 31.
Figure 33:
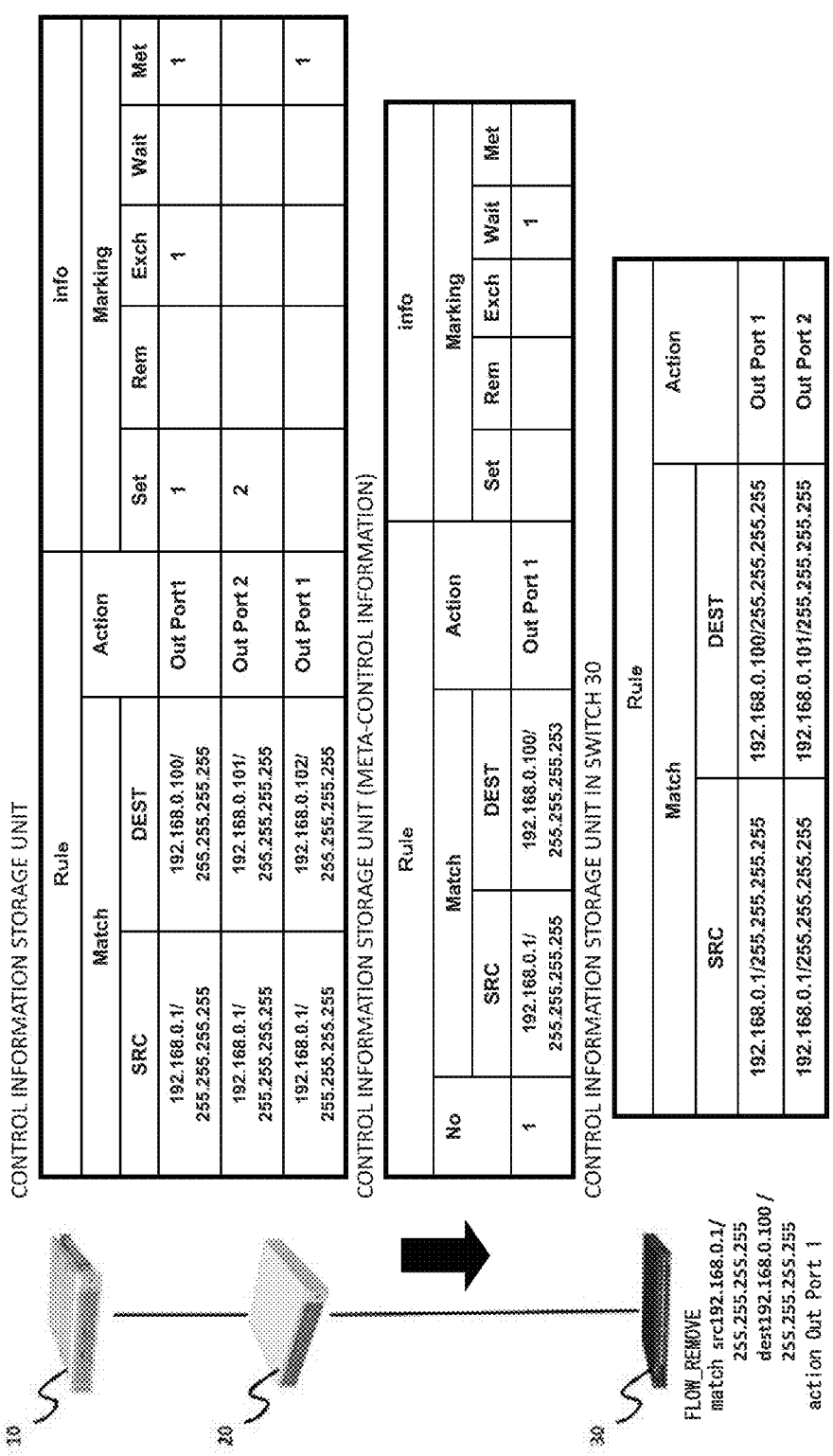
FIG. 33 is a diagram that follows FIG. 32.

Since there is no space in the control information storage unit of the switch 30, the switch 30 issues a communication control failure notification message for the control information for the communication addressed to the 192.168.0.102/255.255.255.255 from 192.168.0.1/255.255.255.255 (an arrow between the switch 30 and the control message relay apparatus 20 in FIG. 32). This communication control failure notification message indicates that the reason of the failure is insufficiency of the storage area. The control message relay apparatus 20 intercepts the communication control failure notification message. The control message conversion unit 22 of the control message relay apparatus 20 refers to the switch information storage unit and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 28 (step S1202 in FIG. 6).

From the communication control failure notification message, the control message conversion unit 22 detects that the reason of the failure is insufficiency of the storage area (YES in step S3201 in FIG. 28). The control message conversion unit 22 refers to the control information storage unit 25 and selects an integratable rule. The following description will be made assuming that the control message conversion unit 22 uses the Euclidean distance to select such rule. The candidates are the control information for the communication addressed to 192.168.0.101/255.255.255.255 from 192.168.0.1/255.255.255.255 and the control information for the communication addressed to 192.168.0.102/255.255.255.255 from 192.168.0.1/255.255.255.255. While the Euclidean distance of both of these control information entries is 1, after checking the inconsistency of the actions, the control message conversion unit 22 selects the control information for the communication addressed to 192.168.0.100/255.255.255.255 from 192.168.0.1/

255.255.255.255. This is because the selected control information also indicates forwarding via Port 1 (YES in step S3202 in FIG. 28). If these control information entries are integrated with each other, control information for a communication addressed to 192.168.0.100/255.255.255.253 from 192.168.0.1/255.255.255.255 in which the 31st bit of a match condition is made arbitrary is obtained. Since there is no rule that conflicts with the integrated control information (NO in step S3203 in FIG. 28), the control message conversion unit 22 refers to the control information storage unit 25 and removes the set flag attached to the failed control information addressed to 192.168.0.102/255.255.255.255 from 192.168.0.1/255.255.255.255 (see the removed Set flag in the (upper) control information storage unit in FIG. 33). In addition, the control message conversion unit 22 registers the integrated control information in the control information storage unit (meta-control information) and marks the integrated control information with a waiting-for-exchange flag (Wait) (see step S3206 in FIG. 28 and the Wait flag in the control information storage unit (meta-control information) in FIG. 33).

Since exchange of control information is performed after integration of control information, the control message conversion unit creates a control information removal control message to be transmitted to the switch 30, to remove the control information for the communication addressed to 192.168.0.100/255.255.255.255 from 192.168.0.1/255.255.255.255, which is selected as the integration target. In addition, the control message conversion unit 22 sets a removing-for-exchange flag in the control information in the control information storage unit 25 (see step S3206 in FIG. 28 and the top control information in the (upper) control information storage unit in FIG. 33). The control communication mediation unit 21 transmits the created control information setting message to the switch 30 (YES in step S1203 in FIG. 6 and step S1204 in FIG. 6 and an arrow between the control message relay apparatus 20 and the switch 30 in FIG. 33).

When receiving the control information setting message requesting removal of the control information for the communication addressed to 192.168.0.100/255.255.255.255 from 192.168.0.1/255.255.255.255, the switch 30 removes the control information from the control information storage unit (removes the top entry in the control information storage unit of the switch 30 in FIG. 34).

In addition, by transmitting a control information removal notification message, the switch 30 notifies the network controller 10 that the control information for the communication addressed to 192.168.0.100/255.255.255.255 from 192.168.0.1/255.255.255.255 has been removed in response to the removal request (an arrow between the switch 30 and the control message relay apparatus 20 in FIG. 34). The control message relay apparatus 20 intercepts the control information removal notification message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 29 (step S1202 in FIG. 6).

First, the control message conversion unit 22 refers to the control information removal notification message and determines that the removed control information is not integrated control information (NO in step S3301 in FIG. 29). Thus, the control message conversion unit refers to the control policy storage unit 23 and applies the conversion rule that corresponds to the flow illustrated in FIG. 9 (step S3304 in FIG. 29). The control message conversion unit 22 refers to the control information storage unit 25 and determines that the control information for the communication addressed to 192.168.0.100/255.255.255.255 from 192.168.0.1/255.255.255.255 has a removing-for-exchange flag and that the removal has been made in response to a removal request from the control information removal notification message (YES in step S2301 in FIG. 9). Thus, the control message conversion unit 22 removes the set flag and removing-for-exchange flag from the control information in the control information storage unit 25 (see step S2301 in FIG. 9 and the Set flag and the Exch flag in the top entry in the (upper) control information storage unit in FIG. 34).

The control message conversion unit 22 refers to the control information storage unit 25 and determines that the integrated control information addressed to 192.168.0.100/255.255.255.253 from 192.168.0.1/255.255.255.255 exists as control information having a waiting-for-exchange flag (see the control information storage unit (meta-control information) in FIG. 34). Thus, the control message conversion unit 22 extracts the integrated control information (YES in step S2305 and step S2306 in FIG. 9).

The control message conversion unit 22 creates a control information setting message for setting the integrated control information in the switch 30. In addition, by referring to the control information storage unit 25, the control message conversion unit 22 marks the integrated control information with a set flag and removes the waiting-for-exchange flag (see step S2307 in FIG. 9 and the Set flag and the Exch flag in the control information storage unit (meta-control information) in FIG. 35). The control communication mediation unit 21 transmits the created control information setting message to the switch 30 (YES in step S1203 in FIG. 6 and step S1204 in FIG. 6 and an arrow between the control message relay apparatus 20 and the switch 30 in FIG. 35). The switch 30 sets the control information and starts forwarding corresponding packets via Port 1 (see the top entry in the control information storage unit in switch 30 in FIG. 35). Consequently, the set control information has integrated match conditions that match the packets addressed to 192.168.0.100/255.255.255.255 from 192.168.0.1/255.255.255.255 and the packets addressed to 192.168.0.102/255.255.255.255 from 192.168.0.1/255.255.255.255. Thus, while the switch 30 has two entries, the switch 30 can perform packet forwarding for three communications.

As described above, the control message relay apparatus 20 integrates control information and exchanges control information. In this way, the network controller 10 can view that the control information has been successfully set and that the switch 30 enables a broader range of communication simultaneously.

Next, in the present exemplary embodiment in which integrated control information is handled, an operation that the control message relay apparatus 20 performs when receiving an explicit control information removal instruction from the network controller 10 will be described.

First, to cancel the communication addressed to 192.168.0.100/255.255.255.255 from 192.168.0.1/255.255.255.255, the network controller 10 issues a control information removal control message for removing corresponding control information (an arrow between the network controller 10 and the control message relay apparatus 20 in FIG. 36). The control message relay apparatus 20 intercepts the control information removal control message.

The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 27 (step S1202 in FIG. 6).

The control message conversion unit 22 refers to the control information storage unit 25 and determines whether integrated control information that conflicts with the control information exists. In this example, as illustrated in FIG. 36, the control message conversion unit 22 determines that such integrated control information exists as the communication addressed to 192.168.0.100/255.255.255.253 from 192.168.0.1/255.255.255.255 (YES in step S3101 in FIG. 27).

The control message conversion unit 22 determines whether the action in the control information instructed to be removed matches the action in the integrated control information that conflicts with the control information. The control message conversion unit 22 determines that these actions match (YES in step S3102 in FIG. 27).

Since the received control message is a removal request (YES in step S3105 in FIG. 27), the control message conversion unit 22 refers to the control information storage unit 25 and determines whether the control information requested to be removed is the last control information of all the control information in the conflicting integrated control information. As indicated by a Met flag in the control information storage unit in FIG. 36, the control information addressed to 192.168.0.102/255.255.255.255 from 192.168.0.1/255.255.255.255 still exists. Thus, at this point, the control information requested to be removed is not the last control information of the integrated control information (NO in step S3106 in FIG. 27).

The control message conversion unit 22 updates, namely, removes the removal target control information from the control information storage unit 25 (see step S3107 in FIG. 27, see the removal of the top entry from the (upper) control information storage unit in FIG. 36, and see FIG. 37 in which the entry has been removed). Having removed the control information, the control message conversion unit 22 creates a control information removal notification message addressed to the network controller 10, indicating that the message is a response to the removal request (step S3108 in FIG. 27). The control communication mediation unit 21 transmits the control information removal notification message to the network controller 10 (an arrow between the control message relay apparatus 20 and the network controller 10 in FIG. 37).

Figure 38:
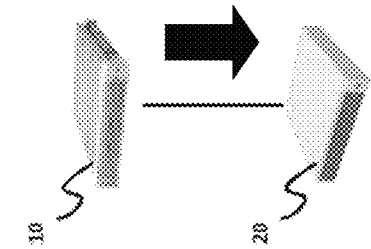
FIG. 38 is a diagram that follows FIG. 37.

Next, if the network controller 10 instructs removal of the control information addressed to 192.168.0.102/255.255.255.255 from 192.168.0.1/255.255.255.255, the network controller 10 transmits a control information setting message instructing removal of the control information to the switch 30 (an arrow between the network controller 10 and the control message relay apparatus 20 in FIG. 38). The control message relay apparatus 20 intercepts the control information removal control message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule that corresponds to the flow illustrated in FIG. 27 (step S1202 in FIG. 6).

The control message conversion unit 22 refers to the control information storage unit 25 and determines whether integrated control information that conflicts with the control information exists. In this example, as illustrated in FIG. 38, the control message conversion unit 22 determines that such integrated control information exists as the communication addressed to 192.168.0.100/255.255.255.253 from 192.168.0.1/255.255.255.255 (YES in step S3101 in FIG. 27).

The control message conversion unit 22 determines whether the action in the control information instructed to be removed matches the action in the conflicting integrated control information. The control message conversion unit 22 determines that the actions match (YES in step S3102 in FIG. 27).

Since the received control message is a removal request (YES in step S3105 in FIG. 27), the control message conversion unit 22 refers to the control information storage unit 25 and determines whether the control information requested to be removed is the last control information of all the control information in the conflicting integrated control information. This time, as illustrated in FIG. 38, the removal target control information is the last control information in the integrated control information (YES in step S3106 in FIG. 27).

The control message conversion unit 22 creates a control information removal control message addressed to the switch 30, to remove the integrated control information. In addition, the control message conversion unit 22 marks the control information in the control information storage unit 25 with a removing flag (see step S3111 in FIG. 27 and the Rem flag in the control information storage unit (meta-control information) in FIG. 39). The control communication mediation unit 21 transmits the created control information setting message to the switch 30 (an arrow between the control message relay apparatus 20 and the switch 30 in FIG. 39).

Based on the received control message for removing the control information, the switch 30 removes the control information addressed to 192.168.0.100/255.255.255.253 from the 192.168.0.1/255.255.255.255 and stops forwarding the corresponding packets (see the top entry in the control information storage unit of the switch 30 in FIG. 40). The switch 30 transmits a control information removal notification message that indicates that the corresponding control information has been removed in response to a removal request to the network controller 10 (an arrow between the switch 30 and the control message relay apparatus 20 in FIG. 40).

The control message relay apparatus 20 intercepts the control information removal notification message. The control message conversion unit 22 of the control message relay apparatus 20 refers to the switch information storage unit 24 and determines that a control communication correspondence relationship exists (YES in step S1201 in FIG. 6). Thus, the control message conversion unit 22 refers to the control policy storage unit 23 and applies the conversion rule in accordance with the flow illustrated in FIG. 29.

The control message conversion unit 22 refers to the control information storage unit 25 and determines that the control information for the communication addressed to 192.168.0.100/255.255.255.253 from 192.168.0.1/255.255.255.255, the control information being written in the control information removal notification message, is integrated control information (YES in step S3301 in FIG. 29). The control message conversion unit 22 determines that the reason of the removal written in the control information removal notification message is a response to the removal request and that the corresponding integrated control information does not have a removing-for-exchange flag by referring to the control information storage unit 25 (NO in step S3302 in FIG. 29).

Figure 41:
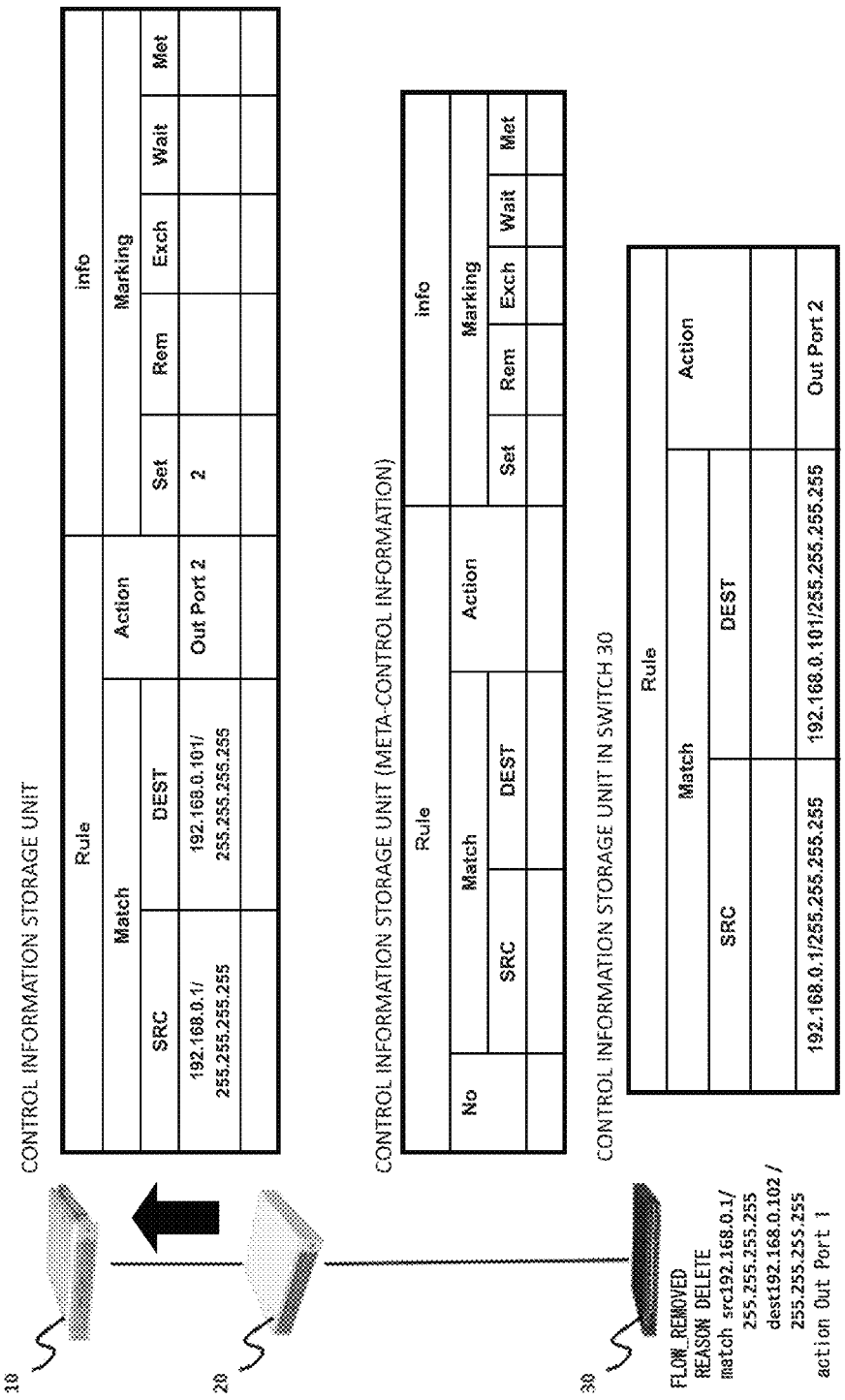
FIG. 41 is a diagram that follows FIG. 40.

The control message conversion unit 22 removes the corresponding integrated control information from the control information storage unit 25 (see the control information storage unit (meta-control information) in FIG. 41). In addition, from the control information storage unit 25, the control message conversion unit 22 extracts the integration target control information for the communication addressed to 192.168.0.102/255.255.255.255 from 192.168.0.1/255.255.255.255 corresponding to the integrated control information and removes the integration information column (Met flag) of the integration target control information (step S3303 in FIG. 29).

Next, for the integration target control information, the control message conversion unit 22 refers to the control policy storage unit 23 and applies the conversion rule that corresponds to the flow illustrated in FIG. 9 (step S3304 in FIG. 29). In this way, the control message conversion unit 22 removes the control information for the communication addressed to 192.168.0.102/255.255.255.255 from 192.168.0.1/255.255.255.255, which is an integration target rule, and performs removal notification processing. About the control information for the communication addressed to 192.168.0.102/255.255.255.255 from 192.168.0.1/255.255.255.255, the control message relay apparatus 20 transmits a control information removal notification message to the network controller 10 (an arrow between the control message relay apparatus 20 and the network controller 10 in FIG. 41).

As described above, according to the present exemplary embodiment, the control message relay apparatus 20 causes the network controller 10 to view as if more control information than actual were set in the switch 30. Namely, while the number of actually set control information entries differs from that viewed by the network controller 10, the network controller 10 recognizes that all the necessary control information is set. In addition, the switch 30 operates while recognizing that necessary control information is properly set by the network controller 10.

While the above first and second exemplary embodiments have been described assuming that the control message relay apparatus 20 is connected to a single network controller 10 and a single switch 30, the control message relay apparatus 20 may be connected to a plurality of network controllers 10 and a plurality of switches 30. In such case, an association between a network controller and a switch is stored and managed in the switch information storage unit 24. Thus, the control message relay apparatus 20 can determine forwarding destinations of communication control messages by referring to the switch information storage unit 24.

Third Exemplary Embodiment

Figure 42:
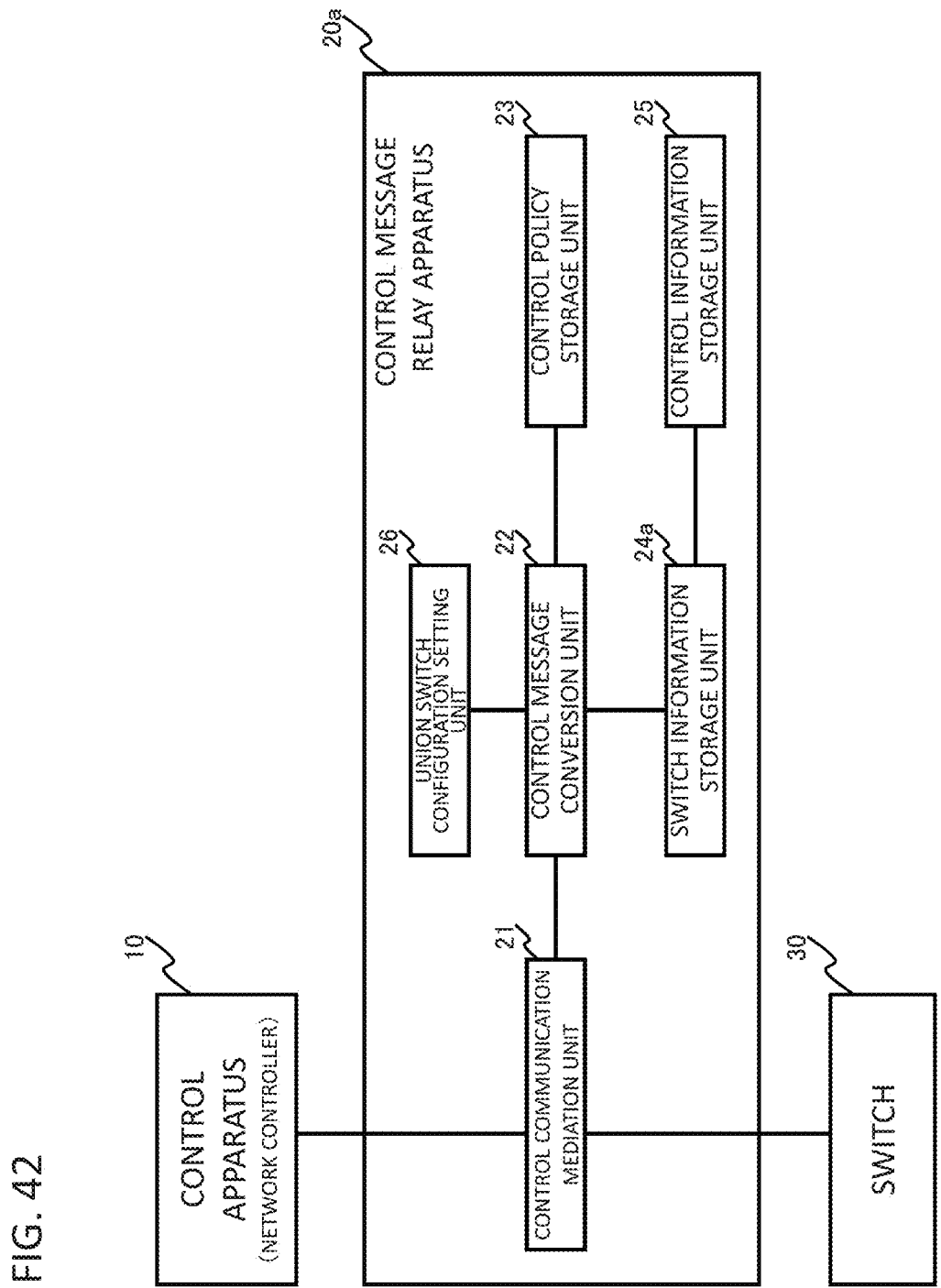
FIG. 42 illustrates a configuration of a control message relay apparatus according to a third exemplary embodiment of the present invention.

Next, a third exemplary embodiment of the present invention will be described in detail with reference to the drawings. A control message relay apparatus 20a according to the third exemplary embodiment converts control messages so that a plurality of switches appear to be a single switch. FIG. 42 illustrates a configuration of the control message relay apparatus 20a according to the third exemplary embodiment of the present invention. FIG. 42 illustrates the control message relay apparatus 20a including a union switch configuration setting unit 26 in addition to the components according to the above first exemplary embodiment. Since other components are the same as those according to the first exemplary embodiment, the following description will be made with a focus on the difference.

The union switch configuration setting unit 26 stores conditions for causing a plurality of switches to appear to be a single switch and a correspondence relationship rule. Hereinafter, a single virtual switch obtained by unifying a plurality of switches will be referred to as a union switch (or a VSW).

For example, as the conditions for configuring a union switch, aggregating configuration conditions of actual switches and how identifiers and ports are viewed as a union switch, which appears to be a single switch configured by a plurality of switches, may be used. For example, if there is a set of switches and if the number of ports that one switch shows to the outside is the same as the number of ports of another switch, the ports being connected to the one switch, the set of switches can be viewed as a single union switch configured by aggregating the ports shown to the outside.

Figure 43:
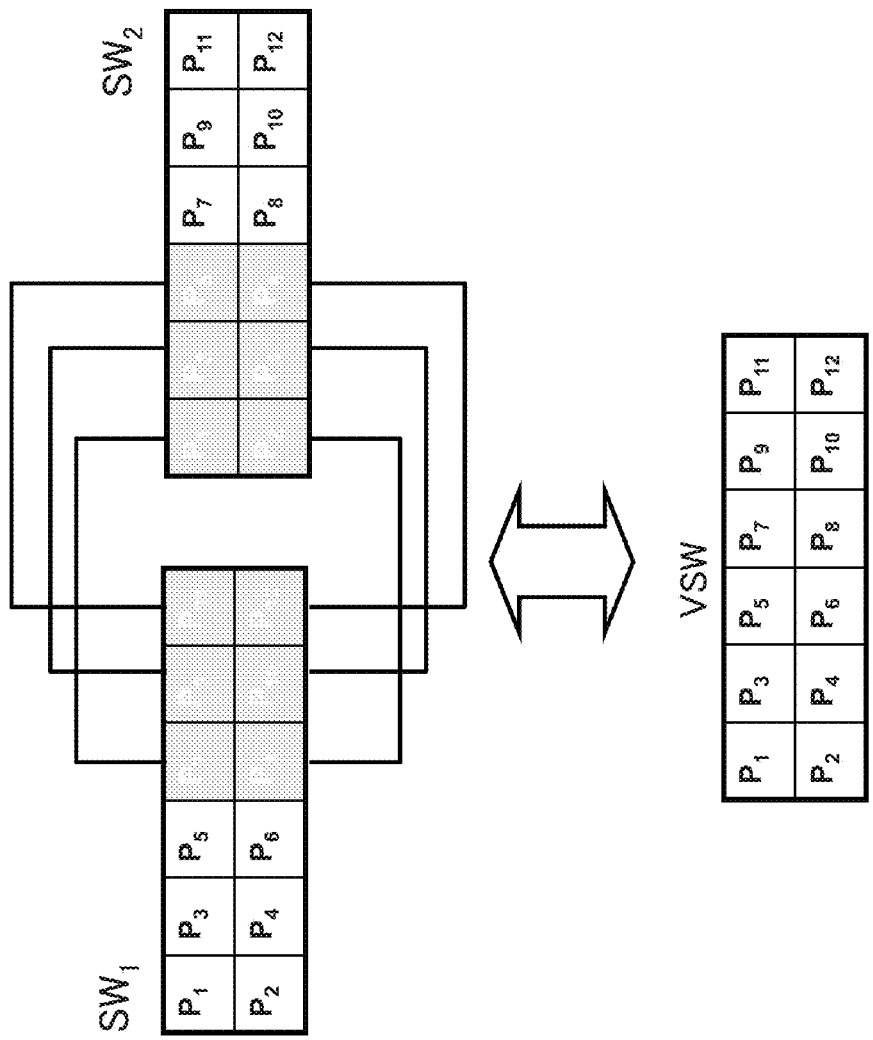
FIG. 43 illustrates switches virtually united by the control message relay apparatus according to the third exemplary embodiment of the present invention.

FIG. 43 illustrates switches virtually united by the control message relay apparatus according to the third exemplary embodiment of the present invention. FIG. 43 illustrates switches SW1 and SW2, and the switches SW1 and SW2 show ports P1 to P6 and ports P7 to P12 to the outside, respectively. In addition, the switch SW1 has ports P7 to P12 connected to ports P1 to P6 of the switch SW2. Namely, the number of the ports of the switch SW1 that are connected to the switch SW2 is the same as the number of the ports P7 to P12 of the switch SW2 that are shown to the outside. Likewise, the switch SW2 has the ports P1 to P6 connected to the ports P7 to P12 of the switch SW1. Namely, the number of the ports of the switch SW2 that are connected to the switch SW1 is the same as the number of the ports P1 to P6 of the switch SW1 that are shown to the outside. In such case, these switches SW1 and SW2 are associated with each other as a single virtual union switch VSW. In addition, ports P1 to P6 of the union switch VSW are associated with the ports P1 to P6 of the switch SW1, and ports P7 to P12 of the union switch VSW are associated with the ports P7 to P12 of the switch SW2.

In the conditions for configuring a union switch, it is preferable that identifiers and aggregating configuration conditions of actual switches, identifiers as a union switch, which appears to be a single switch configured by a plurality of switches, and port identifiers of the union switch be specified. For example, in the example in FIG. 43, identifiers of the switches SW1 and SW2 and connection between the ports P7 to P12 of the switch SW1 and the ports P1 to P6 of the switch SW2 as an aggregating configuration condition are explicitly specified. In such case, as conditions for configuring a union switch, VSW as an identifier of a union switch and P1 to P12 as port identifiers can be clearly written. In this way, even if another switch has the same configuration, union with such switch can be prevented.

In addition, a switch information storage unit 24a according to the present exemplary embodiment stores configuration information and a correspondence relationship about a union switch(es) in addition to a correspondence relationship(s) between a network controller(s) and a switch(es). Namely, the switch information storage unit 24a stores configuration information about an actually configured union switch(es) (see the "union switch configuration table" in each of FIGS. 46 and 56).

Figure 44:
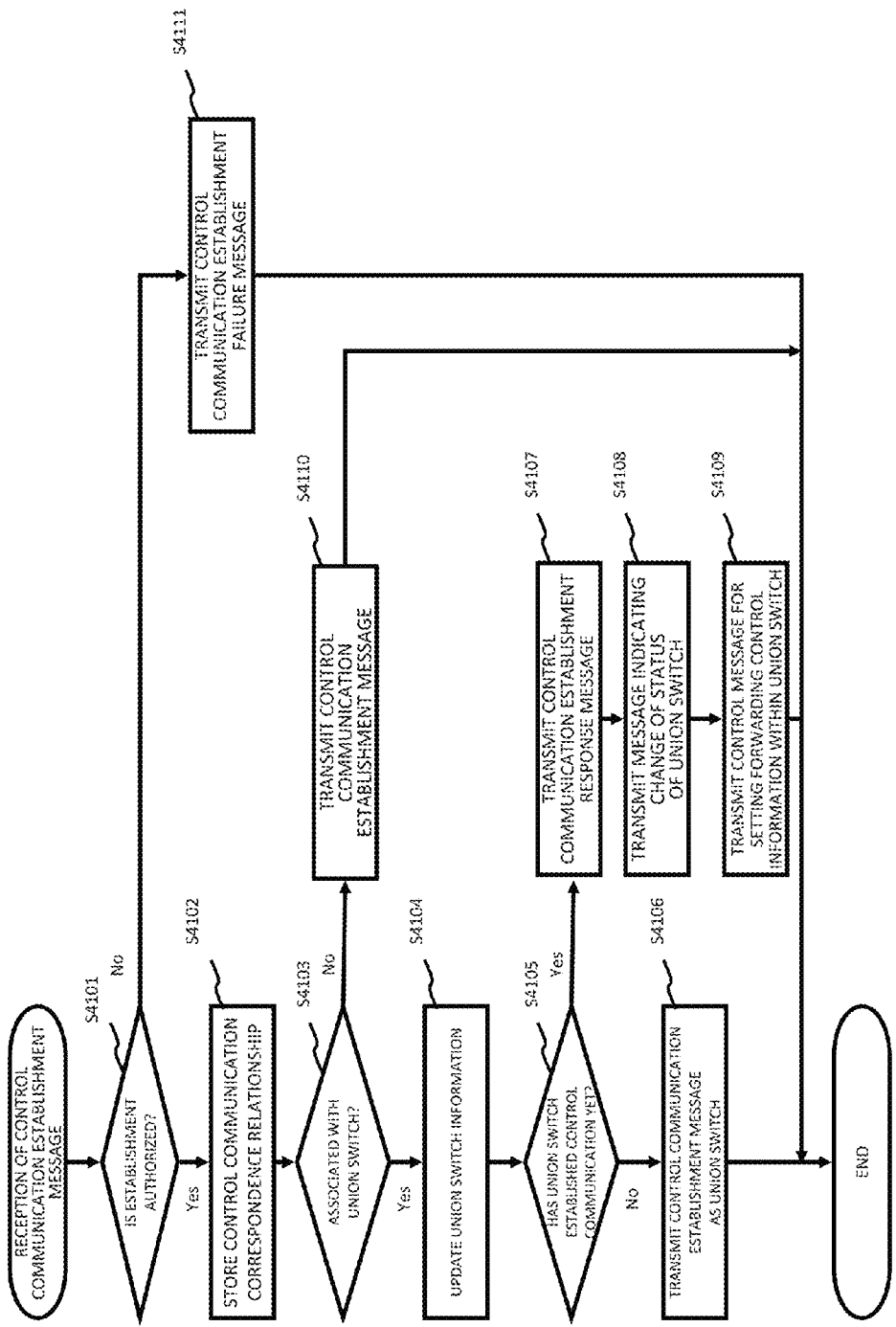
FIG. 44 is a flowchart illustrating an operation that the control message relay apparatus according to the third exemplary embodiment of the present invention performs (when receiving a control communication establishment message).

Next, an operation according to the present exemplary embodiment will be described in detail with reference to the drawings. FIG. 44 is a flowchart illustrating an operation that the control message relay apparatus according to the third exemplary embodiment of the present invention performs (when receiving a control communication establishment message). This flow is started when the control message relay apparatus 20a intercepts a control communication establishment message issued from the network controller 10 or the switch 30.

When the control communication mediation unit 21 of the control message relay apparatus 20a intercepts a control communication establishment message issued from the network controller 10 or the switch 30, the control communication mediation unit 21 notifies the control message conversion unit 22 of the message. The control message conversion unit 22 refers to the control policy storage unit 23 and extracts a correspondence relationship rule between the network controller and the switch. In accordance with the correspondence relationship rule between the network controller and the switch, as needed, the control message conversion unit 22 refers to the switch information storage unit 24 and determines whether establishment of communication between the network controller 10 and the switch 30, the communication corresponding to the intercepted control communication establishment message, is authorized (step S4101 in FIG. 44).

If the communication between the network controller and the switch corresponding to the intercepted control communication establishment message is authorized (YES in step S4101 in FIG. 44), the control message conversion unit 22 of the control message relay apparatus 20a stores the connection relationship between the network controller and the switch in the switch information storage unit 24. If the corresponding information has already been set, the control message conversion unit 22 stores an enable flag or the like indicating that the connection relationship message has been authorized or enabled (step S4102 in FIG. 44).

The control message conversion unit 22 refers to the union switch configuration setting unit 26 and determines whether the control communication establishment target switch is associated with a union switch (step S4103 in FIG. 44).

If so (YES in step S4103 in FIG. 44), the control message conversion unit 22 updates the switch information storage unit 24 to indicate that the control communication establishment target switch is added to the union switch (step S4104 in FIG. 44).

The control message conversion unit 22 refers to the switch information storage unit 24 and determines whether the union switch has already established communication control (step S4105 in FIG. 44).

If the union switch with which the control communication establishment target switch is integrated has not established control communication yet (NO in step S4105 in FIG. 44), the control message conversion unit 22 creates a control communication establishment message specifying the union switch as the control communication establishment target and transmits the message via the control communication mediation unit 21 (step S4106 in FIG. 44). In the case of a network system in which a switch has the initiative in establishing communication, the control communication establishment message specifying the union switch as the control communication establishment target is a control communication establishment message specifying the switch identifier as the union switch. In contrast, in the case of a network system in which a network controller has the initiative in establishing communication, since the network controller transmits a control communication establishment message addressed to a union switch, the control message conversion unit 22 converts the message into a message addressed to each of the switches that configures the union switch.

If the union switch with which the control communication establishment target switch is integrated has already established control communication (YES in step S4105 in FIG. 44), since the node to which the control communication establishment message is directed has already been established as a union switch, the control message conversion unit 22 does not need to request establishment of control communication. However, the requesting node needs to be notified of an establishment response. Thus, the control message conversion unit creates a message in response to the control communication establishment request and transmits the message via the control communication mediation unit 21 (step S4107 in FIG. 44).

In addition, since the configuration status of the union switch is changed, as needed, the control message conversion unit 22 creates a message indicating change of the status of the union switch and transmits the message to the network controller 10 or the switch 30 via the control communication mediation unit 21 (step S4108 in FIG. 44). For example, if port information is included at the time of establishment of control communication, when a union target switch is newly integrated with a union switch, it is necessary to newly create a union switch port(s) of the new integrated switch. The control message conversion unit 22 creates this information as an added-port message and transmits the message. In the case of a network in which such configuration information or the like is not exchanged at the time of the establishment, the present processing can be omitted.

If the control message conversion unit 22 refers to the union switch configuration setting unit 26 and determines that there is control information that is permanently set at the time of the configuration of the union switch, the control message conversion unit 22 creates a control information setting message for setting the control information and transmits the message via the control communication mediation unit 21. In addition, in this operation, if there is necessary management information, the control message conversion unit 22 stores the information in the switch information storage unit 24 and the control information storage unit 25 (step S4109 in FIG. 44).

If the control communication establishment target switch is not associated with a union switch (NO in step S4103 in FIG. 44), the control message conversion unit 22 creates a new control communication establishment message for the establishment target based on the intercepted control communication establishment message and transmits the message to the establishment target via the control communication mediation unit 21 (step S4110 in FIG. 44).

In addition, if establishment for the control communication establishment message is not authorized (NO in step S4101 in FIG. 44), the control message conversion unit 22 creates and transmits a control communication establishment failure response message to the node that has transmitted the control communication establishment message via the control communication mediation unit 21. If such a communication establishment failure response is not needed, the present processing can be omitted (step S4111 in FIG. 44).

As illustrated in the above control, the control message relay apparatus 20a can be inserted as a mediator in control communication between the network controller 10 and the switch 30. In addition, communication control between a union switch configured by virtualizing a plurality of switches as a single switch and a network controller can be established.

Next, a mediation operation that the control message relay apparatus 20*a* performs when intercepting a communication control message between the network controller 10 and the switch 30 will be described with reference to a flowchart in FIG. 45.

This flow is started when the control message relay apparatus 20*a* intercepts a communication control message issued from the network controller 10 or the switch 30.

When the control communication mediation unit 21 of the control message relay apparatus 20*a* intercepts a communication control message issued from the network controller 10 or the switch 30, the control communication mediation unit 21 transmits the communication control message to the control message conversion unit 22.

Figure 45:
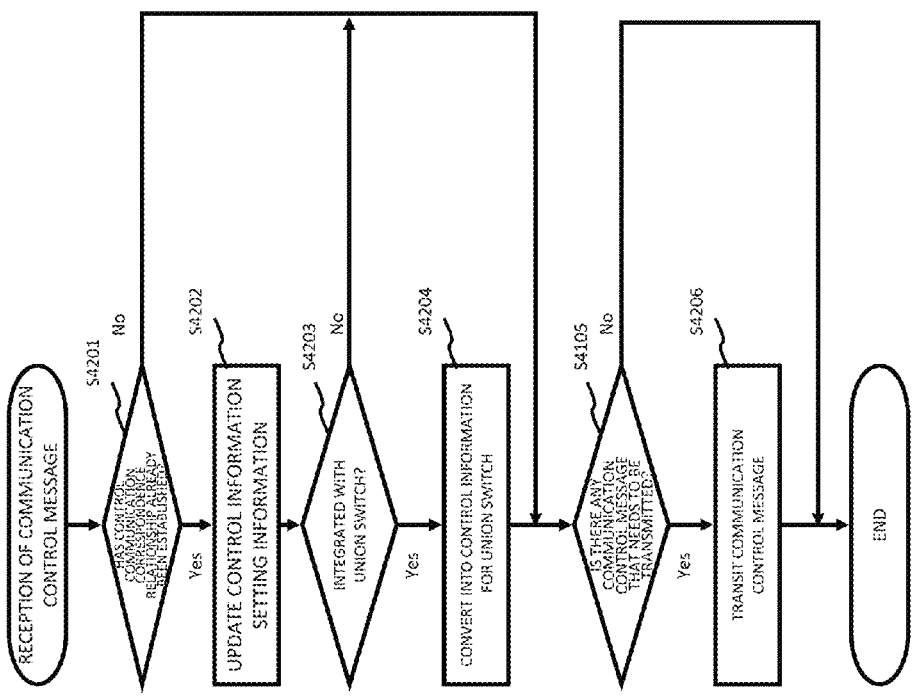
FIG. 45 illustrates an operation that the control message relay apparatus according to the third exemplary embodiment of the present invention performs (when receiving a communication control message).

The control message conversion unit 22 refers to the switch information storage unit 24 and determines whether control communication has been established between the network controller 10 and the switch 30 (step S4201 in FIG. 45).

If control communication has been established between the network controller 10 and the switch 30 (YES in step S4201 in FIG. 45), the control message conversion unit 22 updates the control information storage unit 25 about the control information (step S4202 in FIG. 45). Depending on the type of the communication control message, for example, if the communication control message is not related to any control information operation, the control information storage unit 25 is not updated.

The control message conversion unit 22 refers to the switch information storage unit 24 and determines whether the switch that has transmitted the communication control message or the control information setting target switch has been integrated in a union switch (step S4203 in FIG. 45).

If so (YES in step S4203 in FIG. 45), the control message conversion unit 22 refers to the control policy storage unit 23 and extracts a conversion rule for converting a control information operation content specified in the communication control message into a control information operation content for the union switch. Based on the conversion rule, the control message conversion unit 22 converts the communication control message or creates a new communication control message. The control message conversion unit 22 associates switch identifiers of the union switch and the actual switch (step S4204 in FIG. 45).

If the control message conversion unit 22 creates a new communication control message or converts the communication control message based on the conversion rule (YES in step S4205 in FIG. 45), the control message conversion unit 22 transmits the created or converted communication control message to the destination apparatus (step S4206 in FIG. 45).

As illustrated by the above control, the control message relay apparatus 20*a* controls virtualized switch resources based on a conversion rule that accommodates integration.

In contrast, if the control message conversion unit 22 determines that control communication has not been established between the network controller 10 and the switch 30 in step S4201 in FIG. 45 (NO in step S4201 in FIG. 45), the control message conversion unit 22 determines that the intercepted control message is a message requesting a flow of packets through an unestablished communication path. Thus, the control message conversion unit 22 drops the control message. In this way, the control message relay apparatus 20*a* processes the communication between the network controller 10 and the switch 30 that are not connected to each other. In addition, if there is no message or error response to be transmitted (NO in step S4205 in FIG. 45), the control message relay apparatus 20*a* drops the control message and ends the present processing.

As described above, according to the third exemplary embodiment of the present invention, the control message relay apparatus 20*a* can cause the network controller to recognize and manage a plurality of switches as a single switch. In addition, by causing a plurality of switches to appear to be a single switch in this way, use of the switch resources can be balanced. Consequently, operational limitations based on physical limitations of a switch(es) can be lessened.

In addition, since the network controller can be caused to recognize a plurality of switches as a single switch, the present exemplary embodiment contributes to reduction of the load on and of information about management of the switches handled by the network controller.

According to the third exemplary embodiment of the present invention, the control message relay apparatus 20*a* causes a higher-level network controller to recognize a plurality of switches as a single switch. Namely, an apparatus that corresponds to the upper-level network controller views as if the apparatus were handling a single switch. This signifies that a switch handled by a certain control message relay apparatus 20*a* may be a union switch virtualized by another control message relay apparatus 20*a*. Thus, the present exemplary embodiment can be realized by a configuration in which control message relay apparatuses 20*a* are arranged hierarchically. By hierarchically arranging control message relay apparatuses 20*a*, hierarchical management can be realized.

Next, the above series of operations will be described along with statuses of the control information storage units of the control message relay apparatus 20*a* and the switch 30 with reference to FIGS. 46 to 56.

The following description will be made assuming that a switch 30-1 (SW1) and a switch 30-2 (SW2) are virtually unified as illustrated in FIG. 43. In addition, the control information storage unit of each switch can store up to 1024 entries, not 2 entries. FIGS. 46 to 56 illustrate the control information storage unit of the control message relay apparatus 20*a* and of each of the switches. In addition, "ID" in the union switch configuration table illustrated at the top in each of FIGS. 46 to 56 is a field in which an identifier of a switch is stored to manage the switch. In addition, "Connect" is a field in which a control communication connection status is recorded. In addition, "Virtual ID" is a field indicating a corresponding union switch ID given when switches are unified, and "condition" is a field in which conditions used when switches are unified are stored. The control communication connection status (Connect) is set when an establishment request is mutually satisfied.

In addition, in the following description, control communication conditions are represented as follows. Pp=>VS:Pv represents a case in which a union target switch PS transmits a packet to a logical port Pv of a union switch VS by using a port Pp. In addition, Pv=>PS:Pp represents a case in which a port Pv of a virtual switch VS is associated with a port of a union target switch PS. In addition, if a plurality of ports have sequential numbers and form a condition, the ports may be shortened and represented as Pi to Pj. In addition, in the following description, only the change of a corresponding table(s) will be illustrated. Illustration of the messages will be omitted.

Figure 46:
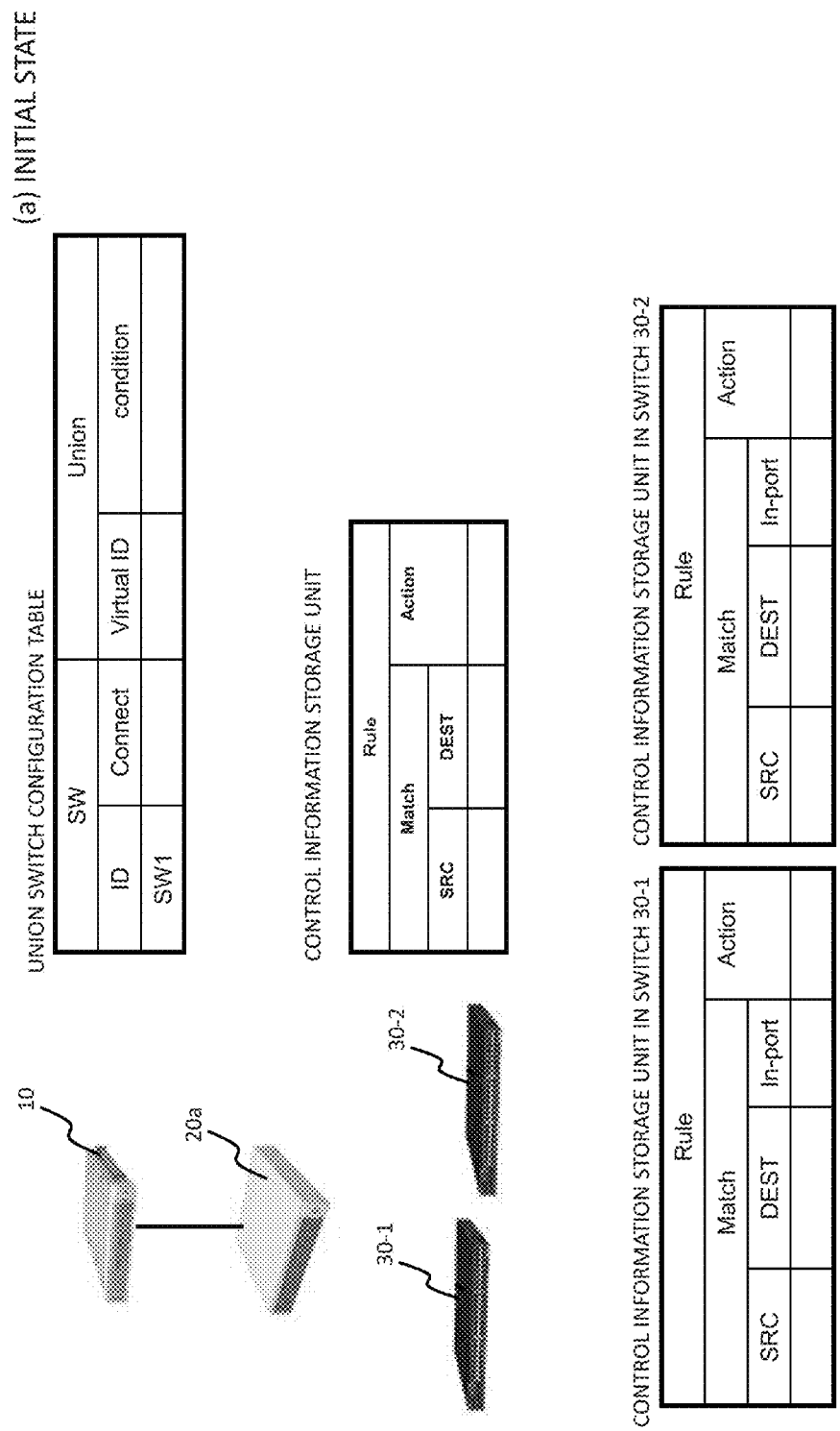
FIG. 46 illustrates a specific example of an operation performed by the control message relay apparatus according to the third exemplary embodiment of the present invention.
Figure 48:
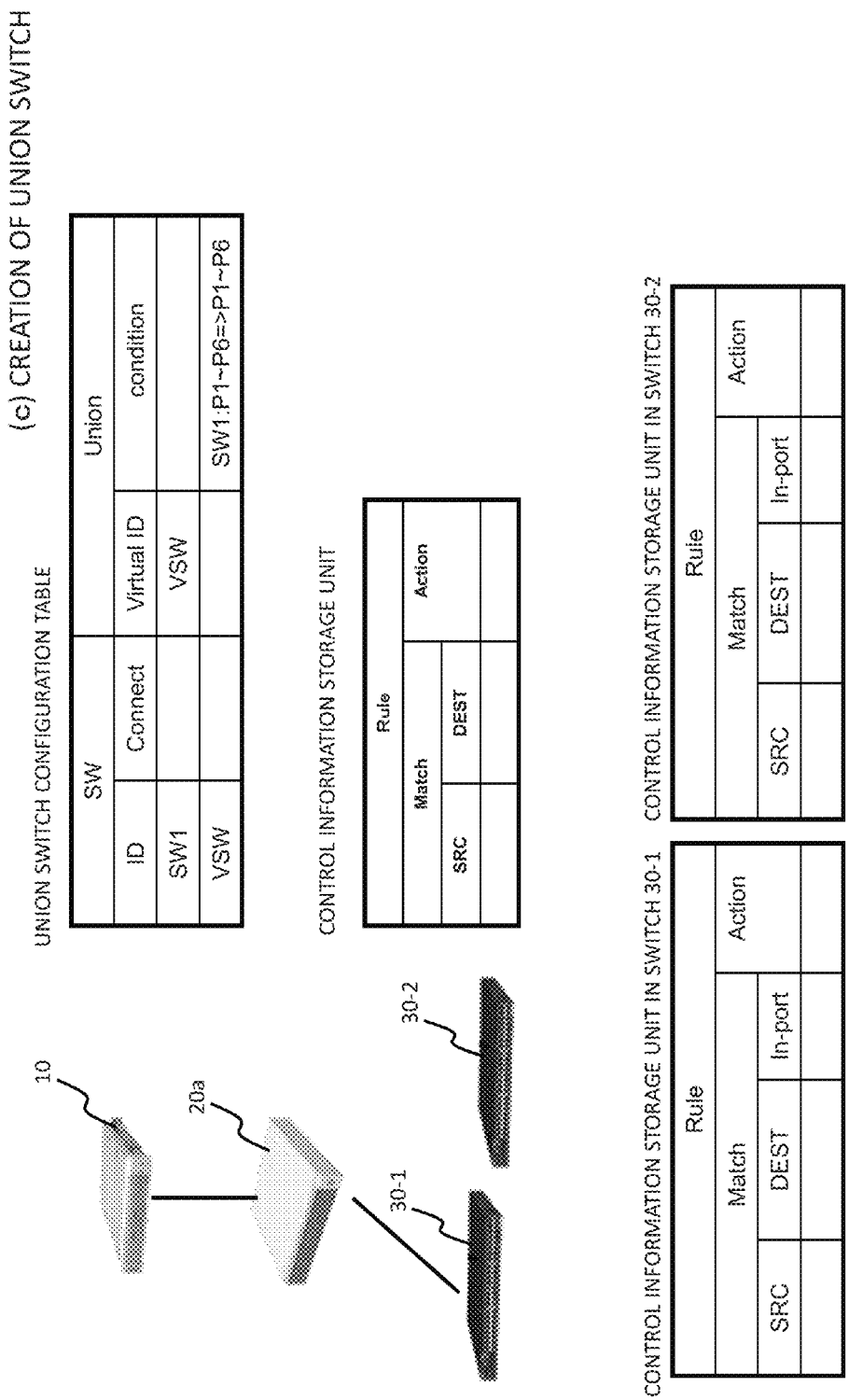
FIG. 48 is a diagram that follows FIG. 47.
Figure 49:
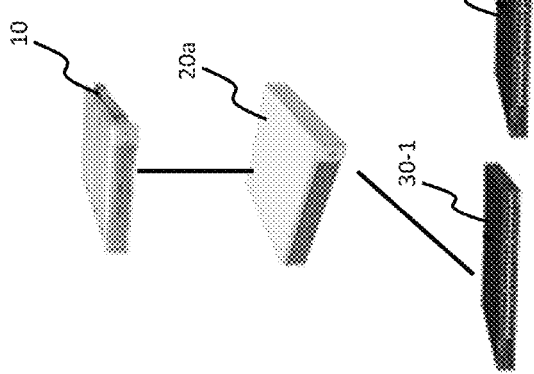
FIG. 49 is a diagram that follows FIG. 48.
Figure 50:
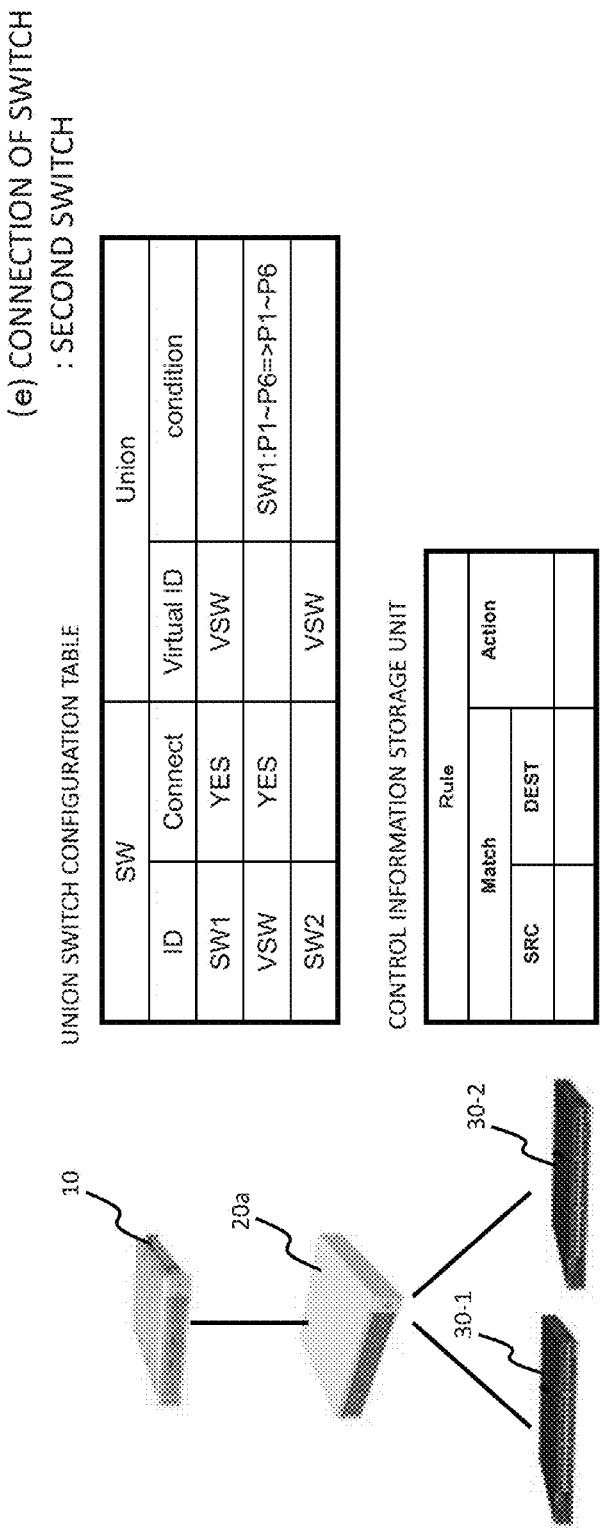
FIG. 50 is a diagram that follows FIG. 49.
Figure 53:
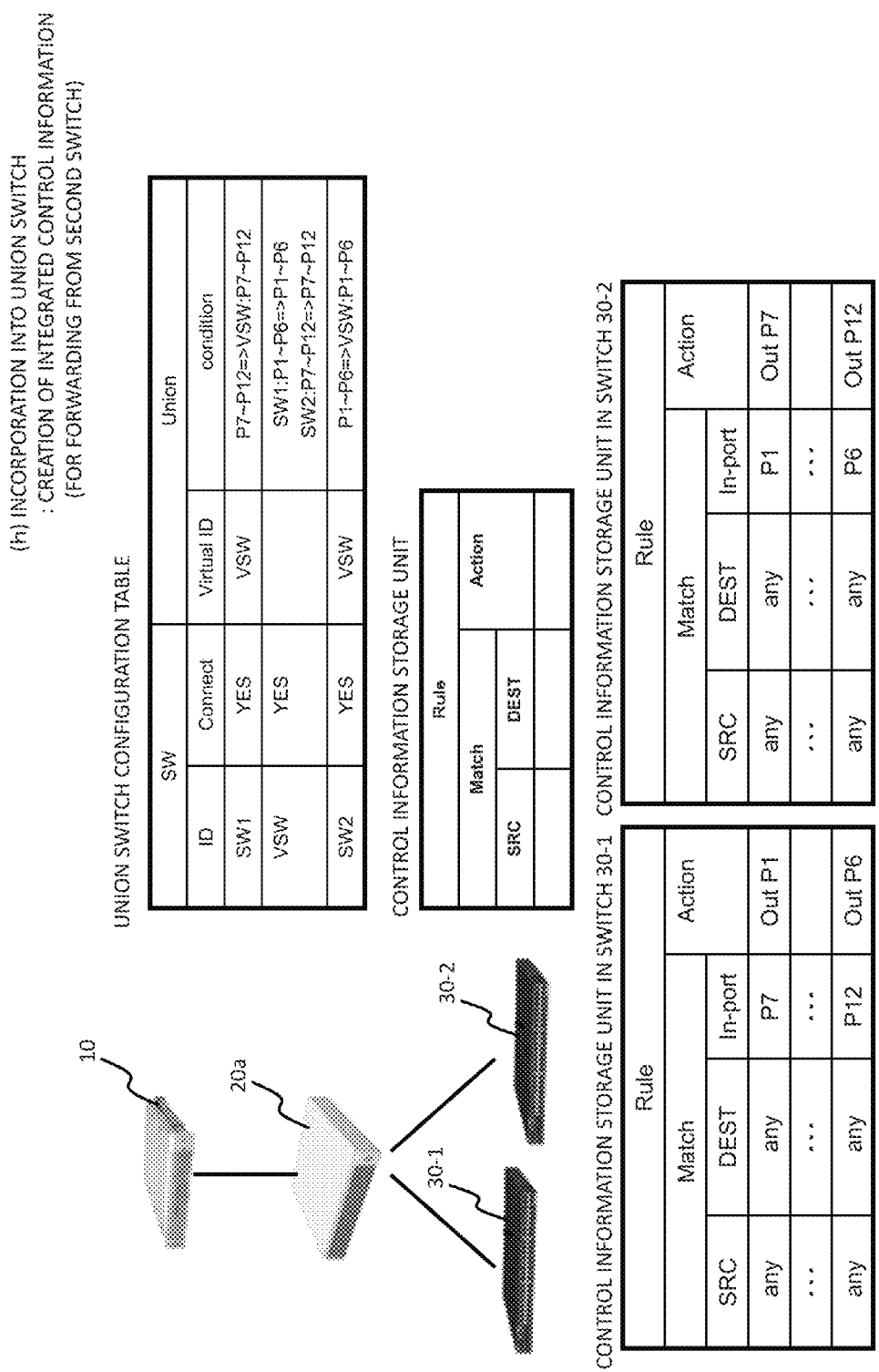
FIG. 53 is a diagram that follows FIG. 52.
Figure 54:
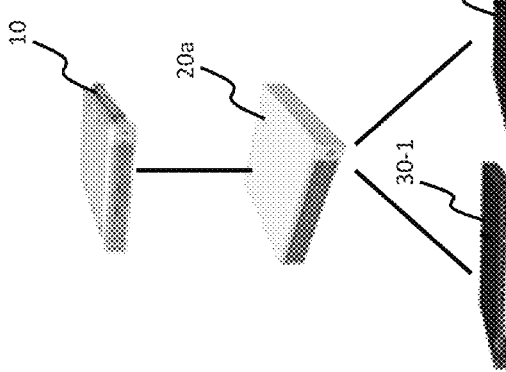
FIG. 54 is a diagram that follows FIG. 53.
Figure 55:
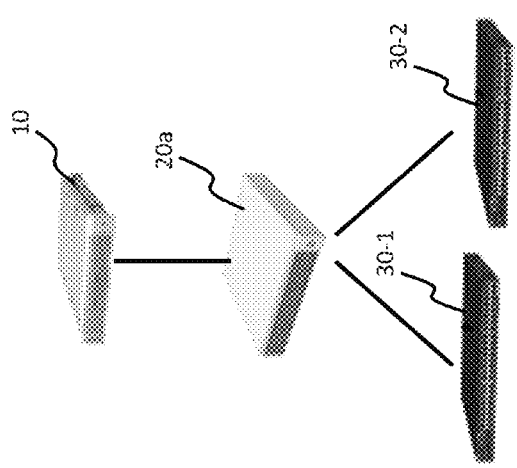
FIG. 55 is a diagram that follows FIG. 54.

FIG. 46 illustrates an initial state in which the switches 30-1 and 30-2 are not connected to each other. As this point, no information is stored in the switch information storage unit 24 or the control information storage unit 25. First, the switch 30-1 connects to the control message relay apparatus 20a to connect to the network controller 10. In this operation, the switch 30-1 transmits a control communication establishment message to the network controller 10.

The control message relay apparatus 20a intercepts the communication establishment message. The control message conversion unit 22 of the control message relay apparatus 20a receives the communication establishment message from the control communication mediation unit 21. The control message conversion unit 22 refers to the control policy storage unit 23, extracts a correspondence relationship rule between the network controller and the switch, and refers to the switch information storage unit 24 to determine whether communication between the network controller 10 and the switch 30-1 is authorized (step S4101 in FIG. 44). In this example, since the communication of the switch 30-1 is not restricted, the control message conversion unit 22 determines that establishment of the communication is authorized. Thus, an entry having ID:SW1 is registered in the union switch configuration table of the switch information storage unit 24 (see step S4102 in FIG. 44 and the union switch configuration table in FIG. 47).

The control message conversion unit 22 refers to the union switch configuration setting unit 26 and determines that the switch 30-1 is associated with a union switch VSW (YES in step S4103 in FIG. 44). In addition, the control message conversion unit 22 registers information about the union switch VSW and its correspondence relationship in the union switch configuration table of the switch information storage unit 24. More specifically, the control message conversion unit 22 registers a correspondence relationship between ports of the switch 30-1 and ports of the union switch VSW, namely, SW1:P1 to P6=>P1 to P6, in the switch information storage unit 24 (see step S4104 in FIG. 44 and the second entry from the top in the union switch configuration table in FIG. 48).

Since the union switch VSW has not established control communication yet, the control message conversion unit 22 creates a control communication establishment request message for allowing the union switch VSW to establish control communication with the network controller 10 and transmits the message to the network controller 10 via the control communication mediation unit 21 (step S4106 in FIG. 44).

When receiving the control communication establishment request message, the network controller 10 transmits a message in response to the control communication establishment request message (transmission of a control communication establishment request message from the network controller 10). When intercepting the control communication establishment request message, the control communication mediation unit 21 of the control message relay apparatus 20a transmits the communication establishment message to the control message conversion unit 22. The control message conversion unit 22 refers to the control policy storage unit 23, extracts a correspondence relationship rule between the network controller and the switch, and refers to the switch information storage unit 24 to determine whether communication between the network controller 10 and the switch VSW is authorized (step S4101 in FIG. 44). In this example, since the communication between the network controller 10 and the switch VSW is authorized, the control message conversion unit 22 marks the corresponding entry in the union switch configuration table of the switch information storage unit 24 so that completion of establishment of control communication with the union switch VSW is indicated (see step S4104 in FIG. 44 and YES under the Connect column in the second entry from the top in the union switch configuration table in FIG. 49).

Since control communication with the union switch VSW has not been established yet, the control message conversion unit 22 converts the message into a control communication establishment message addressed to the SW1 associated with the union switch and transmits the message to the switch 30-1 via the control communication mediation unit 21 (step S4106 in FIG. 44). In addition, in this operation, the control message conversion unit 22 marks the corresponding entry in the union switch configuration table of the switch information storage unit 24 so that completion of establishment of control information with the switch SW1 is indicated (see YES under the Connect column in the top entry in the union switch configuration table in FIG. 49).

Through the above processing, the network controller 10 recognizes the switch 30-1 as a union switch VSW having six ports.

Next, an operation in which the switch 30-2 connects to the control message relay apparatus 20a to connect to the network controller 10 will be described. First, the switch 30-2 transmits a control communication establishment message to the network controller 10. The control message relay apparatus 20a intercepts the communication establishment message. The control message conversion unit 22 of the control message relay apparatus 20a receives the communication establishment message from the control communication mediation unit 21. The control message conversion unit 22 refers to the control policy storage unit 23, extracts a correspondence relationship rule between the network controller and the switch, and refers to the switch information storage unit 24 to determine whether communication between the network controller 10 and the switch 30-2 is authorized (step S4101 in FIG. 44). In this example, since the communication of the switch 30-2 is not restricted, the control message conversion unit 22 determines that establishment of the communication is authorized. Thus, an entry having ID:SW2 is registered in the union switch configuration table of the switch information storage unit 24 (see step S4102 in FIG. 44 and the union switch configuration table in FIG. 50).

The control message conversion unit 22 refers to the union switch configuration setting unit 26 and determines that the switch 30-2 is associated with the union switch VSW (YES in step S4103 in FIG. 44). Since the union switch VSW has already been registered in the switch information storage unit 24, the control message conversion unit 22 updates only the correspondence relationship in the switch information storage unit 24. More specifically, the control message conversion unit 22 registers a correspondence relationship between ports of the switch 30-2 and ports of the union switch VSW, namely, SW2:P7 to P12=>P7 to P12, in the switch information storage unit 24 (see step S4104 in FIG. 44 and the second entry from the top in the union switch configuration table in FIG. 50).

Next, since the union switch VSW has already established control communication, the control message conversion unit 22 creates a control communication establishment response (control communication establishment message) addressed to the switch 30-2 and transmits the response to the switch 30-2 via the control communication mediation unit 21 (step S4107 in FIG. 44). In addition, the control message conversion unit 22 marks the entry corresponding to the switch SW2 in the switch information storage unit 24 so that completion of establishment of control communication is indicated (see YES under the Connect column in the entry corresponding to the switch SW2 in the union switch configuration table in FIG. 51). In addition, since the ports P7 to 12 of the union switch VSW have been added, the control message conversion unit 22 creates a switch status change message addressed to the network controller 10 and transmits the message to the network controller 10 via the control communication mediation unit 21 (step S4108 in FIG. 44). In this way, the network controller 10 also recognizes the increase of the number of ports.

Finally, the control message conversion unit 22 refers to the union switch configuration setting unit 26 and determines whether permanently set control information exists at the time of the configuration of the union switch. In this example, as illustrated in FIG. 43, the switch SW1 is provided with a rule indicating that, when packets need to be outputted from the ports P7 to P12 of the union switch VSW, the switch SW1 uses ports P7 to P12 for forwarding the packets. Thus, the control message conversion unit 22 stores the corresponding content in the switch information storage unit 24 (see the Condition column corresponding to the switch SW1 in the union switch configuration table in FIG. 52). The control message conversion unit sets permanent control information corresponding to the rule. Namely, the control message conversion unit 22 creates and transmits a control information setting message for setting control information that indicates, when the ports P1 to P6 of the switch SW2 receive packets from the ports P7 to P12 of the switch SW1, the switch SW2 outputs the packets via the ports P7 to P12 of the switch SW2, respectively (step S4109 in FIG. 44). In this way, the control information for the union switch configuration is set in the switch 30-2 (see the control information storage unit of the switch 30-2 in FIG. 52).

Likewise, the control message conversion unit 22 makes a setting about the switch SW2 so that relevant packets are outputted to the switch SW1 (step S4109 in FIG. 44). More specifically, the control message conversion unit 22 updates the switch information storage unit 24 about an entry corresponding to the switch SW2 (see the Condition column corresponding to the switch SW2 in the union switch configuration table in FIG. 53) and sets control information for the union switch configuration in the switch 30-1 (see the control information storage unit of the switch 30-1 in FIG. 53).

Through the above processing, the network controller 10 recognizes the switch 30-2 as six additional ports of the union switch VSW. In this way, the preparation for operating the union switch VSW has been completed.

Next, an operation of the union switch VSW performed when a communication actually occurs will be described. The following description will be made assuming that a communication addressed to 192.168.0.100 from 192.168.0.1 has occurred at the port P1 of the switch 30-1. In addition, this example assumes that 192.168.0.100 is reachable via the port P2 of the switch 30-1.

The switch 30-1 transmits a control information setting request message for processing the packets addressed to 192.168.0.100 from 192.168.0.1 to the network controller 10.

The control message relay apparatus 20a intercepts the control information setting request message. The control communication mediation unit 21 of the control message relay apparatus 20a transmits the control information setting request message to the control message conversion unit 22.

The control message conversion unit 22 refers to the control policy storage unit 23 and applies the conversion rule that corresponds to the flow illustrated in FIG. 45. More specifically, the control message conversion unit 22 refers to the switch information storage unit 24 and determines that control communication has been established between the network controller 10 and the switch 30-1 (YES in step S4201 in FIG. 45). Since this is a control message that does not change control information setting information, the control message conversion unit 22 does not update any control information in the control information storage unit 25 (step S4202 in FIG. 45).

The control message conversion unit 22 refers to the switch information storage unit 24 and determines that the switch 30-1 is integrated with the union switch VSW (YES in step S4203 in FIG. 45). The control message conversion unit 22 converts the intercepted control information setting request message so that the message looks as if the message had been transmitted from the union switch. More specifically, the port P1 of the switch 30-1 indicated in the control information setting request message is converted into the port P1 of the union switch VSW. In addition, the sender of the control information setting request message is converted into the union switch VSW (step S4204 in FIG. 45). The control message conversion unit 22 transmits the converted control information setting request message to the network controller 10 via the control communication mediation unit 21 (step S4206 in FIG. 45).

As a response to the control information setting request message from the union switch VSW, the network controller 10 creates control information for outputting the relevant packets to the port P2 of the union switch VSW and transmits this control information setting control message.

The control message relay apparatus 20a intercepts the control information setting control message. The control communication mediation unit 21 of the control message relay apparatus 20a transmits the intercepted control information setting message to the control message conversion unit 22.

The control message conversion unit 22 refers to the control policy storage unit 23 and applies the conversion rule that corresponds to the flow illustrated in FIG. 45. More specifically, the control message conversion unit 22 refers to the switch information storage unit and determines that control communication has already been established between the network controller 10 and the switch VSW (YES in step S4201 in FIG. 45). Since control information has already been set, the control message conversion unit 22 registers the setting target control information in the control information storage unit 25 (see step S4202 in FIG. 45 and the (middle) control information storage unit in FIG. 54).

In addition, the control message conversion unit 22 refers to the switch information storage unit 24 and determines that the union switch VSW has been integrated (YES in step S4203 in FIG. 45). The port P2 of the switch VSW in the control information setting message corresponds to the port P2 of the switch 30-1. In addition, the port P1 of the input source VSW corresponds to the port P1 of the switch 30-1. The control message conversion unit 22 converts information about these ports. In addition, since the control information setting message can be managed by the switch 30-1, the control message conversion unit 22 sets the destination of the control information setting message to the switch 30-1 (step S4204 in FIG. 45). The control message conversion unit 22 transmits the converted control information setting request message to the switch 30-1 via the control communication mediation unit 21 (step S4206 in FIG. 45). The switch 30-1 sets the received control information therein and starts packet forwarding (see the control information storage unit of the switch 30-1 in FIG. 54).

As illustrated in the above operation, it is seen that, even in an environment in which switches have been unified by the control message relay apparatus 20*a*, the control message relay apparatus 20*a* can perform accurate setting operations by defining conversion rules for converting communication control messages and accumulating management information for converting communication.

The following description will be made assuming that a communication addressed to 192.168.1.100 from 192.168.0.1 has occurred at the port P1 of the switch 30-1. In addition, this example assumes that 192.168.1.100 is reachable via the port P8 of the switch 30-2. In such case, the network controller 10 also performs the same operation as described above. More specifically, the network controller 10 creates and transmits control information that indicates that the packets addressed to 192.168.1.100 from 192.168.0.1 that are inputted via the port P1 of the union switch VSW are outputted via the port P8 of the union switch VSW. Accordingly, the control message relay apparatus 20*a* registers the corresponding control information in the control information storage unit 25 (see the second entry from the top in the (middle) control information storage unit in FIG. 55). The control message relay apparatus 20*a* converts the control information so that the converted control information indicates that the relevant packets inputted via the port P1 of the switch 30-1 are outputted via the port P8 of the switch 30-2. Based on the above permanent control information set at the time of the configuration of the union switch, it is seen that, if a packet is outputted to the port P8 of the switch 30-1, the packet can be outputted to the port P8 of the switch 30-2. Thus, only the control information that indicates the packets addressed to 192.168.1.100 from 192.168.0.1 inputted via the port P1 of the switch 30-1 are outputted to the port P8 is actually set. It is only necessary that the control message relay apparatus 20*a* transmit a control information setting message for causing the switch 30-1 to set only the control information indicating that the packets addressed to 192.168.1.100 from 192.168.0.1 inputted via the port P1 of the switch 30-1 are outputted to the port P8 to the switch 30-1. The switch 30-1 stores the control information in the control information storage unit and starts forwarding the corresponding packets (see the bottom entry in the control information storage unit of the switch 30-1 in FIG. 55).

Figure 56:
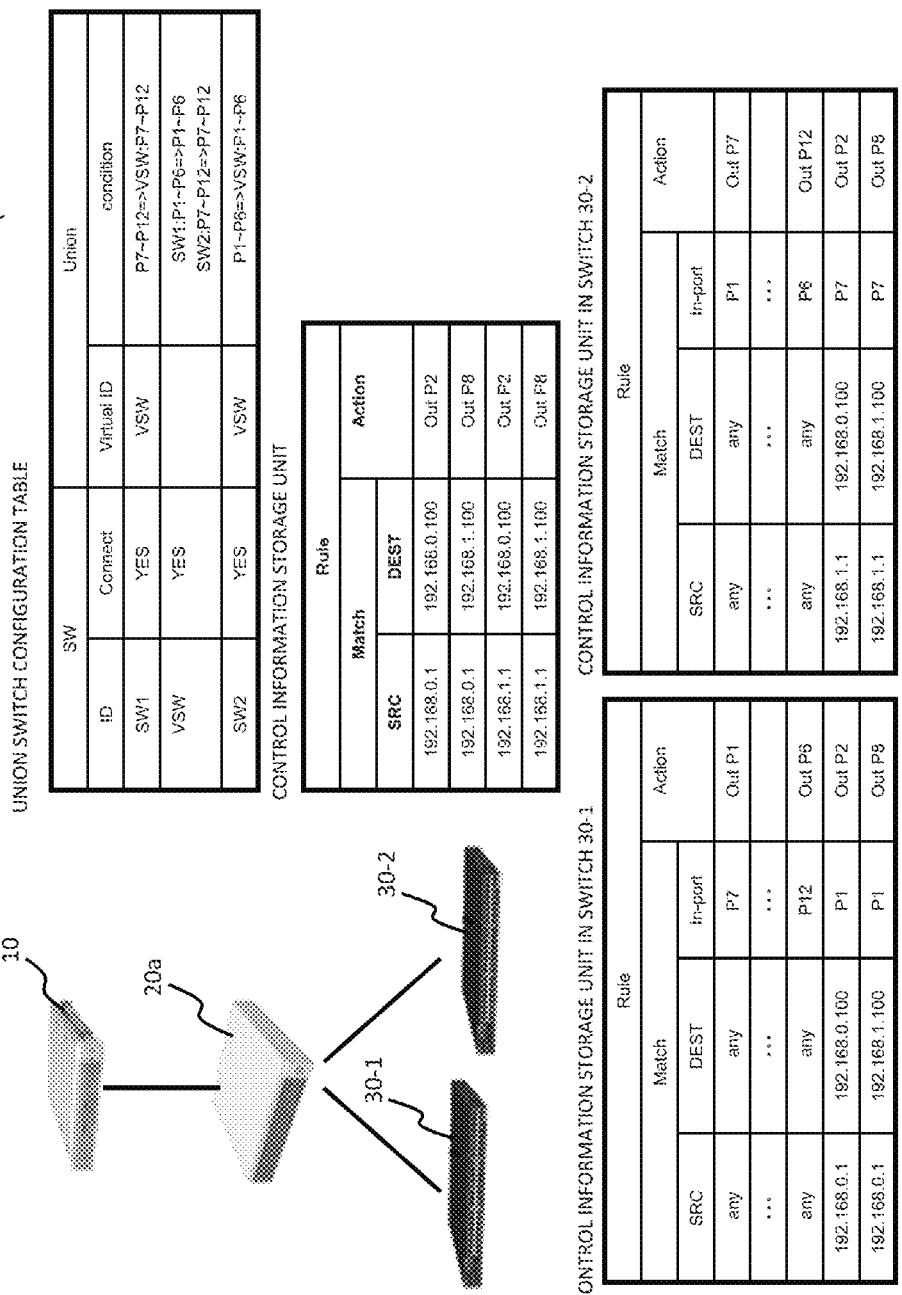
FIG. 56 is a diagram that follows FIG. 55.

Likewise, if a communication addressed to 192.168.0.100 from 192.168.1.1 and a communication addressed to 192.168.1.100 from 192.168.1.1 occur at the port P7 of the switch 30-2, the like processing as described above is performed, and control information is registered only in the switch 30-2 (see the control information storage unit of the switch 30-2 in FIG. 56).

As described in the above example, it is seen that the control message relay apparatus 20*a* can cause a plurality of switches to appear to be a single union switch. In addition, it is seen that the control information storage unit of an individual switch is used while the load thereof is balanced. In this way, the limitation of the control information storage unit (CAM) of an individual switch can be improved. For example, in the above example, the number of control information entries in an individual switch is the sum of the number of communications transmitted from its own switch and the number of control information entries necessary for forwarding. In such case, the union switch VSW can handle up to 2036 communications ((1024 (=the maximum number of entries that can be stored in a control information storage unit)−6 (the number of forwarding control information entries in the union switch))×2 (the number of switches)). It is seen that this is larger than 1024 communications that can be achieved when a single switch is used as it is.

In addition, since the network controller 10 views only the union switch VSW, the network controller 10 recognizes that the network controller 10 is handling a single switch. This signifies that a network controller handling many switches can have a reduced switch management amount. Namely, the present exemplary embodiment contributes to reduction of the information amount.

Fourth Exemplary Embodiment

Figure 57:
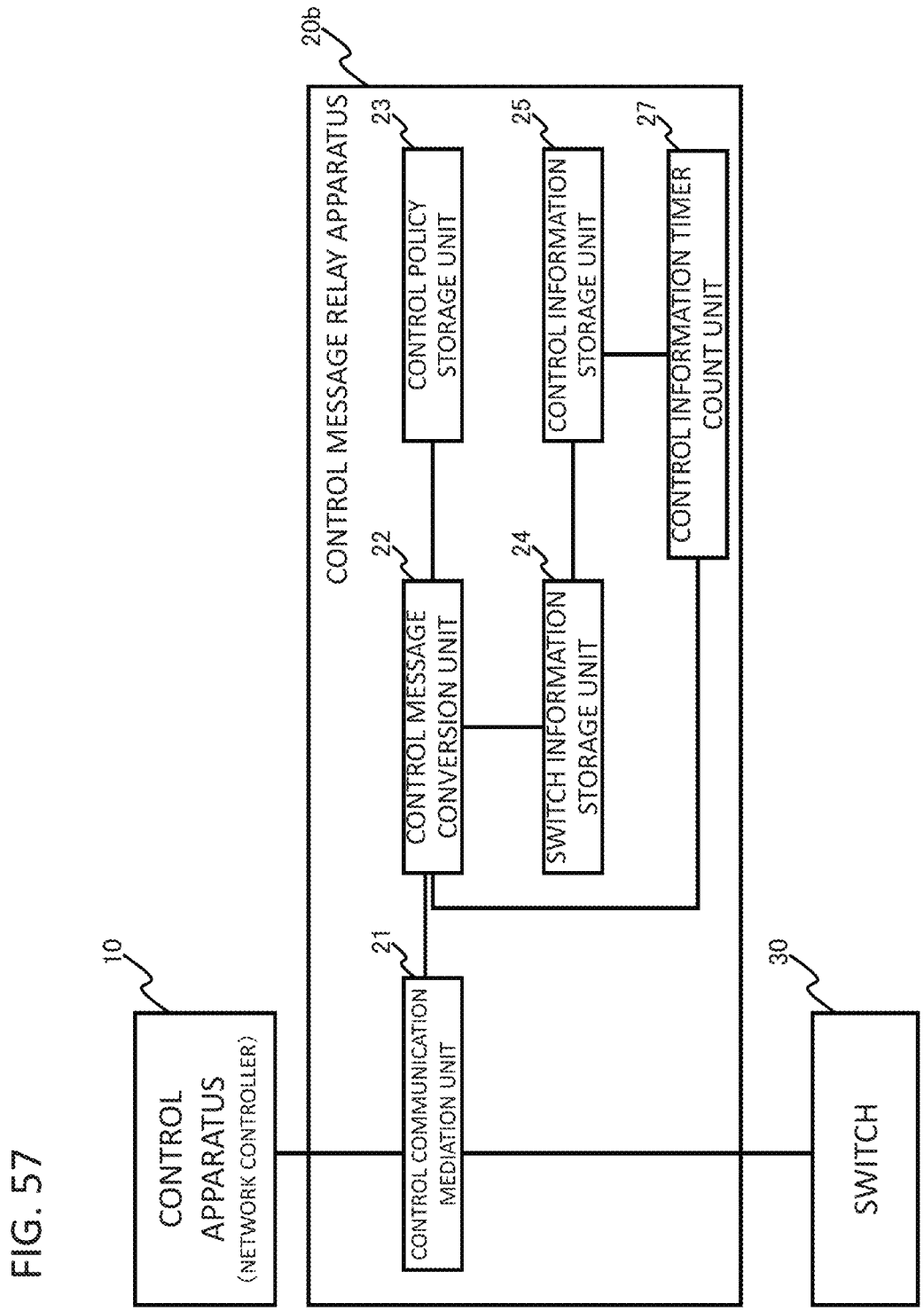
FIG. 57 illustrates a configuration of a control message relay apparatus according to a fourth exemplary embodiment of the present invention.

Next, a fourth exemplary embodiment of the present invention will be described. In the fourth exemplary embodiment, a validity period is set in an individual control information entry. FIG. 57 illustrates a configuration of a control message relay apparatus according to the fourth exemplary embodiment of the present invention. As illustrated in FIG. 57, a control message relay apparatus 20*b* according to the fourth exemplary embodiment includes a control information timer count unit 27 in addition to the components of the control message relay apparatus 20 according to the first exemplary embodiment of the present invention. Hereinafter, the fourth exemplary embodiment will be described with a focus on the difference from the first exemplary embodiment, namely with a focus on the control information timer count unit 27.

The control information timer count unit 27 stores information about validity periods (timer values) given to the control information stored in the control information storage unit 25. More specifically, when new control information is set or when additional information is registered or updated, the control information timer count unit 27 performs an operation of changing information about a validity period given to the control information back to a predetermined value based on information about the control information.

In addition, the control information timer count unit 27 regularly examines validity periods to determine whether any validity period has expired. If a count-up/count-down method is used for validity period information, the control information timer count unit 27 updates (counts up or counts down) the validity period information.

In addition, if control information whose validity period has expired exists and the control information does not have a set flag, the control information timer count unit 27 removes the control information from the control information storage unit 25 and requests the control message conversion unit 22 to perform an operation so that the corresponding control information is removed from the corresponding switch.

When requested by the control information timer count unit 27 to perform such control information removal operation, the control message conversion unit 22 performs processing for deleting the corresponding control information without performing an exchange operation.

Figure 58:
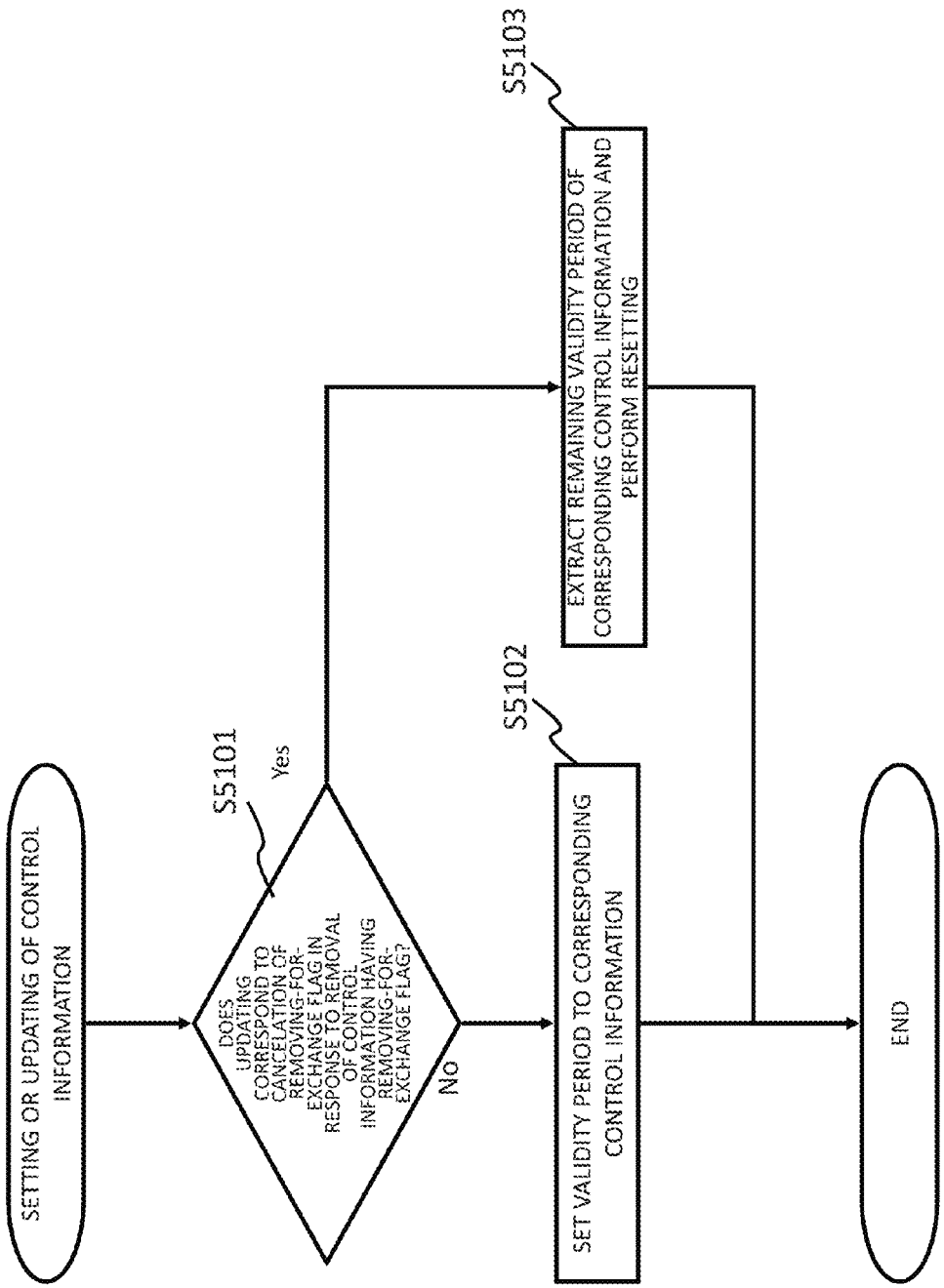
FIG. 58 is a flowchart illustrating an operation (timer setting) performed by the control message relay apparatus according to the fourth exemplary embodiment of the present invention.

Next, an operation according to the present exemplary embodiment will be described in detail with reference to the drawings. FIG. 58 is a flowchart illustrating an operation (timer setting) of the control message relay apparatus according to the fourth exemplary embodiment of the present invention. As illustrated in FIG. 58, first, when the control message conversion unit 22 sets or updates control information in the control information storage unit 25, the control information timer count unit 27 determines whether the control information is marked with a removing-forexchange flag and the updating corresponds to cancellation of a removing-for-exchange flag of control information in response to a removal request (step S5101 in FIG. 58).

If the control information does not correspond to cancellation of a removing-for-exchange flag in response to a removal response, the control information timer count unit 27 refers to validity period information specified in the communication control message and sets a validity period to the control information (step S5102 in FIG. 58).

In contrast, if the control information corresponds to cancellation of a removing-for-exchange flag in response to a removal response, the control information timer count unit 27 extracts the remaining validity period from the control information removal response message. If the control information timer count unit 27 cannot extract the remaining validity period, the control information timer count unit 27 sets a basic validity time (initial value) of the control information. The control information timer count unit 27 sets the extracted remaining validity period as the validity period of the control information (step S5103 in FIG. 58).

Through the above processing, the control message relay apparatus 20b can simulate a validity period for control information that is not actually set in a switch.

Figure 59:
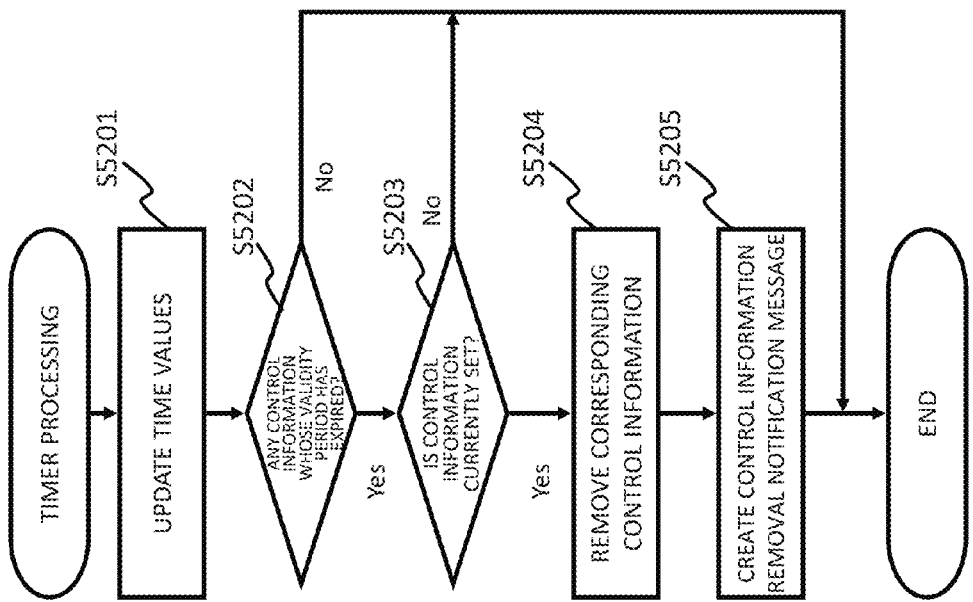
FIG. 59 is a flowchart illustrating an operation (determination of a validity period) performed by the control message relay apparatus according to the fourth exemplary embodiment of the present invention.

FIG. 59 is a flowchart illustrating an operation (determination of a validity period) of the control message relay apparatus according to the fourth exemplary embodiment of the present invention. The latter half of the flowchart in FIG. 59 is embodied by the processing described in the first exemplary embodiment in which the control message conversion unit 22 removes control information without performing any exchange operation.

The timer processing in FIG. 59 is called regularly. Alternatively, if explicit validity period information can be grasped and if the present processing can be called by an event mechanism or the like at relevant time, a system of such event mechanism may be used.

As illustrated in FIG. 59, the control information timer count unit 27 updates timer values. For example, if the validity periods are stored as time, the control information timer count unit 27 updates the time values compared with a threshold (time-out value). Still alternatively, if the validity periods are stored based on a count-up/count-down method, the control information timer count unit 27 increments/decrements the count values (step S5201 in FIG. 59).

Next, after updating the timer values, the control information timer count unit 27 determines whether there is any control information whose validity period has expired (step S5202 in FIG. 59).

If control information whose validity period has expired exists (YES in step S5202 in FIG. 59), the control information timer count unit 27 determines whether the control information is currently set (step S5203 in FIG. 59). If the control information is currently set or if the control information is being requested to be removed while currently set (NO in step S5203 in FIG. 59), it is only necessary that the control information timer count unit 27 remove the control information and transmit a removal response when receiving a control information removal response message from the switch 30.

In contrast, if the control information is not currently set (YES in step S5203 in FIG. 59), the control information timer count unit 27 requests the control message conversion unit 22 to perform a control information removal operation that does not accompany a control rule exchange operation. Accordingly, the control message conversion unit 22 removes the control information from the control information storage unit 25 (step S5204 in FIG. 59). At this point, the control information timer count unit 27 removes the validity period information of the corresponding control information.

The control message conversion unit 22 creates a communication setting rule removal notification message as to the removed control information and transmits the message to the network controller 10 via the control communication mediation unit 21 (step S5205 in FIG. 59).

Through the above processing, the control message relay apparatus 20b performs management (aging) on control information that exists in its own control information storage unit 25 and that is not set in the switch, by using the corresponding validity period.

Next, the above series of operations will be described along with statuses of control information storage units of the control message relay apparatus 20b and the switch 30 with reference to FIGS. 60 to 63.

In addition, hereinafter, information about an individual validity period stored in the control information timer count unit 27 will be described as a value in a remaining-validity-period information field (Exp) in the control information storage unit. In addition, for simplicity, the following description assumes that a basis value of a validity period given to each control information is 25 and that a count-down method is used.

The following description starts with a situation in which control information as illustrated in FIG. 18 is set. Namely, the new communication addressed to 192.168.0.102 from 192.168.0.1 has occurred and the control message conversion unit 22 has requested the switch 30 to remove the communication addressed to 192.168.0.100 from 192.168.0.1 so as to exchange the relevant control information.

Figure 60:
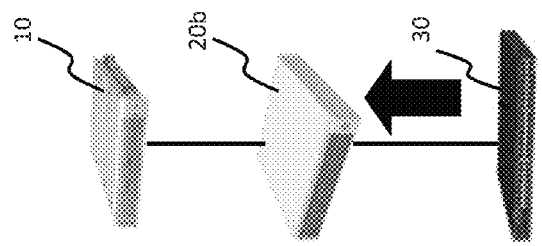
FIG. 60 illustrates a specific example of an operation performed by the control message relay apparatus according to the fourth exemplary embodiment of the present invention.

The control message conversion unit 22 applies the conversion rule that corresponds to the flow illustrated in FIG. 9 based on a control information removal control message. More specifically, since the removal target control information is a rule having a removing-for-exchange flag and a control information removal notification is a message in response to a removal request, the corresponding set flag and removing-for-exchange flag of the control information are canceled (YES in step S2301 and step S2302 in FIG. 9). Since the control information is changed in response to a removal request and corresponds to cancellation of a set flag (YES in step S5101 in FIG. 58), the control information timer count unit 27 extracts 15, which is the remaining validity period value, from the control information removal control message and stores the value (step S5103 in FIG. 58). FIG. 60 illustrates this state.

Figure 61:
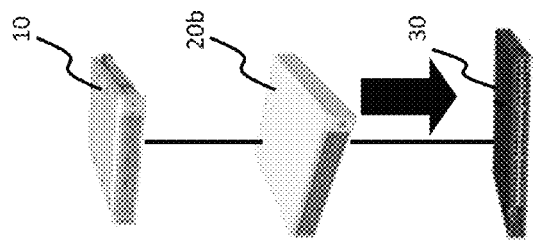
FIG. 61 is a diagram that follows FIG. 60.

The control message conversion unit 22 sets the control information for the communication addressed to 192.168.0.102 from 192.168.0.1, the control information having a waiting-for-exchange flag (YES in step S2305 to step S2307 in FIG. 9). FIG. 61 illustrates this state.

The control information timer count unit 27 continues to regularly perform a count-down operation on the values of the respective control information entries and determines whether there is any control information whose validity period has expired (step S5201 in FIG. 59). In this example, the validity period of the control information for the communication addressed to 192.168.0.100 from 192.168.0.1 expires first (YES in step S5202 in FIG. 59). In addition, the control information for the communication addressed to 192.168.0.100 from 192.168.0.1 does not have a set flag. Namely, since the control information is not currently set (NO in step S5203 in FIG. 59), the control information timer count unit 27 requests the control message conversion unit 22 to remove the communication setting rule without exchanging control rules.

Based on a control information removal notification rule, the control message conversion unit 22 removes the control information for the communication addressed to 192.168.0.100 from 192.168.0.1 from the control information storage unit 25. In this operation, the control information timer count unit 27 removes the validity period information of the corresponding control information (step S5204 in FIG. 59 and the strike-through text in FIG. 62(*c*)).

Figure 62:
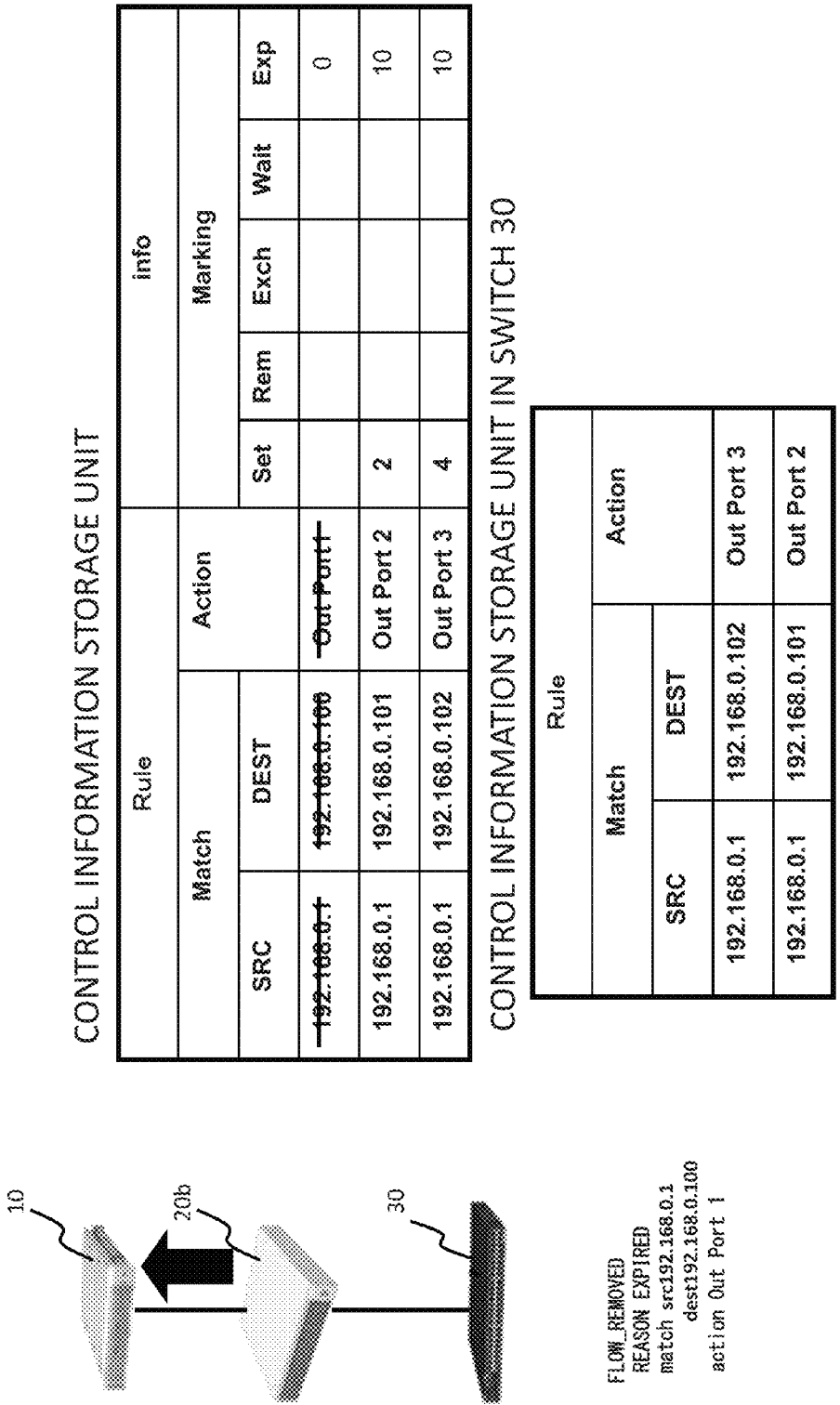
FIG. 62 is a diagram that follows FIG. 61.

The control message conversion unit 22 creates a communication setting rule removal notification message to notify the network controller 10 of the removal of the control information for the packets addressed to 192.168.0.100 from 192.168.0.1 and transmits the message via the control communication mediation unit 21 (step S5205 in FIG. 59 and an arrow between the control message relay apparatus 20*b* and the network controller 10 in FIG. 62).

Figure 63:
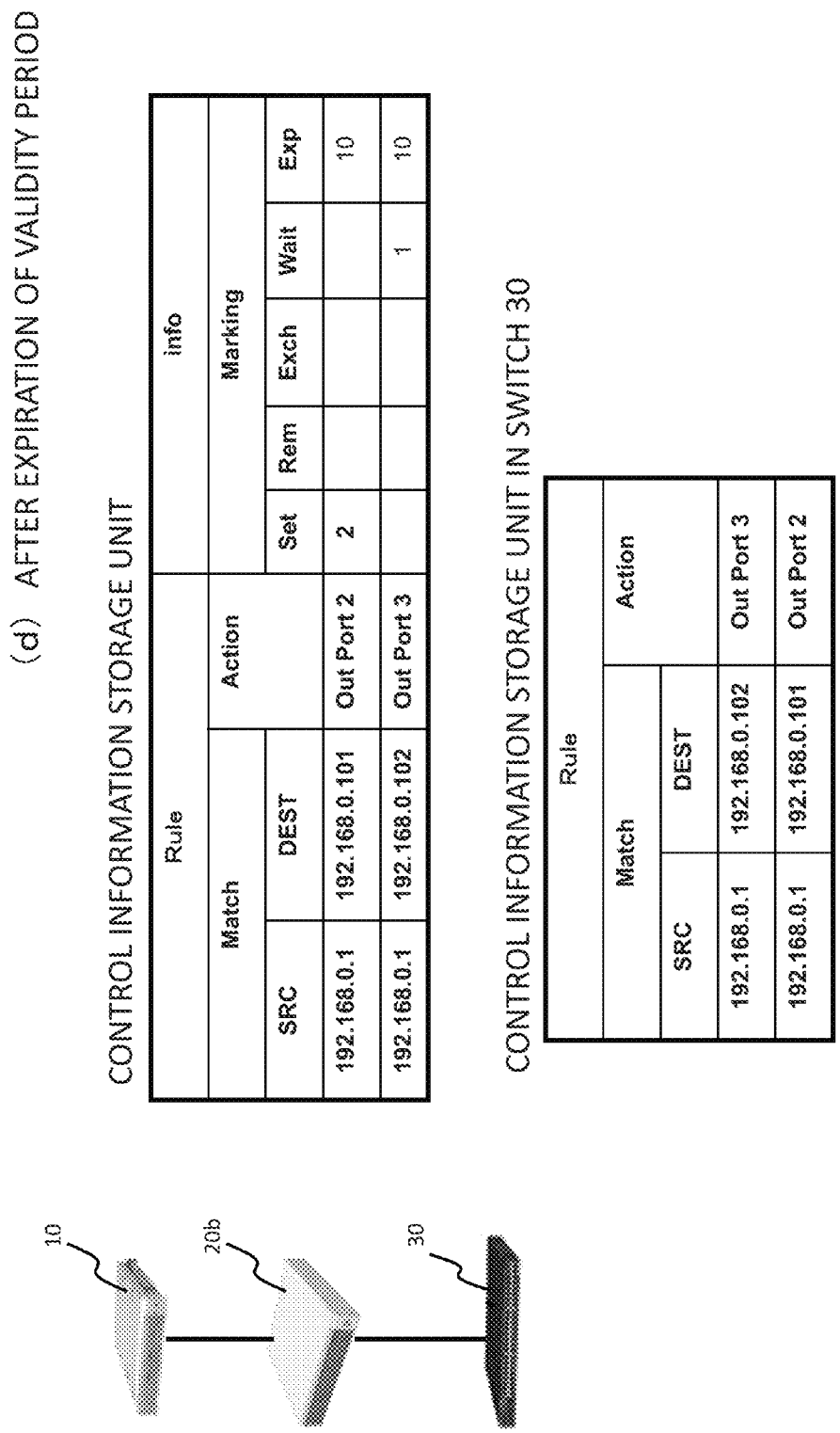
FIG. 63 is a diagram that follows FIG. 62.

Thus, the control message conversion unit 22 handles the expiration of the validity period of the control information for the communication addressed to 192.168.0.100 from 192.168.0.1, without having to perform any resetting operation on the switch 30. FIG. 63 illustrates this state.

As described above, the control message relay apparatus 20*b* realizes validity period processing without having to perform any control information resetting operation on the actual switch 30.

According to the fourth exemplary embodiment having the configuration as described above, the control message relay apparatus 20*b* can realize control information validity period processing without having to perform any setting operation on an actual switch(es), unlike the control message relay apparatus 20 according to the first exemplary embodiment.

While exemplary embodiments of the present invention have thus been described, the present invention is not limited thereto. Further variations, substitutions, or adjustments can be made without departing from the basic technical concept of the present invention. For example, the configurations of the networks and elements illustrated in the drawings are used only as examples to facilitate understanding of the present invention. Namely, the present invention is not limited to the configurations illustrated in the drawings.

Finally, suitable modes of the present invention will be summarized as follows.
(Mode 1)
See the control message relay apparatus according to the above first aspect.
(Mode 2)
In the control message relay apparatus according to mode 1, upon receiving a message addressed to the control apparatus from the switch requesting transmission of control information, the control message relay apparatus refers to the control information storage unit and transmits the control information in place of the control apparatus.
(Mode 3)
In the control message relay apparatus according to mode 1 or 2, the control information conversion unit changes a match condition(s) that is included in control information transmitted from the control apparatus and that identifies a packet to which the control information is applied.
(Mode 4)
In the control message relay apparatus according to mode 3, the control information conversion unit changes an application range of the match condition(s) wider than that of the match condition(s) set by the control apparatus so that a number of control information entries held in the switch decreases.
(Mode 5)
The control message relay apparatus according to any one of modes 1 to 4, further comprising: a union switch configuration setting unit that stores correspondence information for allowing a plurality of switches to be recognized as a single union switch. The control information conversion unit refers to the union switch configuration setting unit and converts a control message(s) transmitted between the control apparatus and a switch(es) included in the union switch so that the control apparatus recognizes the plurality of switches as the single union switch.
(Mode 6)
In the control message relay apparatus according to any one of modes 1 to 5, the control message relay apparatus has a function(s) as the control apparatus or a switch and is hierarchically connected to another control message relay apparatus(es).
(Mode 7)
In the control message relay apparatus according to any one of modes 1 to 6, the control message relay apparatus holds a conversion rule(s) for a control message(s) addressed from one of the control apparatus and the switch (es) to the other, and the control message relay apparatus refers to the conversion rule(s) to convert a control message (s) between the control apparatus and the switch(es).
(Mode 8)
The control message relay apparatus according to any one of modes 1 to 7, further comprising: a control information timer count unit that manages validity period(s) of control information stored in the control information storage unit. The control message relay apparatus manages the validity period(s) of the control information in place of the switch (es).
(Mode 9)
See the control message relay method according to the above second aspect.
(Mode 10)
See the program according to the above third aspect.

The above modes 9 and 10 can be expanded in the same way as mode 1 is expanded to modes 2 to 8.

The disclosure of each of the above Non-Patent Literatures is incorporated herein by reference thereto. Modifications and adjustments of the exemplary embodiments and examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

10 network controller
20, 20*a*, 20*b*, 200 control message relay apparatus
21 control communication mediation unit
22 control message conversion unit
23 control policy storage unit 24, 24a switch information storage unit
25 control information storage unit
26 union switch configuration setting unit
27 control information timer count unit
30, 30-1, 30-2, 300 switch
100 control apparatus
210 control information storage unit
220 control information conversion unit

What is claimed is:

1. A control message relay apparatus arranged between a switch that processes a packet(s) based on externally set control information and a control apparatus that sets the control information in the switch, the control message relay apparatus comprising:
a control information storage configured to store control information received from the control apparatus and information indicative of a setting status of the control information in the switch;
at least one processor; and
at least one storage, with a predetermined memory space, storing executable instructions that when executed by the at least one processor, cause the at least one processor to perform as:
a control information conversion unit that reflects a control content(s) received from the control apparatus in control information held in the switch based on a predetermined control policy(ies) to prevent increase of an amount of the control information held in the switch, wherein
the control information conversion unit causes the at least one processor to:
change a match condition(s), wherein the match condition(s) is included in control information transmitted from the control apparatus and the match condition(s) identifies a packet to which the control information is applied, and
change an application range of the match condition(s) wider than that of the match condition(s) set by the control apparatus so that a number of control information entries held in the switch decreases.

2. The control message relay apparatus according to claim 1, wherein
upon receiving a message addressed to the control apparatus from the switch requesting transmission of control information, the control message relay apparatus refers to the control information storage and transmits the control information in place of the control apparatus.

3. The control message relay apparatus according to claim 1, further comprising instructions that when executed by the at least one processor, cause the at least one processor to perform as:
a union switch configuration setting unit that stores correspondence information for allowing a plurality of switches to be recognized as a single union switch, wherein
the control information conversion unit causes the at least one processor to refer to the union switch configuration setting unit and causes the at least one processor to convert a control message(s) transmitted between the control apparatus and a switch(es) included in the union switch so that the control apparatus recognizes the plurality of switches as the single union switch.

4. The control message relay apparatus according to claim 1, wherein
the control message relay apparatus has a function(s) as the control apparatus or a switch and is hierarchically connected to another control message relay apparatus(es).

5. The control message relay apparatus according to claim 1, wherein
the control message relay apparatus holds a conversion rule(s) for a control message(s) addressed from one of the control apparatus and the switch(es) to the other, and
the control message relay apparatus refers to the conversion rule(s) to convert a control message(s) between the control apparatus and the switch(es).

6. A control message relay method, comprising:
by a control message relay apparatus arranged between a switch that processes packets based on externally set control information and a control apparatus that sets the control information in the switch, reflecting a control content(s) received from the control apparatus in control information held in the switch based on a predetermined control policy(ies) to prevent increase of an amount of the control information held in the switch;
updating a control information storage that stores control information received from the control apparatus and information indicative of a setting status of the control information in the switch, wherein
the reflecting comprises changing a match condition(s) that is included in control information transmitted from the control apparatus and that identifies a packet(s) to which the control information is applied, and
the reflecting comprises changing an application range of the match condition(s) wider than that of the match condition(s) set by the control apparatus so that a number of control information entries held in the switch decreases.

7. The control message relay method according to claim 6, comprising:
upon receiving a message addressed to the control apparatus from the switch requesting transmission of control information, referring to the control information storage and transmitting the control information in place of the control apparatus.

8. The control message relay method according to claim 6, further comprising:
storing correspondence information for allowing a plurality of switches to be recognized as a single union switch in a union switch configuration setting unit, wherein
the reflecting comprises referring to the union switch configuration setting unit and converting a control message(s) transmitted between the control apparatus and a switch(es) included in the union switch so that the control apparatus recognizes the plurality of switches as the single union switch.

9. The control message relay method according to claim 6, further comprising:
holding a conversion rule(s) for a control message(s) addressed from one of the control apparatus and the switch(es) to the other; and
referring to the conversion rule(s) to convert a control message(s) between the control apparatus and the switch(es).

10. A non-transitory computer-readable recording medium storing a program that causes a computer, arranged between a switch that processes packets based on externally set control information and a control apparatus that sets the control information in the switch, to execute:

reflecting a control content(s) received from the control apparatus in control information held in the switch based on a predetermined control policy(ies) to prevent increase of an amount of the control information held in the switch;

updating a control information storage that stores control information received from the control apparatus and information indicative of a setting status of the control information in the switch, wherein the reflecting by the computer comprises changing a match condition(s) that is included in control information transmitted from the control apparatus and that identifies a packet(s) to which the control information is applied, and the reflecting executed by the computer comprises changing an application range of the match condition(s) wider than that of the match condition(s) set by the control apparatus so that a number of control information entries held in the switch decreases.

11. The non-transitory computer-readable recording medium according to claim 10, wherein the program causes the computer to execute:

upon receiving a message addressed to the control apparatus from the switch requesting transmission of control information, referring to the control information storage and transmitting the control information in place of the control apparatus.

12. The non-transitory computer-readable recording medium according to claim 10, wherein the program causes the computer to execute:

storing correspondence information for allowing a plurality of switches to be recognized as a single union switch in a union switch configuration setting unit, wherein the reflecting executed by the computer comprises referring to the union switch configuration setting unit and converting a control message(s) transmitted between the control apparatus and a switch(es) included in the union switch so that the control apparatus recognizes the plurality of switches as the single union switch.

13. The non-transitory computer-readable recording medium according to claim 10, wherein the program causes the computer to execute:

holding a conversion rule(s) for a control message(s) addressed from one of the control apparatus and the switch(es) to the other; and referring to the conversion rule(s) to convert a control message(s) between the control apparatus and the switch(es).

* * * * *